Aug. 1, 1961  H. S. BEATTIE  2,994,475
CARD FEEDING, SENSING, AND TRANSLATING MECHANISM
Filed April 8, 1955  19 Sheets-Sheet 1

INVENTOR
HORACE S. BEATTIE
BY
Joseph B. Taphorn
ATTORNEY

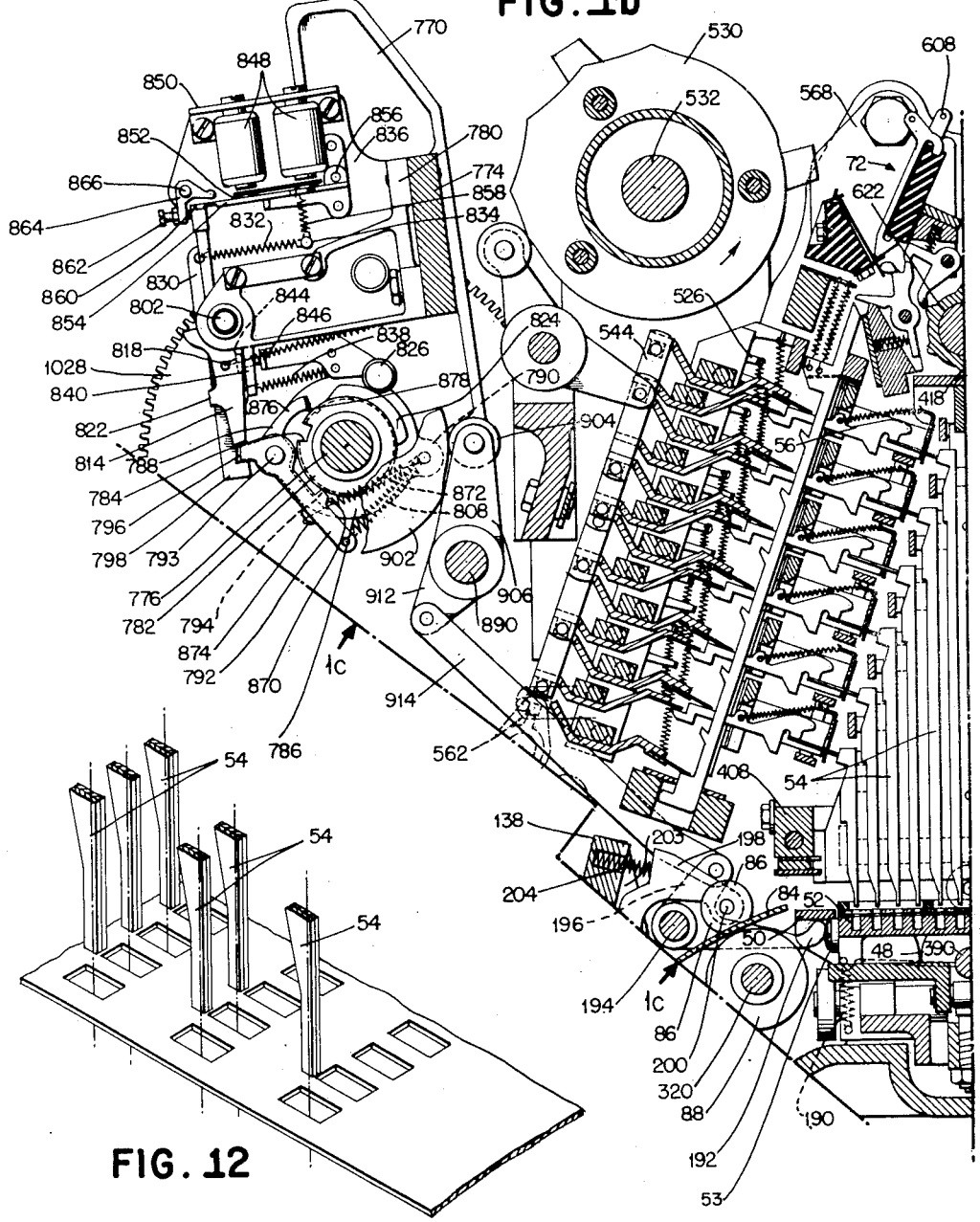

INVENTOR
HORACE S. BEATTIE
BY
ATTORNEY

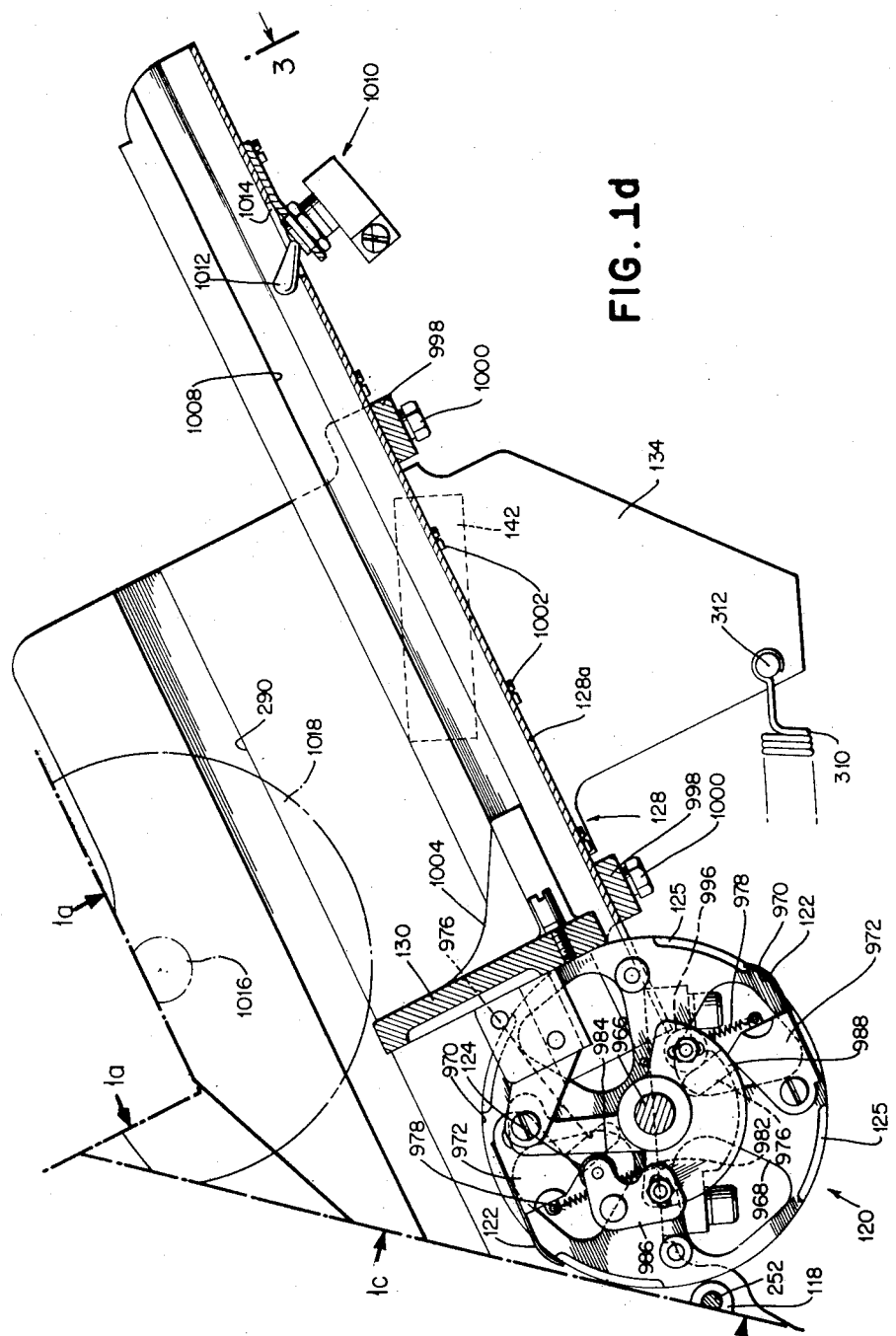

INVENTOR
HORACE S. BEATTIE
BY
Joseph B. Taphorn
ATTORNEY

Aug. 1, 1961      H. S. BEATTIE      2,994,475
CARD FEEDING, SENSING, AND TRANSLATING MECHANISM
Filed April 8, 1955      19 Sheets-Sheet 6

INVENTOR.
HORACE S. BEATTIE
BY Joseph B. Taphorn
ATTORNEY

INVENTOR.
HORACE S. BEATTIE
BY Joseph B. Taylor
ATTORNEY

INVENTOR.
HORACE S. BEATTIE
BY Joseph B. Taphorn
ATTORNEY

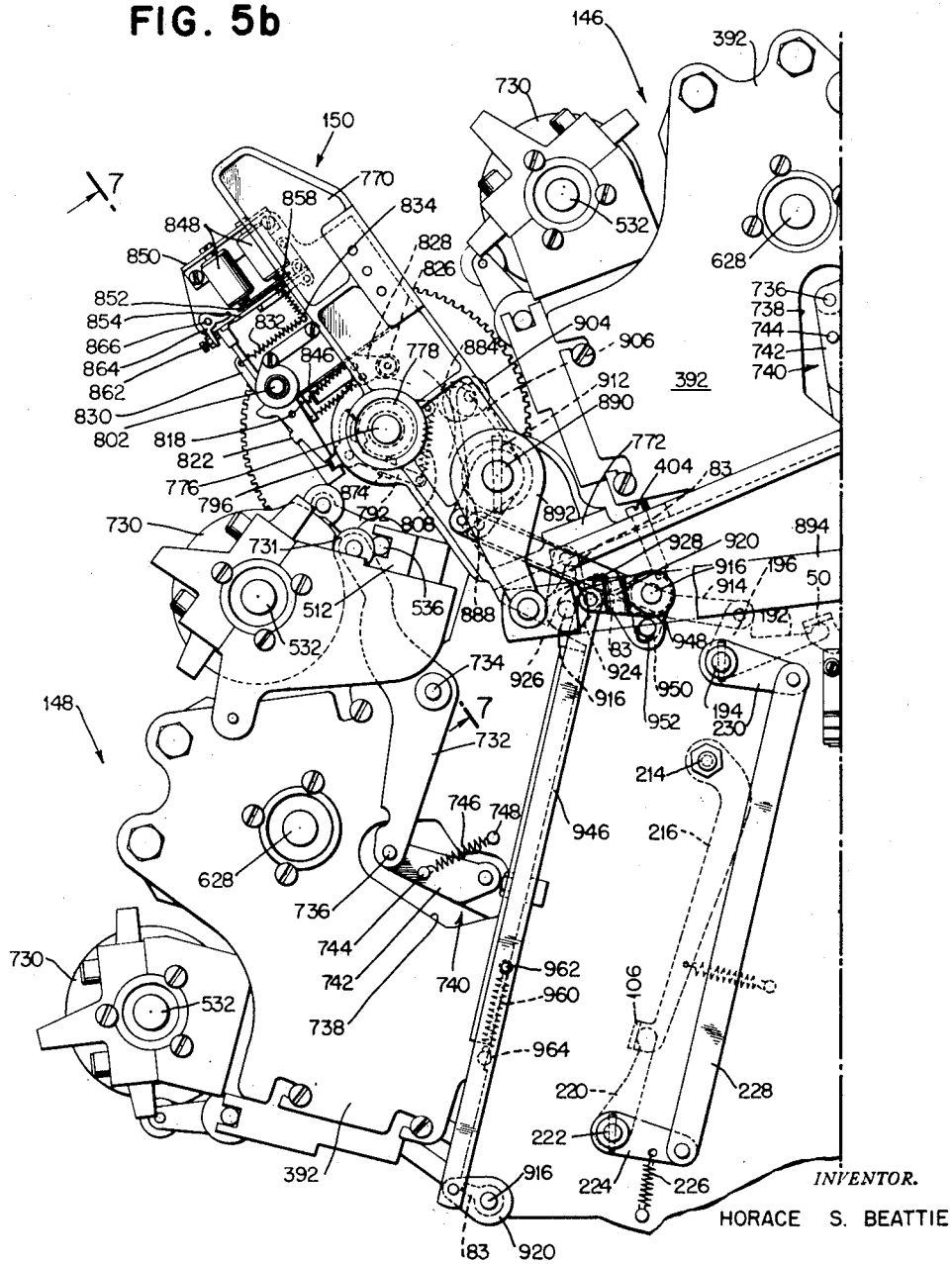

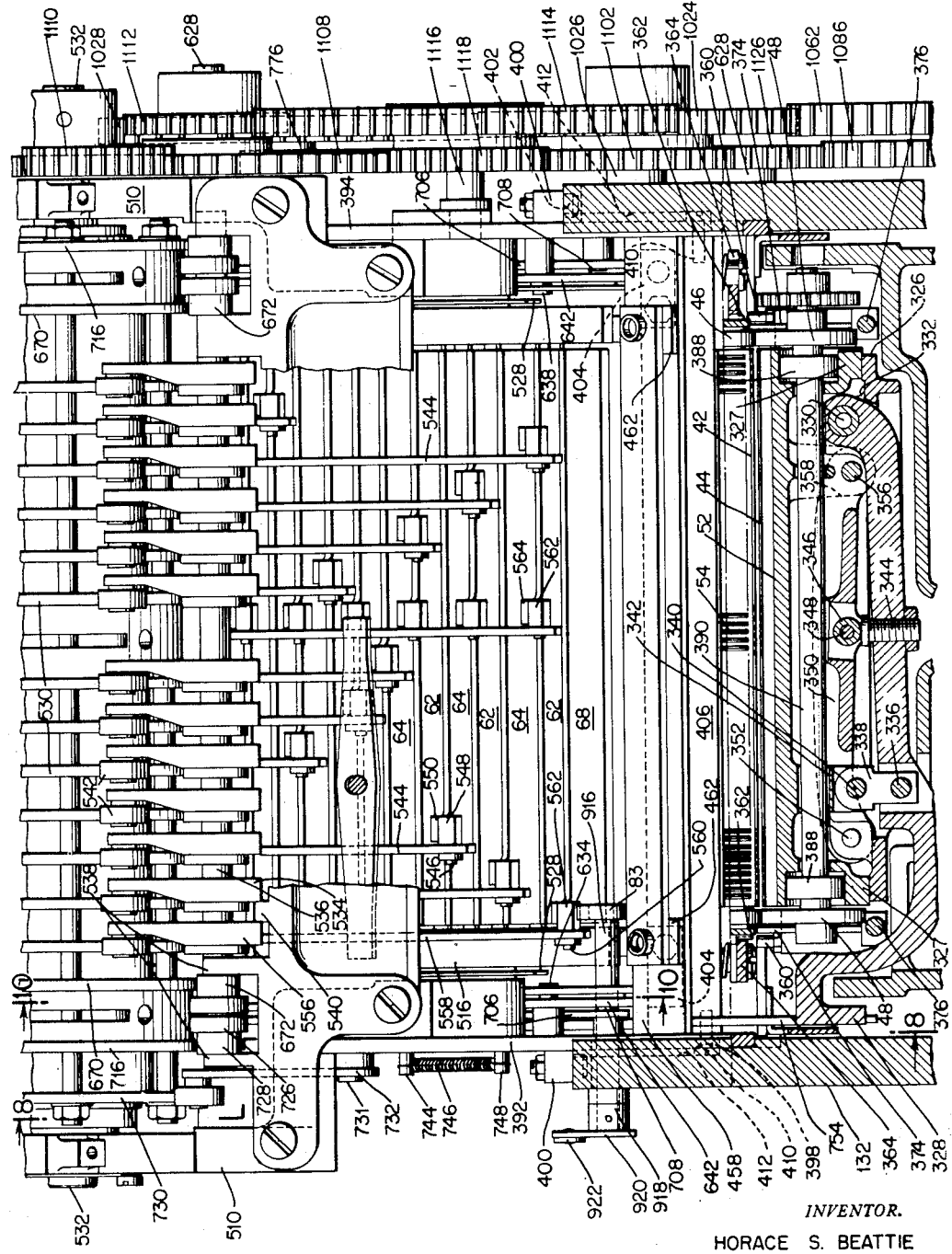

Aug. 1, 1961  H. S. BEATTIE  2,994,475
CARD FEEDING, SENSING, AND TRANSLATING MECHANISM
Filed April 8, 1955  19 Sheets-Sheet 12

INVENTOR.
HORACE S. BEATTIE
BY *Joseph B. Taylor*
ATTORNEY

Aug. 1, 1961 — H. S. BEATTIE — 2,994,475
CARD FEEDING, SENSING, AND TRANSLATING MECHANISM
Filed April 8, 1955 — 19 Sheets-Sheet 13

INVENTOR.
HORACE S. BEATTIE
BY Joseph B. Taphorn
ATTORNEY

*INVENTOR.*
HORACE S. BEATTIE
BY Joseph B. Taphorn
*ATTORNEY*

Aug. 1, 1961  H. S. BEATTIE  2,994,475
CARD FEEDING, SENSING, AND TRANSLATING MECHANISM
Filed April 8, 1955  19 Sheets-Sheet 16

| NUMERICAL PUNCH | WITHOUT A ZONE PUNCH | WITH X & O PUNCH | WITH X PUNCH | WITH O PUNCH |
|---|---|---|---|---|
| NONE | ✱ | & | \ | o |
| 1 | 1 | A | J | / |
| 2 | 2 | B | K | S |
| 2-1 | 3 | C | L | T |
| 4 | 4 | D | M | U |
| 4-1 | 5 | E | N | V |
| 4-2 | 6 | F | O | W |
| 4-2-1 | 7 | G | P | X |
| 8 | 8 | H | Q | Y |
| 8-1 | 9 | I | R | Z |
| 8-2-1 | # | . | $ | , |
| 8-4 | @ | ✧ | ✱ | % |

INVENTOR
HORACE S. BEATTIE
BY
Joseph B. Taphorn
ATTORNEY

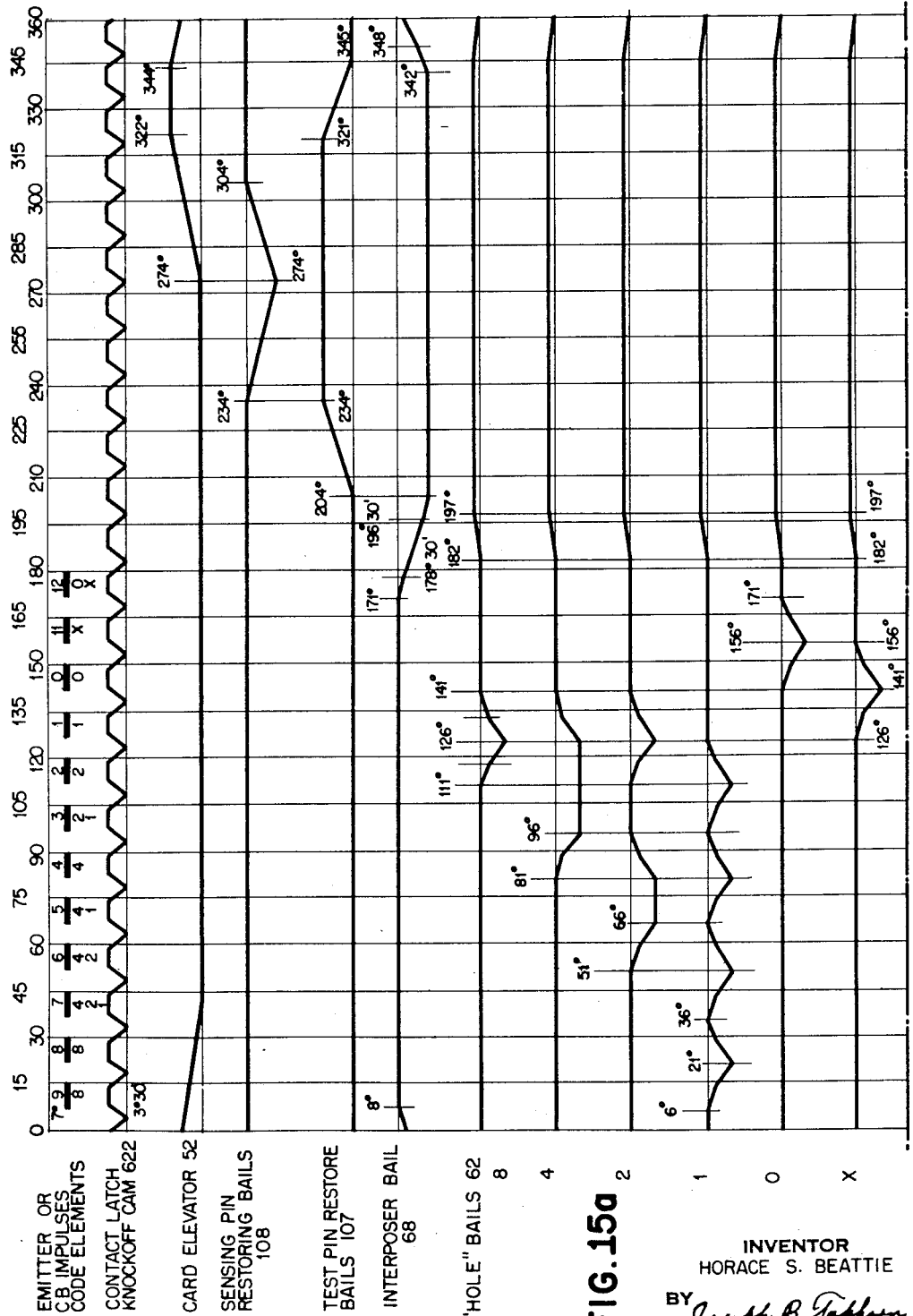

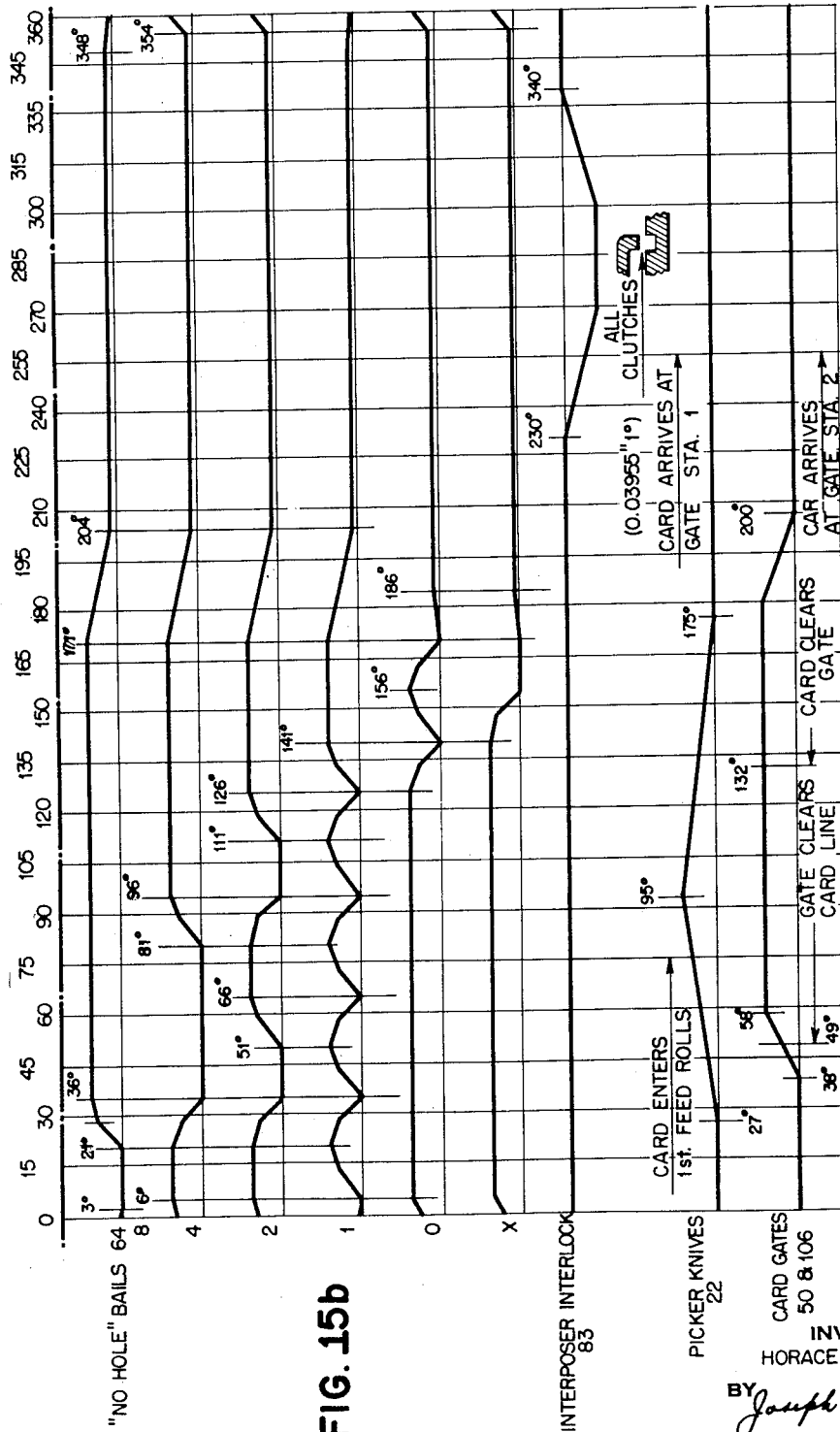

United States Patent Office 2,994,475
Patented Aug. 1, 1961

2,994,475
CARD FEEDING, SENSING, AND TRANSLATING MECHANISM
Horace S. Beattie, Poughkeepsie, N.Y., assignor to International Business Machines Corporation, New York, N.Y., a corporation of New York
Filed Apr. 8, 1955, Ser. No. 500,128
29 Claims. (Cl. 235—61.11)

This invention relates to record card sensing and analyzing mechanisms used in accounting machines and more particularly to a sensing and analyzing mechanism capable of reading data punched in record cards according to one code and translating it into appropriate time spaced pulses for an accounting machine constructed to operate in another code.

Present accounting machines, see for example Patent No. 2,510,559, issued to G. F. Daly on June 6, 1950, are designed to handle record cards of the type in which the card is divided into a series of longitudinally spaced columns, each of which is provided with twelve index point positions forming the basis for a duodecimal code in which perforations at nine index point positions are respectively representative of the one through nine numeric values in the decimal code and perforations at the remaining three positions are respectively representative of the 10 or 0, 11 or X, and 12 or R combination or zone control digital values. In these machines the cards are analyzed serially, and the index point positions in each column are serially tested for perforations, the presence of a perforation being detected as an electrical impulse at a differential time significant of its digital value.

It has been proposed that a record card of increased capacity be provided, and according to a preferred scheme, this is obtained by dividing each column of the usual record card into halves. There results a six index point position double deck arrangement effectively having twice the usual number of columns.

According to the code employed with the six index point position columns, the decimal values of 1 through 9, which were recorded individually in the 12 index point position code, are now recorded in binary form. Accordingly, there are four index point positions respectively representative of the 1, 2, 4, and 8 decimal values. The 3, 5, 6, 7, and 9 decimal values are obtained through various combinations of the previously designated four index point positions. Thus, the decimal number 3 is recorded as a combination of perforations at the 1 and 2 index point positions, the decimal number 5 as a combination of perforations at the 1 and 4 index point positions, the decimal number 6 as a combination of perforations at the 2 and 4 index point positions, the decimal number 7 as a combination of perforations at the 1, 2, and 4 index point positions, and the decimal number 9 as a combination of perforations at the 1 and 8 index point positions. The combination or zone digital values of 0, X, and R in the twelve or duodecimal index point position code are represented in the double deck card respectively by perforations at the fifth and sixth index point positions and by a combination of perforations in the fifth and sixth or 0 and X index positions.

The main object of this invention is to enable accounting machines to handle such an increased capacity record card. More specifically, it is an object of this invention to provide a card handling mechanism for the increased capacity card which can be used in an accounting machine in place of such card handling units as are shown in the aforementioned Daly patent and which will produce electrical impulses representative of the decimal and the combination or zone digital values recorded in each deck column of the record card at the same time in an accounting machine cycle that they were rendered for corresponding digital values by that card handling unit.

It is a further object of this invention to provide a card handling mechanism of the type described which can be embodied in existing accounting machines in place of the card sensing and analyzing means presently employed without requiring further significant changes in such existing machines.

Another object of this invention is to provide a card handling mechanism of the type described which is also capable of performing all of the other functions now performed by the card handling unit disclosed in the above identified patent.

Still another object of the invention is to provide a card handling mechanism capable of performing the aforementioned objects that is also accurate and reliable in operation and yet relatively simple of construction and economical of manufacture.

According to the invention a translating device is provided for reading at once all of the holes punched in a card according to one code and establishing circuits in another code to a terminal board from which other elements of the accounting machine may be operated. Thus, a card is fed from the bottom of a hopper to a position wherein it is stopped by a card gate opposite the coplanar ends of a group of longitudinal movable sensing pins of a first sensing station. The card is then moved against the coplanar ends of the sensing pins of which there is at least one for each index point position in each deck of the card, and those sensing pins for which no perforations exist at corresponding index point positions are displaced longitudinally with respect to those for which perforations do exist. Thereafter, a group of longitudinally biased test pins, of which there is one for each index point position in each deck of the card, are released, and individually permitted to move to an advanced position or stopped in an intermediate position by the corresponding sensing pins according to whether or not they were displaced longitudinally. Next, at a time immediately preceding the period in the machine cycle during which impulses representative of digital values are normally received by the other elements of the accounting machine, a group of biased interposer rods, of which there is one for each deck column, are released for longitudinal movement toward switch closing positions. At the same time one or more of each deck column's test pins in either of the intermediate and advanced positions will be operatively and successively disposed in the path of the respective released interposer rod to restrain its movement to a switch closing position until a differential time representative of a digital value recorded in the corresponding deck column occurs.

A test pin in the advanced position is operatively disposed in the path of the associated interposer rod at those times that a pulse would represent digital values whose code elements included a perforation at the corresponding index point position. In this manner the interposer rod is restrained from moving to a switch closing position at a differential time if not all of the index point positions which comprise the code elements of the respective digital value are perforated. A test pin in the intermediate position is operatively disposed in the path of the associated interposer rod at those times that pulses would represent digital values whose code elements were constituted of remaining ones of those perforations designating a digital value. In this way the interposer rod is restrained from moving to a switch closing position at a differential time if those code elements designating the respective digital value are part of a group designating another digital value. It will be evident that the positions of the test pins in each deck column will determine the action of the interposer rod for that column and that the movement of the interposer rod to a switch closing position can only take place at the times representative of the digital values recorded in a deck column.

After the pulse period is finished in a machine cycle, the interposer bails are restored and held in an out-of-the-way position. Thereafter the same is done to the test pins, and this is followed by a restoration of the displaced sensing pins. In this way each sensing station is cleared for another sensing.

The sensing pins are mechanically held against displacement so that the card elevator can be lowered immediately after the sensing pins were set up, thus permitting the next cards to be processed while the data contained on the earlier ones and stored in the sensing and test pins is being analyzed. If there is to be a re-sensing of the same card, the card gate will hold the card for the ensuing cycle. After the last reading of the card at that station, the card gate will be operated after the elevator has lowered to permit the card to be frictionally advanced to the next sensing station which is like the first sensing station and whereat it is stopped by a second card gate. In the meantime a second card will have been advanced from the bottom of the hopper and stopped at the first sensing station by the first card gate. Both cards will then be read simultaneously. After both cards have been sensed the desired number of times, the card gates will be simutaneously operated with first card passing to a stacker while second card advances to the second sensing station and a third card arrives at the first station. The above pattern of events may be continued as long as cards remain in the hopper.

Other objects, features, and advantages of the invention will be pointed out in the following description and claims and illustrated in the accompanying drawings, which disclose, by way of examples, the principle of the invention and the best mode, which has been contemplated, of applying that principle.

In the drawings:

FIGS. 1a, 1b, 1c, and 1d, present, when assembled with FIG. 1a to the right of FIG. 1b and FIG. 1c to the lower left of FIG. 1b and FIG. 1d to the right of FIG. 1c, a vertical longitudinal cross-sectional view through an embodiment of the invention.

Figure 3:
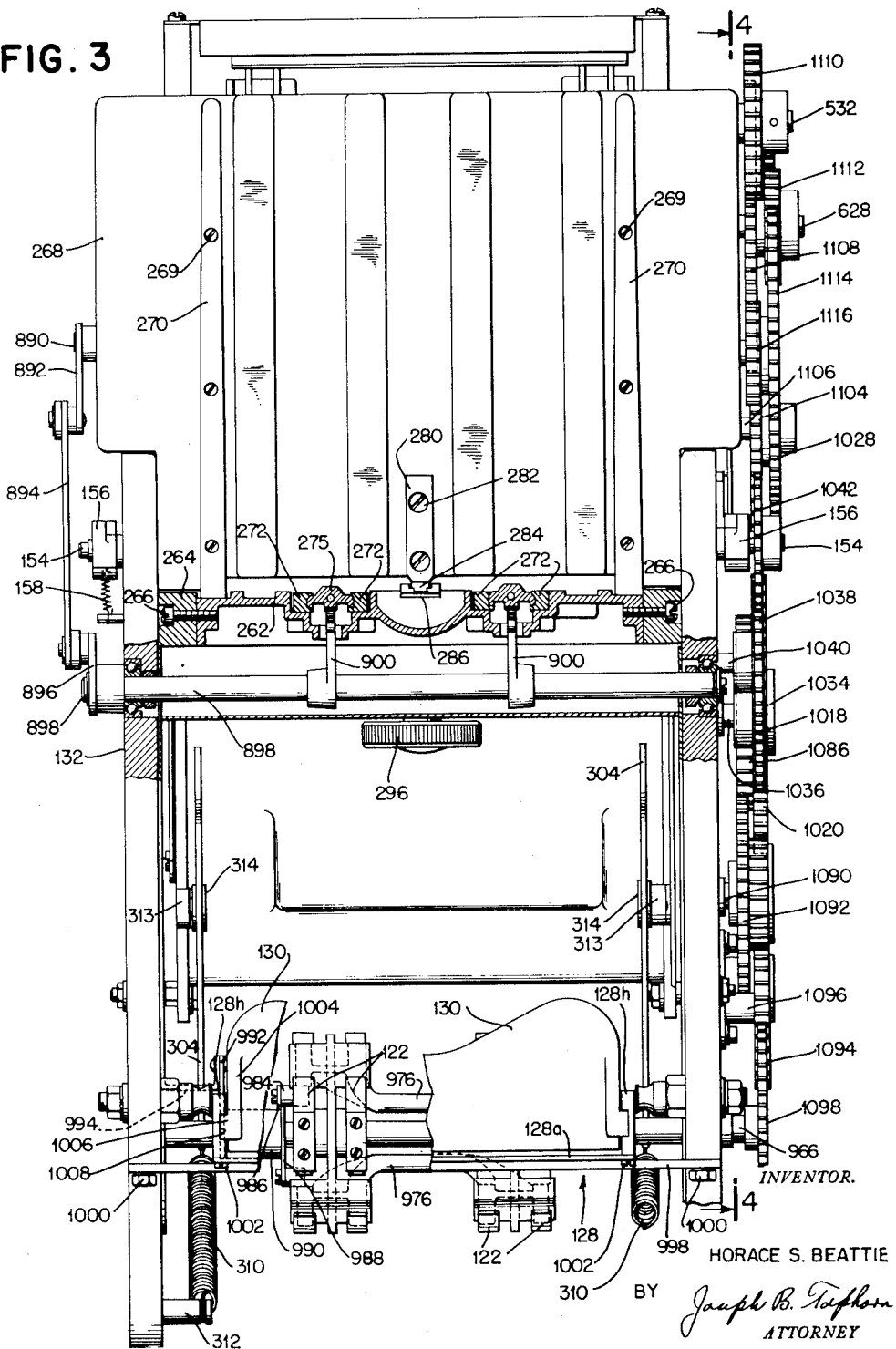
FIG. 3 is an end view, partially in section, taken along the line 3—3 of FIGS. 1a and 1d.
Figure 4A:
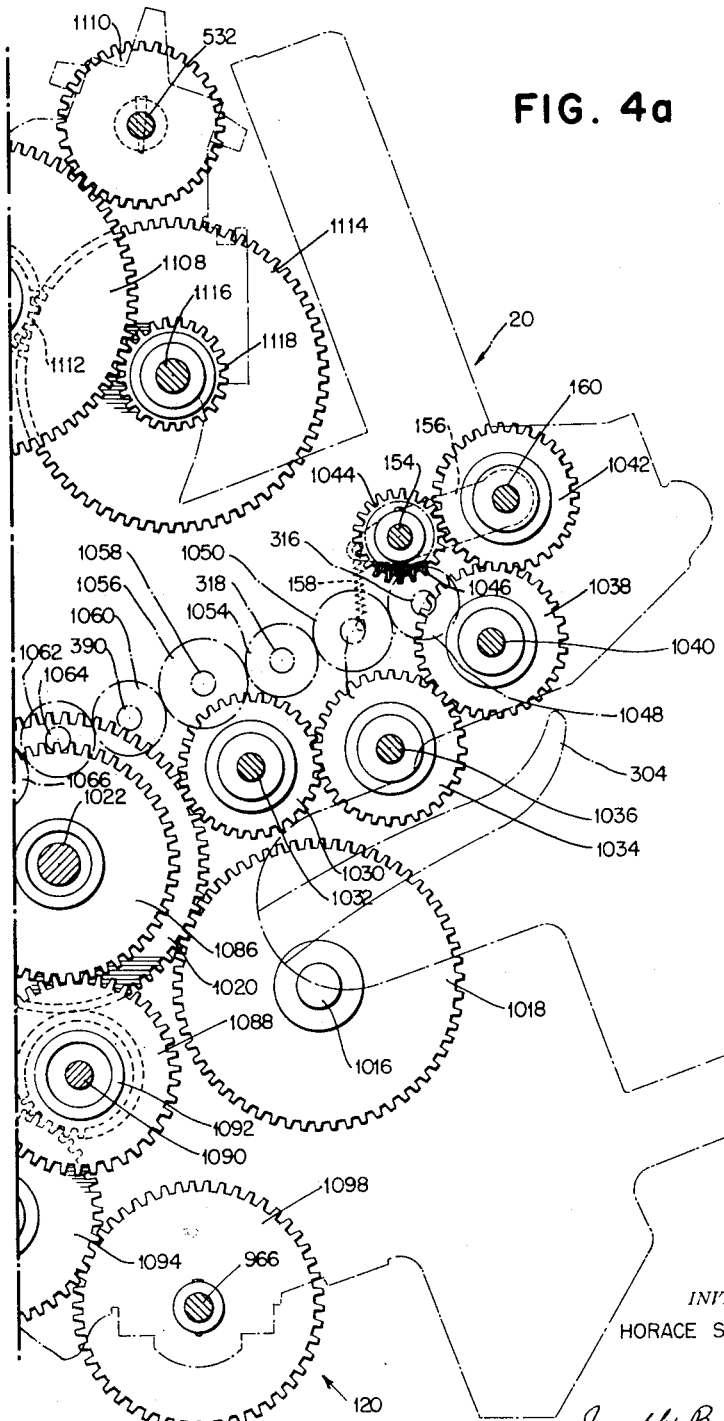
Figure 4B:
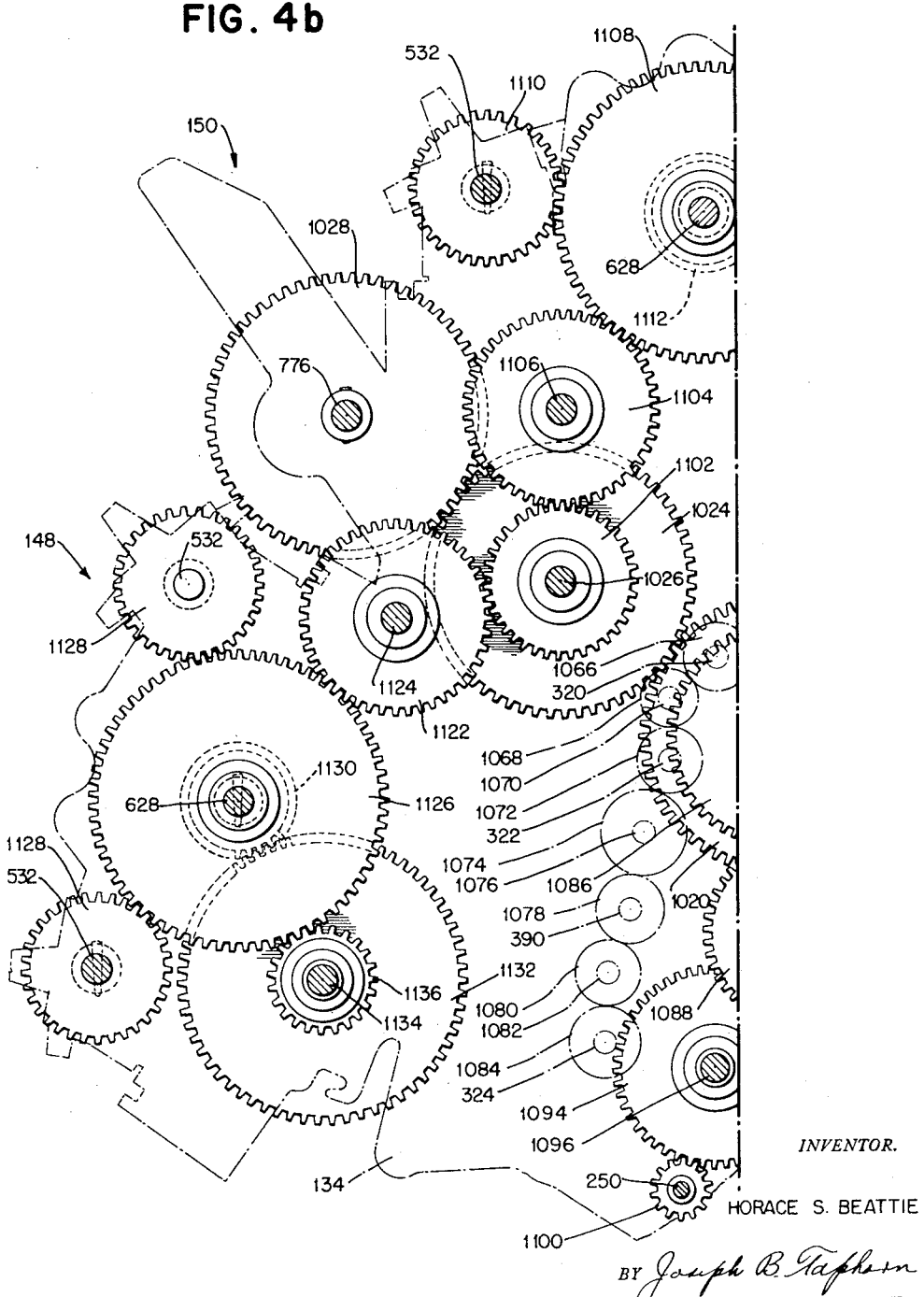

FIGS. 4a and 4b disclose, when assembled with FIG. 4a to the right of FIG. 4b, a view of the apparatus taken along the line 4—4 of FIG. 3.

Figure 5A:
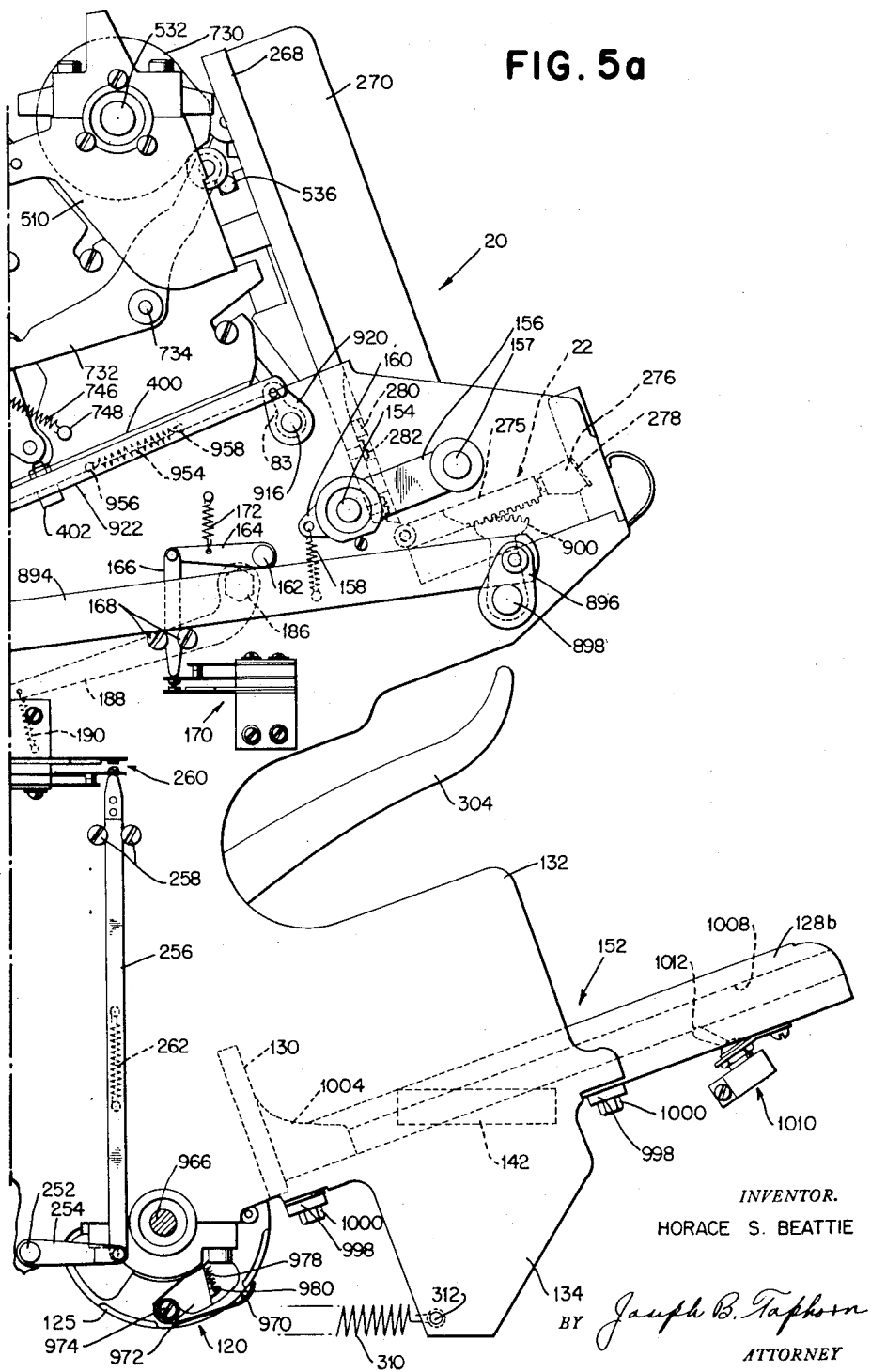

FIGS. 5a and 5b disclose, when assembled with FIG. 5a to the right of FIG. 5b, a left side view of the apparatus shown in FIG. 1.

Figure 1A:
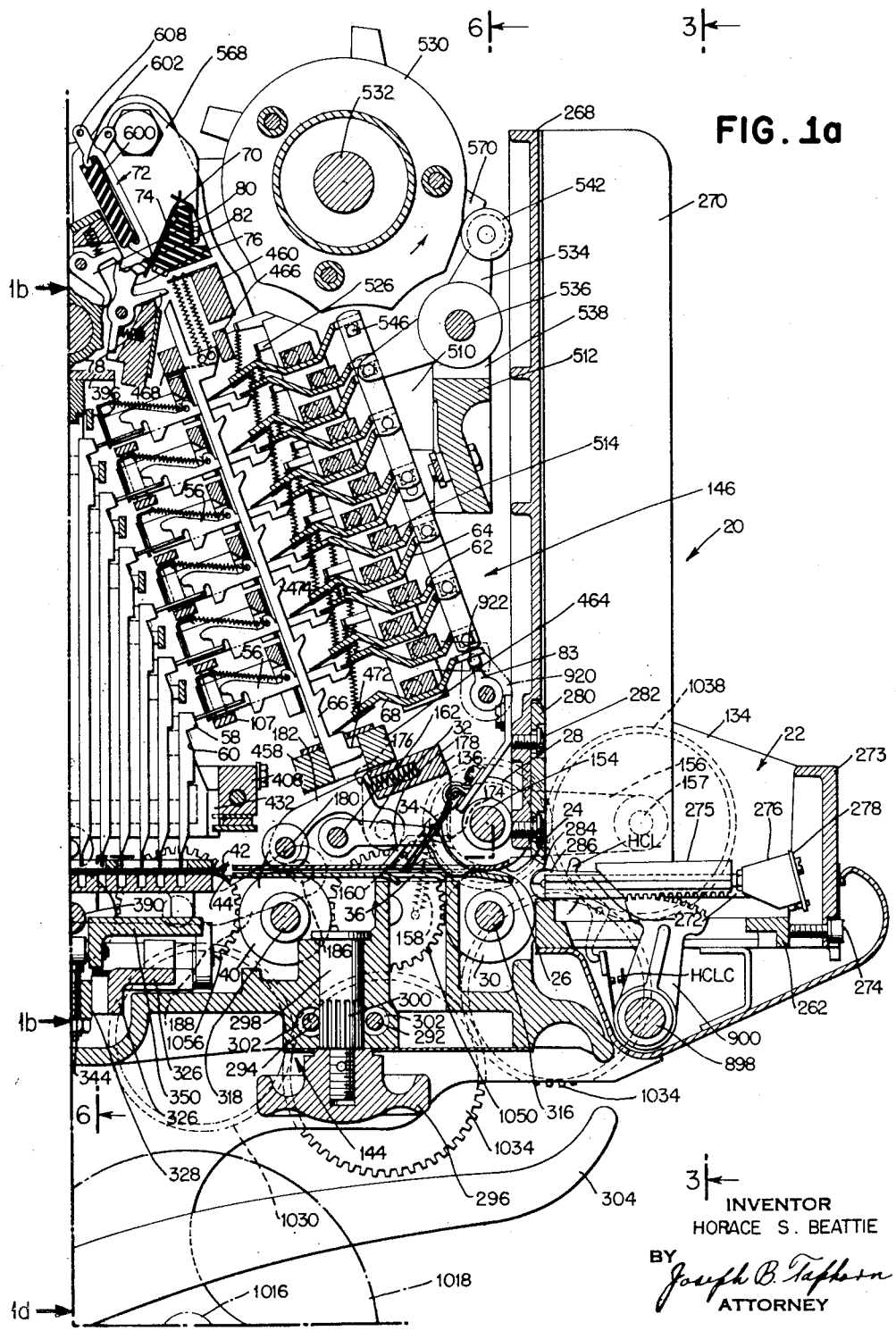

FIG. 6 is a vertical view taken along the section line 6—6 of FIG. 1a.

Figure 7:
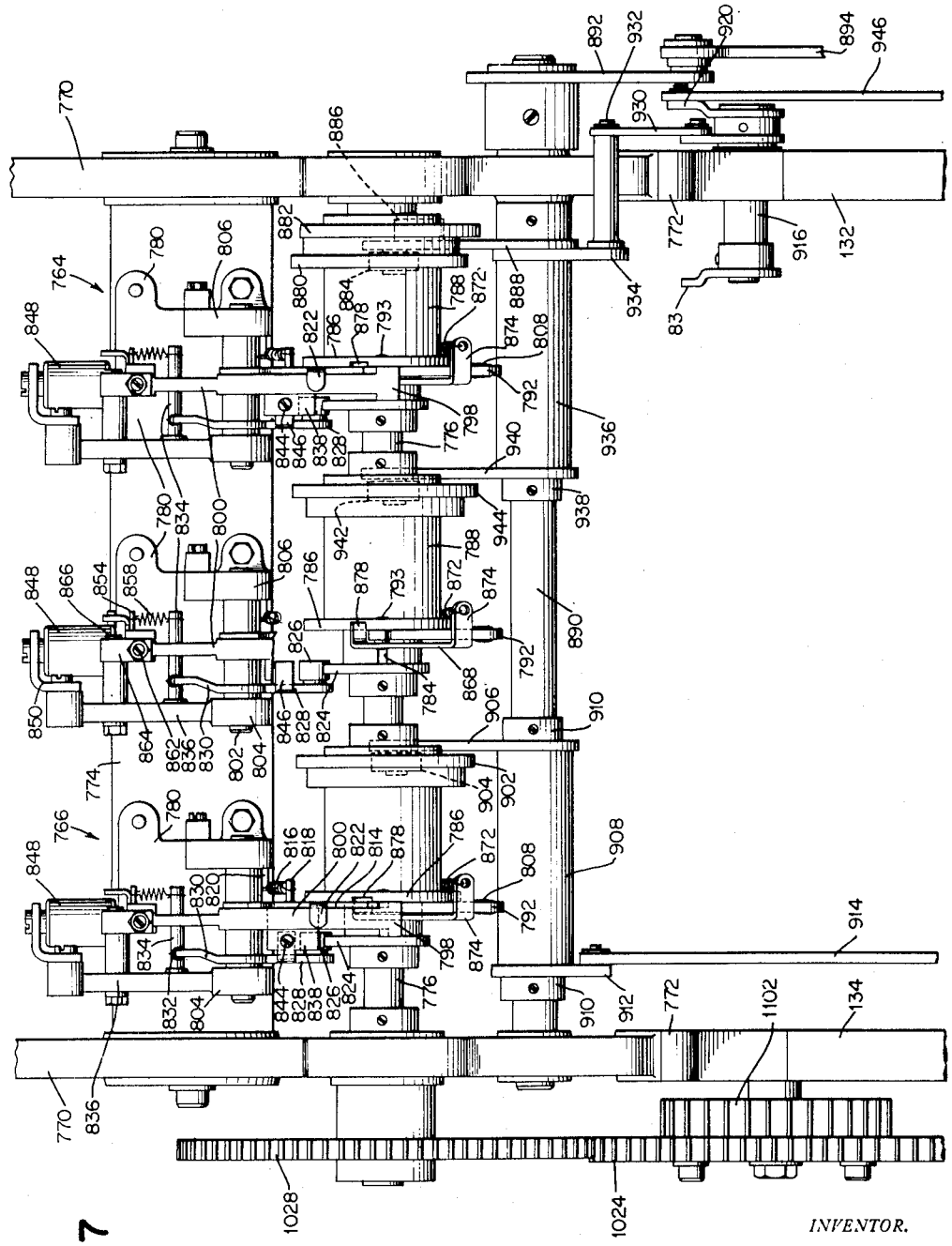

FIG. 7 is a view taken along the line 7—7 of FIG. 5b.

Figure 8:
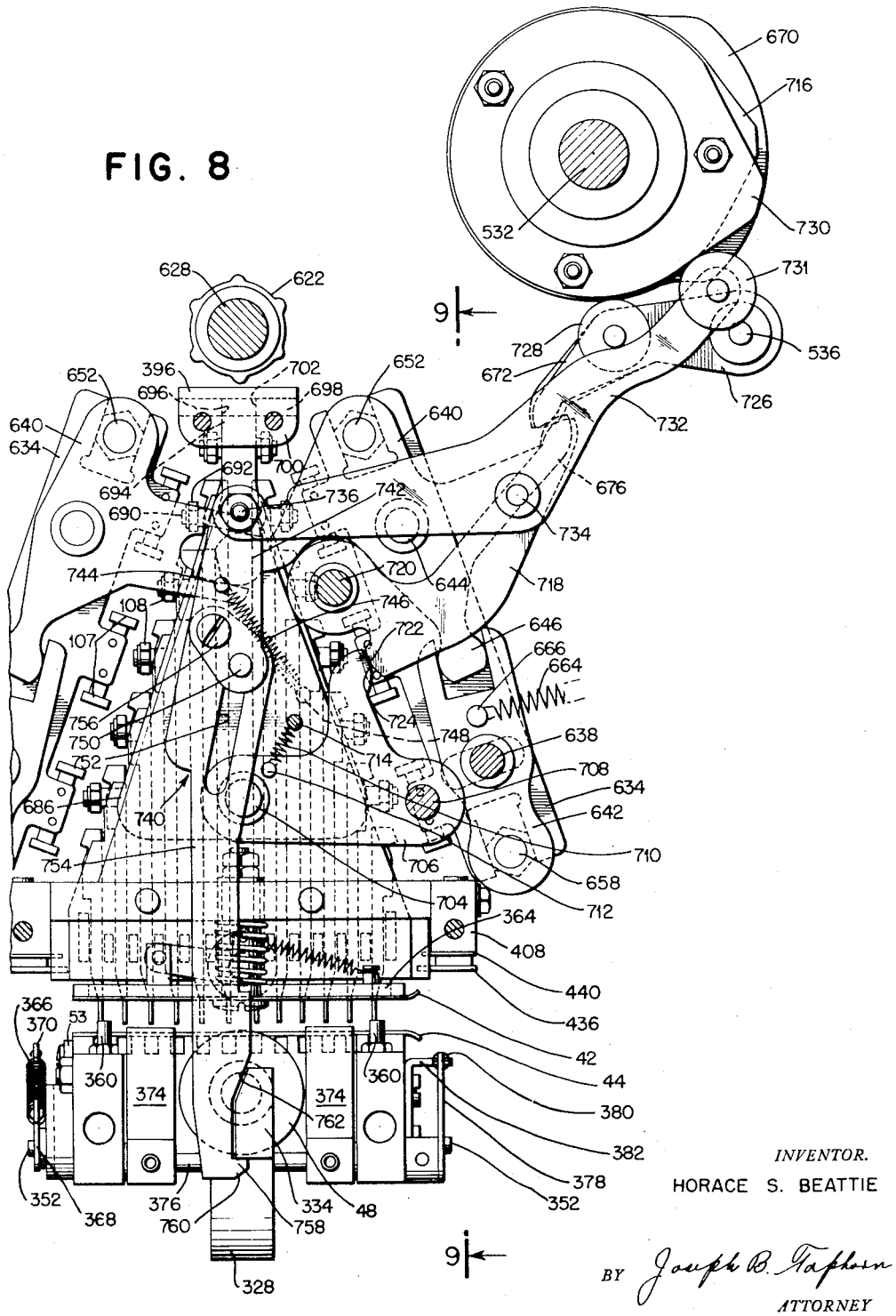

FIG. 8 is a view of certain mechanisms taken along the section line 8—8 of FIG. 6.

Figure 9:
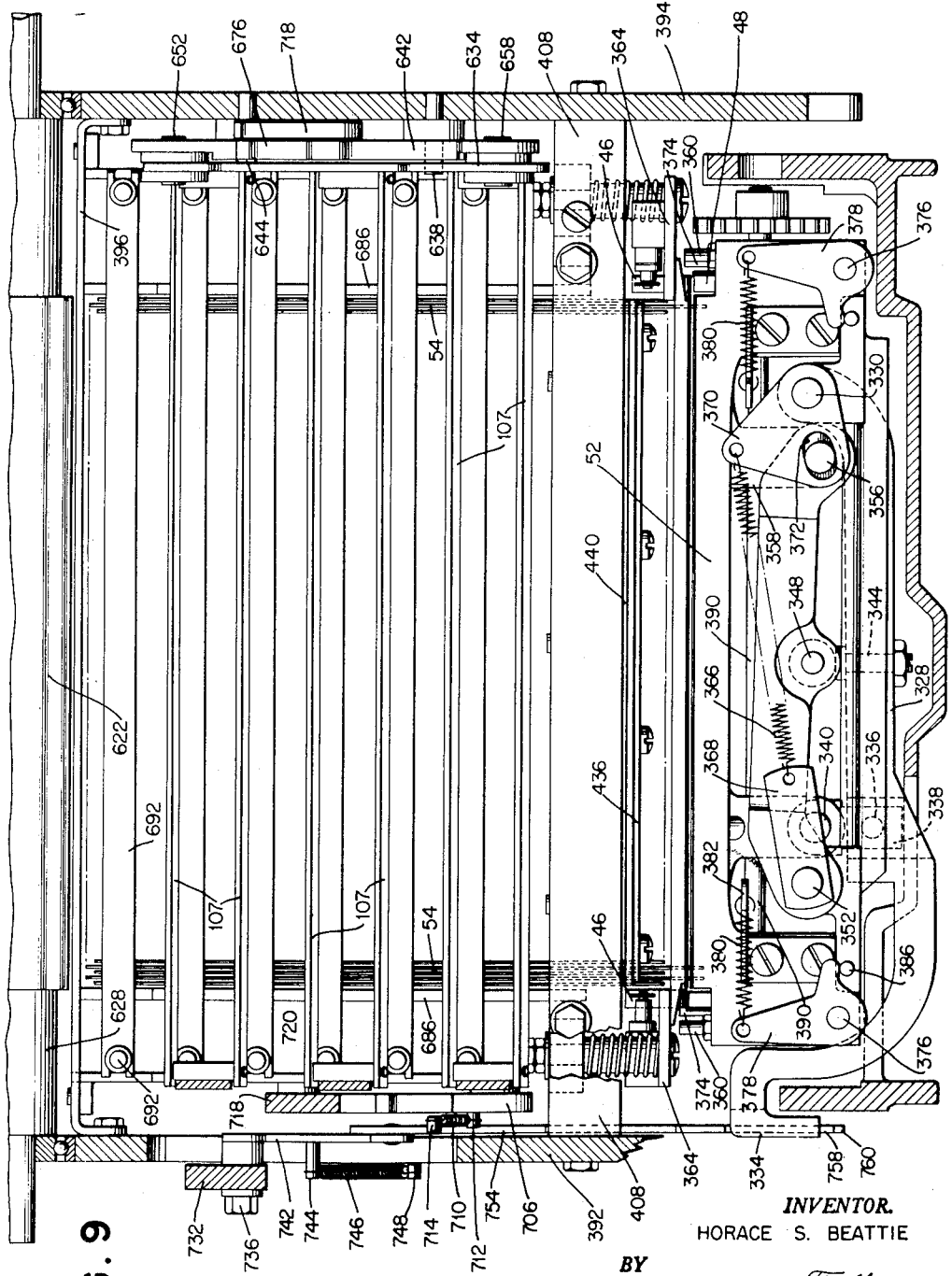

FIG. 9 is a vertical view taken along the line 9—9 of FIG. 8.

Figure 10:
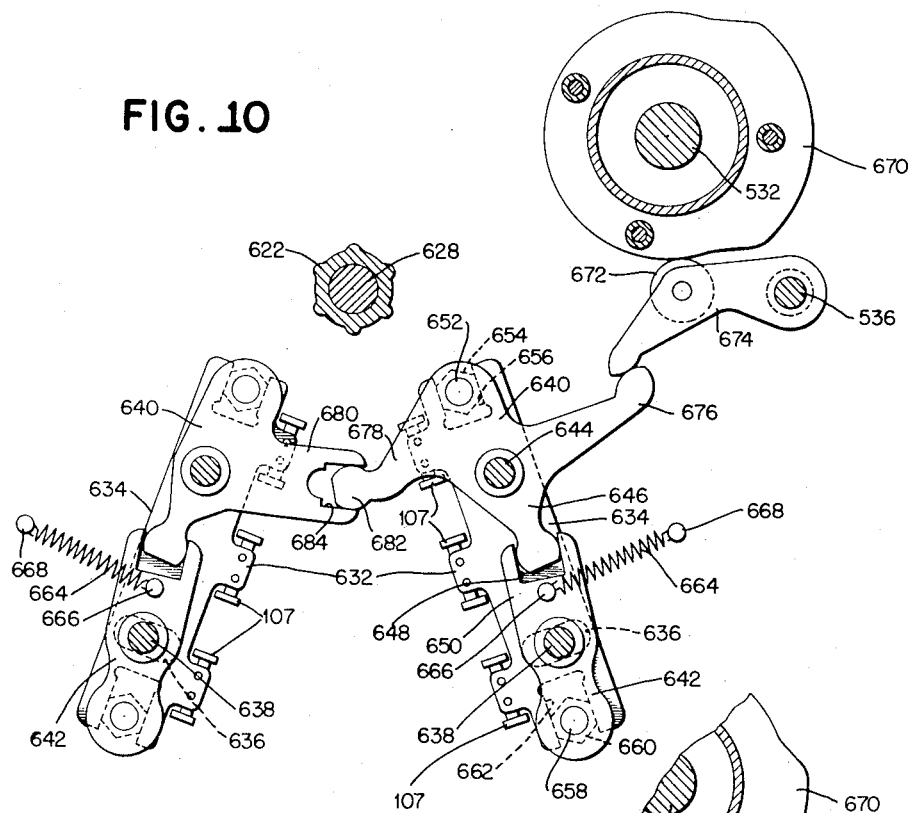

FIG. 10 is a vertical view of certain mechanisms taken along the section line 10—10 of FIG. 6.

Figure 11:
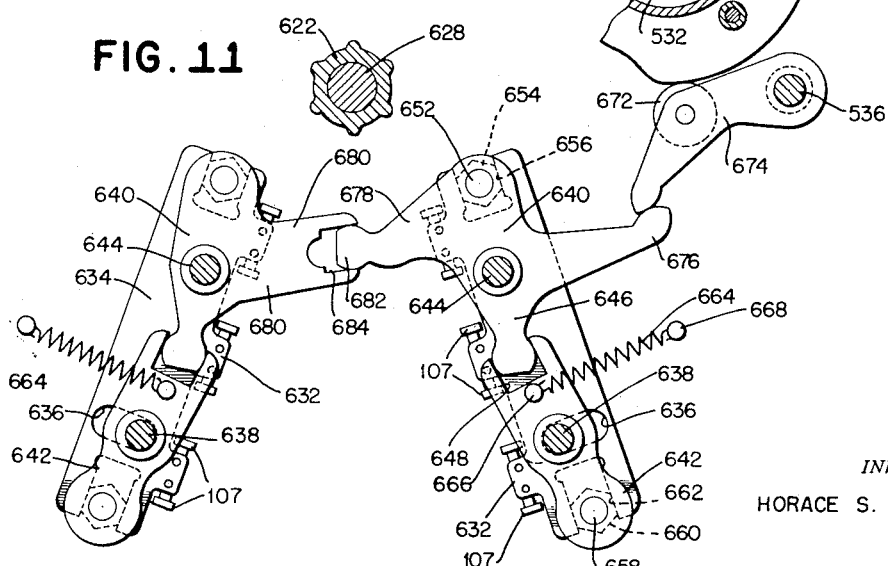

FIG. 11 is a view showing the apparatus of FIG. 10 in an operated condition.

FIG. 12 is an enlarged detailed view in perspective showing how the sensing pins are aligned with perforations in a record card at a sensing station.

Figures 13, 14:
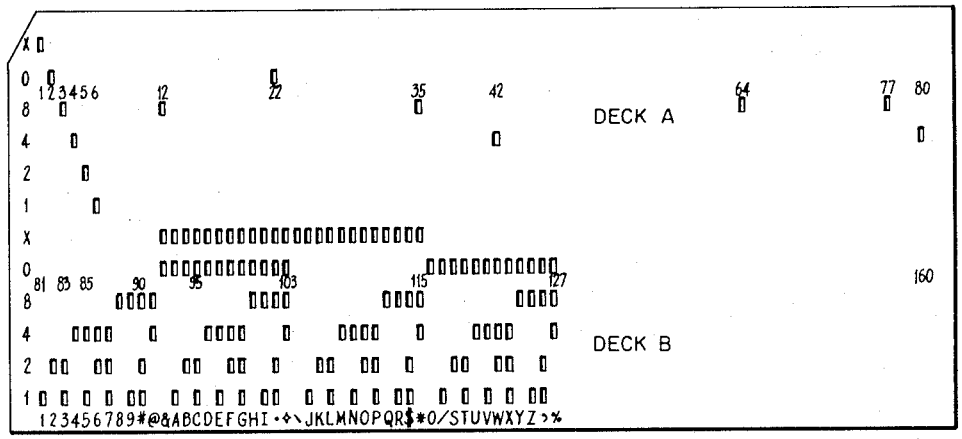

FIG. 13 is a view showing a double deck record card perforated according to the code employed.

FIG. 14 is a chart depicting the code employed.

FIGS. 15a and 15b, preferably assembled with FIG. 15a above FIG. 15b, disclose a timing chart of the various components of the inventive embodiment.

Figure 16:
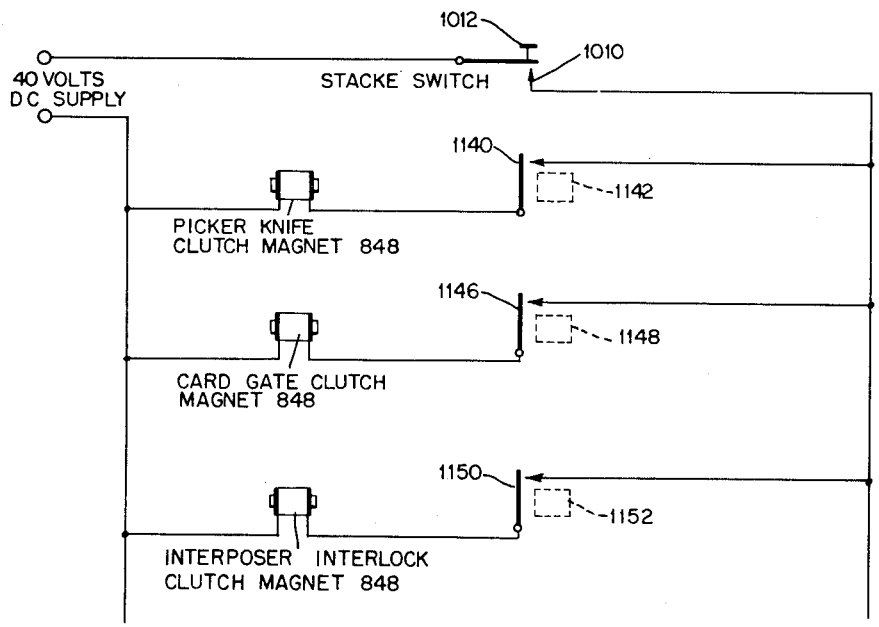

FIG. 16 is a schematic wiring diagram of the control circuits for the card feed unit.

*General*

The card feed unit is operated in step with the rest of the accounting machine in which it is employed. At a particular point in the main cycle of the accounting machine the bottom card of a group of cards in a hopper, generally indicated by the numeral 20, may be fed by a pair of feed knife assemblies, generally indicated by the numeral 22. The feed knife assemblies are reciprocable and advance the bottom card between a pair of upper and lower guide members 24 and 26 to where it is grasped by axially displaced pairs of continuously rotatable upper and lower feed rolls 28 and 30. The feed rolls extend through suitable openings formed in the respective guide members. As the card progresses through the guide member, it shifts a card lever 32 which may be employed to indicate to the accounting machine that the feed knife assemblies were operative to feed a card. The card also passes under a control brush 34 extending through an opening in the upper guide member 24 and cooperating with an electrically insulated plate 36 secured in an opening formed in the lower guide member 26. At a point thereafter the card is grasped by a second set of axially displaced pairs of continuously rotatable upper and lower feed rolls 38 and 40 which cooperate through suitable openings formed in the upper and lower guide members 24 and 26.

As the card leaves the upper and lower guide members 24 and 26, it is received by a second pair of upper and lower guide members 42 and 44. A third set of axially displaced pairs of continuously rotatable upper and lower feed rolls 46 and 47 cooperate through suitable openings formed in the guide members 42 and 44 and act to advance the card therebetween. The card is halted between the guide members by a card gate 50. This is possible because the lower feed rolls 48 only are positively driven while the upper feed rolls 46 are so biased toward the others that a card therebetween will be engaged with sufficient friction to move it only when the card is freely movable. The card is now in position to be sensed.

The card is sensed by raising an elevator platform 52 upon which the lower guide member 44 is mounted. It is held in place through the action of an adjustable eccentrically-mounted stop 53 which engages the underside of the gate 50 to maintain the latter's alignment with the card. As the elevator platform is raised, it is moved against the coplanar ends of the sensing pins 54. Opposite each end of the sensing pins the upper and lower guide members 42 and 44 and the card elevator 52 are formed with suitable openings so as to permit the passage of guide pins therethrough. The sensing pins will be prevented from entering the openings in the guide member 44 and in the elevator 52 at those index point positions in the card for which no perforations exist. Hence, the corresponding sensing pins will be shifted to a raised position. Conversely, the sensing pins for those index point positions which are perforated will be permitted to pass through the openings in the guide member 44 and the elevator 52 and hence will not be subjected to an endwise displacement.

After the sensing pins have been positioned, two sets of testing pins 56 are released. The test pins for the trailing card deck are disposed forwardly of the sensing pins and biased rearwardly, while those for the leading deck are disposed rearwardly of the sensing pins and biased forwardly. The testing pins corresponding to those sensing pins which were not displaced strike projections 58 extending forwardly on the upper staggered ends of the sensing pins for the trailing deck and rearwardly on the upper staggered ends of the sensing pins for the leading deck and are stopped in an intermediate position. (See, for example, the test pins for the 2 and 4 index point positions in FIG. 2.) The testing pins 56 for those sensing pins 54 which were raised miss the projections 58 and move to an advanced position in which they are stopped by recessed portions 60 formed in the sensing pins beneath the projections 58. (Examples are the test pins for the 1, 8, 0, and X index point positions in FIG. 2.) It is now apparent that the corresponding test pins for those index point positions which were perforated are stopped in an intermediate position while those test pins whose corresponding index point positions were not perforated are disposed in an advanced position. The disposition of the test pins forms the basis upon which the analysis for the digital value recorded in each deck column is carried out.

The analysis of the digital values recorded in each deck column is made by subjecting each test pin, if it is disposed in an intermediate position, to a downward displacement at those times during the following machine cycle that pulses normally received by the accounting machine are representative of digital values comprised of index point perforations which, if present with perforations at corresponding index point positions, are representative of other digital values. These downward displacements are effected by "hole" bails 62, of which there is one adjacent the trailing ends of each row of testing pins for like index point positions in each card deck and which miss those testing pins which are disposed in the advanced position. An operated "hole" bail thus lowers the respective test pins when perforations exist at corresponding index point positions. It is operated whenever the code elements of a digital value being tested for in each deck column are components of another digital value which includes perforations at the corresponding index point positions.

Each test pin is subjected to a downward movement also at those times that a corresponding index point position is a code element of the digital value being tested for. These downward movements are effected by "no-hole" bails 64, so called because the test pins held by them are effective upon corresponding interposers 66 only when no perforations exist at the corresponding index point positions, that is, when the test pin is in the advanced position. The "no-hole" bails are interposed with the "hole" bails for each deck.

Clearly, then, the operation of the "no-hole" bails determines whether the index point positions, which represent a particular digital value, have been perforated. The operation of the "hole" bails determines whether other index point positions, which, together with those being tested for by the "no-hole" bails, form other digital values, are perforated.

An interposer 66 is provided for each column on each half deck of a card. It is slidably mounted along the side of the trailing ends of the test pins for the corresponding deck column and is normally held against biased upward movement by one of two bails 68. These bails, which are located beneath the "hole" and "no-hole" bails of the associated deck, release the interposers for the period during which the pulses are normally received by the accounting machine in the main cycle. When the interposer bails release the interposers, the control of the interposer movement passes to the associated "hole" and "no-hole" bails through the intermediary of the test pins 56. Thus, one or more of these bails for each deck must restrain the upward movements of the interposers for that deck until such time that pulses received by the accounting machine would represent the digital values designated by the perforation or perforations present in the different deck columns.

The upward movement of an interposer to an advanced position results in the completion of a circuit between a common strip 70 for the deck involved and an insulated terminal bar 72 for the corresponding deck column. This is accomplished through the release by a corresponding rocker arm 76 having an electrically insulated tip 77 of a corresponding wire 74 electrically connected with the common strip 70. Each rocker arm 76 is normally biased so as to maintain the associated wire 74 out of contact with the corresponding terminal bar 72. It has, however, an arm 78 disposed in the path of the corresponding interposer rod 66 which is operative to rotate the rocker arm 76 so as to permit the biased wire 74 to engage the corresponding terminal bar 72. The interposer rod 66 is restored by the action of the "hole" and "no-hole" bails for the pulse representative of the digital value that is normally next received by the accounting machine.

A rocker arm 76 rotated by its associated interposer rod 66 is prevented from restoring immediately by the action of an associated biased latch pawl 80. A hook formed on the end of the latch pawl 80 normally is seated on the upper end of an extension 82 of the rocker arm 76 but drops behind it when the latter is rotated by the biased movement of the corresponding interposer rod 66. After a time interval sufficient to permit a respective one of twelve pulses emanating during the first part of each main cycle from an emitter (not shown) to be transmitted through the completed circuit, the latch pawl will be rotated to permit the biased rocker arm to rotate and restore the associated wire so as to break the circuit. Normally, the associated interposer rod will have been restored by the action of the "hole" and "no-hole" bails 62 and 64 testing for the next digital value.

When there are two or more digital values recorded in a deck column, as for example, when there is a numeric digital value and a zone digital value, it may happen that the pulses representative of these values are successively received by the accounting machine. A specific case would involve the "1" and the "0" digital values (see chart of FIG. 15a). In such an instance the corresponding interposer rod 66 would not be withdrawn from its advanced position after the "1" pulse, and the rocker arm 76 would be retained, even though the latch pawl 80 released it momentarily, in its rotated position in which the wire 74 maintains a completed circuit. This will cause no harm as the pulses through the circuit are not determined by the opening and closing of the wire 74, but rather by the emitter in the common circuit portion containing the common strip 70. The emitter may comprise a pair of circuit breakers which normally close and open the circuit after the wires 74 make and break the circuits so as to prevent arcing between the wires 74 and the insulated contacts 72.

In different programs under which an accounting machine may be operated, it may be desired to have cycles (such as program cycles) in which none of the data on cards at the sensing station is translated into differentially timed impulses. To accomplish this, the interposer rods 66 are prevented from moving upward to complete circuits even though perforations exist in the card at the corresponding sensing station. An interposer interlock acts upon each interposer bail 68 to prevent its rotation to the interposer rod releasing position. Each interlock consists of a lever 83 (FIGS. 2 and 6), the upper end of which is swingable from and to a position in the path of movement of the respective interposer bail 68. Thus, the interposer interlock must be operated to enable a translation of the data on the cards.

After the sensing pins 54 were positioned and while pulses are emanating from the emitter during the first portion of the following main cycle, the card elevator platform 52 was lowered to its original position. Thereafter, the card gate 50 may be raised above the card path to permit the card at the first station to be moved out from between the guides 42 and 44 to a position where its leading edge strikes a downwardly curved guide member 84. Cooperating through suitable openings formed in this guide member 84 are sets of pairs of continuously rotatable upper and lower feed rolls 86 and 88 which grasp the oncoming card and move it along to where it is received between a straight portion of the guide member 84 and a cooperating lower guide member 90. The card is advanced between the guide members 84 and 90 to where it is grasped by another set of pairs of continuously rotatable upper and lower feed rolls 92 and 94 cooperating through suitable openings formed in the upper and lower guide members 84 and 90, and which then act to advance the card between upper and lower guide members 96 and 98 above the card elevator platform 100 of a second sensing station. As the card is advanced between the guide members 96 and 98, it is grasped by still another set of pairs of continuously rotatable upper and lower feed rolls 102 and 104 which then act to advance the card to where it may be stopped by a card gate 106.

Practically simultaneously with the raising of the card gate 50 at the first sensing station, the knife feed assemblies 22 were actuated to advance a second card from the bottom of the hopper 20. This card was advanced to where it was stopped at the first sensing station by the gate 50 in the manner described hereinbefore. The timing of the feed knife assemblies is such that the second card arrives at the first sensing station at the same time that the first card arrives at the second sensing station.

At the end of the period during which pulses emanated from the emitter, the interposer bails 68 were lowered to withdraw all of the interposer rods 66 from the control of the "hole" and "no-hole" bails 62 and 64 which too were returned to their normal positions. As soon as this was accomplished, the test pins 56 for the trailing and leading decks were restored by the bail members 107 respectively movable forwardly and rearwardly. As soon as the test pins were cleared out of the path of the projections 58 of the sensing pins 54, these pins are lowered by the action of bail members 108. A bail member 108 is mounted over the upper end of the sensing pins for each row of index point positions and is movable downwardly from a normal position to restore them. It may be remembered that elevator platform has already been restored. The bails 108 are immediately restored so as not to interfere with the subsequent sensing operation. The card elevators may now be raised to sense the reading of the respective cards in the manner described above.

Both of the sensing stations will now be operated as described heretofore with respect to the first sensing station. During the period in which pulses emanate from the emitter, the elevators 52 and 106 for the first and second sensing stations will be lowered. If there is to be a re-reading of the same set of cards, the card gates 50 and 106 will not be raised, and the card will be prevented from advancing under the actions of the feed rolls 46 and 48, and 102 and 104. In such a case, the feed knife assemblies 22 would not be reciprocated.

When there is to be no further reading of the cards at the respective stations, the card gates 50 and 106 are raised to permit the cards at the respective stations to advance, and the feed knife assemblies 22 will be operated to move the next card on the bottom of the set of cards in the hopper 20 to the first sensing station. The card at the first sensing station will arrive at the second sensing station simultaneously with the arrival of the third card from the bottom of the feed hopper at the first sensing station. Card gates 50 and 106 will have restored to the down position to stop the cards in the fashion explained before.

The card in leaving the second sensing station strikes a curved guide member 109 which deflects it downward and forward. Cooperating through the guide member 109 are a set of pairs of continuously rotatable feed rolls 110 and 112 which grasp the card and advance it along the inside of the curved guide member 109 to where it is grasped by a set of pairs of continuously rotatable feed rolls 114 and 116 also cooperating through suitable openings in the guide member 109. As the card passes between the feed rolls 114 and 116, it shifts a card lever 118 extending through an opening in the curved guide member 109 and continues on around the inside of the curved guide member 109 to where it is grasped by a continuously rotatable stacker generally indicated by the numeral 120.

The rotation of the stacker 120 is synchronized with the operation of the card gate 106 and the passage of the card along the inside of the curved guide member 109. The stacker is provided with two sets of transversely spaced spring fingers 122 which are cammed away by rollers 124 from a drum 125 so as to allow the leading edge of the oncoming card to be received between the fingers and the drum. This is possible even though the peripheral speed of the drum is equal to the linear speed of the card because of the different directions of travel at time of initial contact. After the leading edge of the card has been received, the rollers 124 allow the spring fingers 122 to move back to their normal position in which they bear against the drum 125. This holds the card to the drum and, as the drum rotates, the card is carried around to a stacker tray 128.

The stacker tray is provided with extensions which project into the path of the card coming around on the drum and intercept the same. At the same time the rollers 124 operate again to open the spring fingers 122 so as to release the card in a vertical position on the stacker tray. Thus, the cards are positively stacked in the same order that they are fed from the bottom of the set of cards in the feed hopper 20. A biased plate 130 holds the stacked cards flatwise against the drum and recedes along the stacker tray 128 as the cards are stacked.

*Structural organization*

Figure 1C:
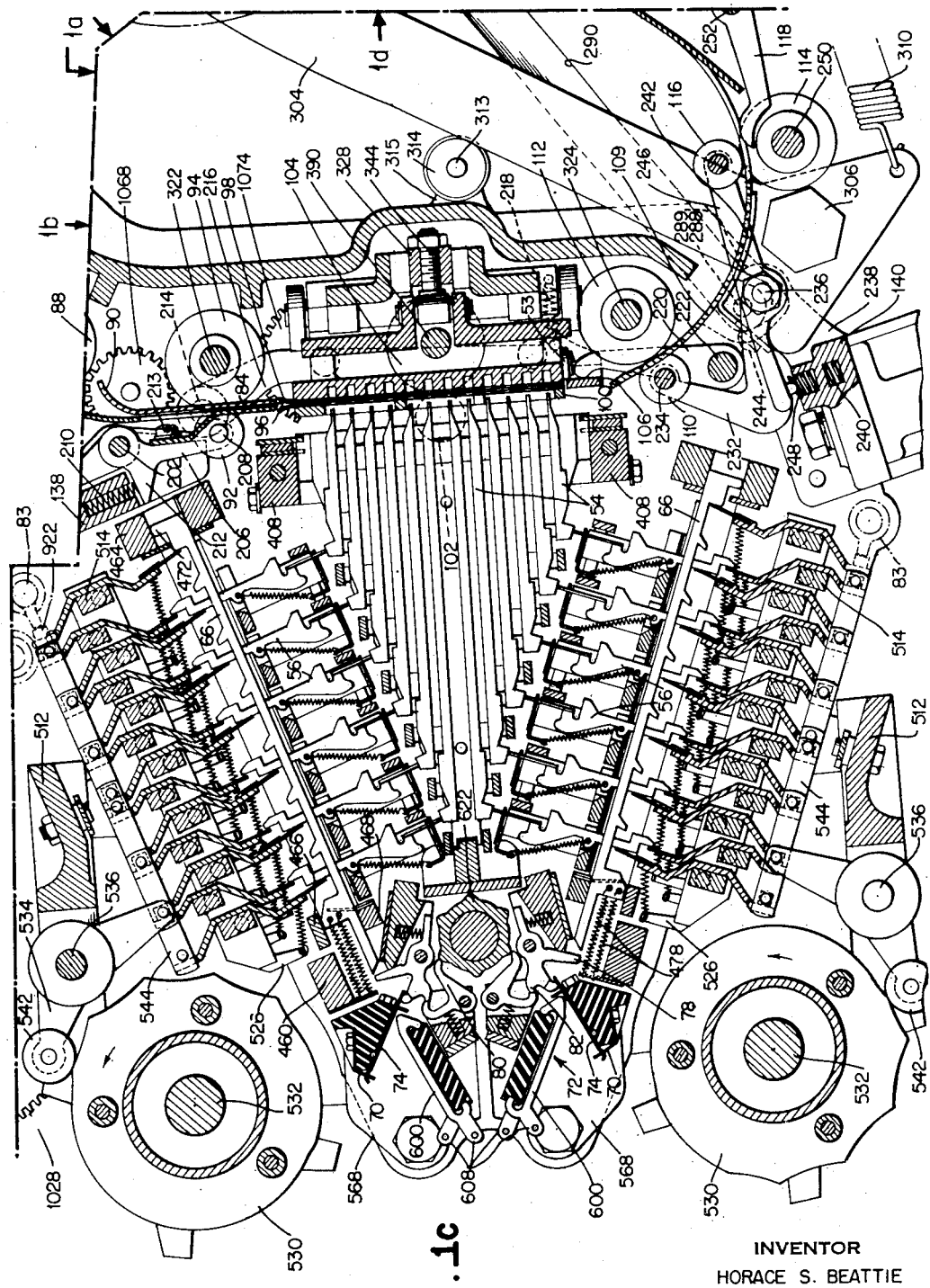

The main framework of the card feed unit comprises a pair of left and right vertical side plates 132 and 134 (FIG. 3). These plates are held together as a rigid unit near the forward end by a transverse brace 136 (FIG. 1a) and at an intermediate point by a transverse brace 138 (FIGS. 1b and 1c). A brace 140 (FIG. 1c) located along the rearward and bottom end of the side plates not only serves to hold the plates in spaced relation with respect to each other but also constitutes a means by which the side plates and, thus, the whole unit are supported on the accounting machine. At the front end of the unit, the side plates are supported upon horizontal transversely extending surfaces of the accounting machine by horizontal blocks 142 secured to their exterior surfaces.

Structurally, various assemblies are attached to the main framework as follows: At their upper forward end, the vertical side plates 132 and 134 support the card hopper 20. Extending generally from the front to the rear of the unit in between the side plates is a swingable and slidable card bed or pan assembly, generally indicated by the numeral 144, which mounts the lower ones of those cooperating elements, including the card elevator platform 52, which define a passageway for the record cards. The card pan assembly 144 is movably mounted not only to permit easy access to the card passageway so as to facilitate the removal of jammed cards but also to permit ready access to otherwise internally located components. Mounted upon the upper end of the framework at what comprises the first sensing station is a translator assembly, generally indicated by the numeral 146 (FIGS. 1a and 1b), which translates perforations at the physically spaced card index point positions into time spaced pulses. Supported upon the rearward end of the backward portion of the framework at what comprises the second sensing station is a second translator assembly generally indicated by the numeral 148 (FIG. 1c). In between the translator assemblies 146 and 148, respectively comprising the first and second sensing stations, there is fixed to the upper side of the framework a clutch mounting assembly 150 (FIG. 1b). On the lower portion of the framework and generally beneath the card pan assembly 144 and the hopper 20 there is located the stacker assembly 152.

In addition to the above mentioned assemblies, other components of the machine attached directly to the main framework include upper ones of those cooperating elements which define the card passageway. Thus, rolls 28 are fixed upon a shaft 154 (FIG. 1a) extending through generally vertical slots in the side plates and attached to the free ends of arms 156 pivotally mounted upon aligned studs 157 projecting from the exterior surfaces of the side plates. Tension springs 158 anchored to lugs 160 formed on the free ends of arm 156 and to the respective side plates urge the shaft 154 downward to where the rolls 28 engage the rolls 30, or if the rolls 30 have been removed, to where the shaft 154 engages the bottom of the slots in which it is mounted.

Behind the shaft 154, a shaft 162 (FIGS. 1a and 5a) is mounted in the side plates. Shaft 162 is fixed to the card lever 32. On its left hand end, the shaft 162 is fixed to a lever 164 (FIG. 5a). A link 166 is pivotally connected at one end to the free end of lever 164 and extends downwards between a pair of guide screws 168 to where it engages the transfer leaf of transfer contacts 170. A tension spring 172 acts upon lever 164 to bias the card lever into a position in the card path, and in which the upper points are closed. When a card is fed from the hopper 20, the card lever is deflected to where the normally open points of the transfer contacts are closed. The transfer contacts are employed to indicate to the accounting machine that another card has been properly fed from the hopper.

In between the card lever shaft 162 and the roller shaft 154, the upper guide plate 24 is attached to the brace bar 136. The plate 24 is formed at each end with offset portions 174, and these are fastened to the underside of brackets 176 depending from the brace bar. The offset portions 174 are connected with the rest of the plate 24 with diagonally extending material 178.

The upper rolls 38, of which there are two, one adjacent each side edge of the guide plate 24, are mounted on inwardly directed studs 180 carried by free ends of levers 182. The levers 182 are mounted at their other or forward ends on a shaft carried by the brackets 176 depending from the brace bar 136. Compression springs 184 recessed in the brace bar engage shoulders formed on the respective levers 182 to urge the rolls 38 into engagement with the rolls 40.

The card gate 50 (FIGS. 1a and 1b, and 5a and 5b) is swingable about inwardly directed studs 186 carried by the side plates 132 and 134 below the levers 182. To this end, the gate, which is a straight bar of some thickness that extends beyond the sides of the card path, is secured at each of its ends to the free ends of relatively long levers 188 pivoted at their forward upturned ends upon the studs 186. Tension springs 190 anchored at their upper ends to the respective levers 188 and at their lower ends to the respective side plates bias the gate 50 downwardly to a normal position in the card path. The gate is moved upwardly from this biased position by levers 192 fixed at their rearward ends to a shaft 194 carried by the side plates 134 and 136. At their forward ends the levers 192 are formed with rounded ends with which they engage the underside of the gate 50. When a lever 196 fixed to the right hand end of shaft 194 is swung counterclockwise, as seen in FIGS. 1 and 5, the levers 192 raise the gate 50 to a position above the card path wherein it will permit a card to leave the first sensing station.

Overlying the shaft 194 are two curved levers 198 formed on their forward ends with studs 200 which rotatably support the upper rolls 86. Levers 198 are rotatably mounted at their rear ends on the opposite ends of a transversely extending rod 202 carried by spaced brackets 203 depending from the brace bar 138. Compression springs 204 seated in holes formed in the transverse brace bar 138 engage shoulders formed on the levers 198 to urge the respective rolls 86 through openings in the upper guide plate 84 and into engagement with the rolls 88 or a card therebetween.

Also rotatably mounted on the rod 202 are the forward or upper ends of levers 206. The levers 206 rotatably support, on studs 208 formed on their lower or rearward ends, the upper feed rolls 92. Compression springs 210 seated in holes formed in the brace bar 138 engage lugs 212 formed on the respective levers 206 to urge the rolls 92 downward through appropriate openings in the upper plate 84 and into engagement with the rolls 94.

The upper guide plate 84 may also be supported by the depending brackets 203 of the transverse brace bar 138. Thus, portions of the plate may be partially cut out and offset so as to be conveniently attached to the underside of the brackets as by screws 213.

Generally below the levers 206 and upon the side plates 132 and 134 are located the inwardly directed studs 214 for the card gate 106 of the second sensing station. The card gate is swingably mounted on these studs by the forward or upper ends of levers 216 to which it is rigidly attached at their rearward or lower free ends. Tension springs 218 anchored to the levers 216 and the respective side plates 132 and 134 urge the gate 106 to a normal position in the card path.

Card gate 106 is raised out into the card path by levers 220. The levers 220 are mounted at their rearward or lower ends on a shaft 222 rotatably mounted in the side plates 132 and 134. Their forward ends are rounded and engage the underside of the gate 106 so as to raise it above the card path when a lever 224 is rotated counterclockwise, as seen in FIG. 5b.

Counterclockwise rotation of the levers 224, which themselves are biased clockwise to inoperative positions by tension springs 226 anchored to them and the respective side plates 132 and 134, is effected through a link 228. The lower end of the link is pivotally connected to the free end of the lever 224, while the upper end is pivotally connected to the free end of a lever 230 fixed at its other end to the shaft 194 carrying the operating levers for the first card gate 50. It can be seen that when the lever 196 is rocked counterclockwise to raise gate 50, the card gate 106 will also be raised.

Straddling the shaft 222 are curved levers 232 (FIG. 1c) formed on their forward or upper ends with studs 234 which support the upper feed rolls 110. The lower or rearward ends of these levers are rotatably mounted on a rod 236 carried by brackets 238 extending forwardly from the transverse brace bar 140. Compression springs 240 seated in holes formed in the upper surface of the brace bar 140 engage curved portions of the levers 232 to urge it clockwise to where the rolls 110 engage the rolls 112 or a card therebetween.

Also supported by the brackets 238 extending forwardly from the brace bar 140 is the guide plate 109. The guide plate is provided with brackets 242 welded to it and secured to upper sides of the brackets by screws 244.

The rod 236 also rotatably supports at its opposite ends levers 246 having studs on their lower free ends upon which the feed rolls 116 are mounted. The levers 246 are mounted on the shaft 236 intermediate their ends, and their upper free ends extend to above the brace bar 140. Here they are engaged on their undersides by compression springs 248 seated in holes formed in the upper surface of the brace bar 140. The compression springs 248 urge the levers 246 clockwise, as seen in FIG. 1c, to where the rolls 116 engage the rolls 114 or a card between them. The rolls 114 are non-yieldably mounted on opposite ends of a shaft 250 carried by the side plates 132 and 134.

Behind the shaft 250 along the card path is a shaft 252 (FIGS. 1c and 1d and 5a). Shaft 252 is fixedly secured to the card lever 118 and rotatable thereby. The left hand end of shaft 252 extends through the side plate 132 to where it is fixedly secured to the rear end of a lever 254. The free end of lever 254 is pivotally connected to the lower end of a link 256 slidably supported at its upper end by guide screws 258. The upper end of the link 256 engages the transfer leaf of a set of transfer contacts 260.

A spring 262 urges the card lever 118 through a suitable opening in the guide member 109 to where it may be deflected downward by a passing card. When this happens, the link 256 is raised to open normally closed points and close normally open points of the transfer contacts 260. Thus, the transfer contacts 260 may be employed to signal to the accounting machine that a card that was at the second sensing station is passing to the stacker 120.

*Hopper assembly*

The hopper assembly 20 (FIGS. 1a, 3, and 5a) is located at the front end of the card feed unit where it may conveniently receive a set of record cards which are to be sensed and analyzed. It includes a casting 262 which serves as the bottom of the hopper. The base casting 262 is supported upon the side plates 132 and 134 through horizontally extending blocks 264 to which it is secured by means of screws 266. These blocks are suitably fixed directly to the inside surfaces of the side plates 132 and 134. Extending upwardly and rearwardly from the rear end of the base casting 262 is a rear wall or plate 268 against which the cards in the hopper normally come to rest by gravity action. The plate 268 is supported in this position by suitable screws which extend into its lower extremities through corresponding apertures formed in the side walls 132 and 134. Projecting forwardly from the surface of this rear wall, and secured thereto as by screws 269, are a pair of transversely separated wings 270. The wings serve to align the side edges of the card. Mounted in the base casting 262 in suitable slots formed therein are two transversely spaced pairs of slides 272. These slides support the feed knife assemblies 22 which are operative when reciprocated to advance the bottom card from the hopper. The front ends of the slots are closed off by vertically extending brackets 273 secured to the casting 262 with screws 274. Brackets 273 also close off the lower front side of the hopper and prevent cards from being tossed out by friction with the reciprocating knife assemblies.

The feed knife assemblies 22 each comprise a picker knife frame 275 which is mounted in the corresponding pair of slides 272. Rotatably mounted, in a well known manner, on the forward end of the respective picker knife frames are picker knife blocks 276 to which are adjustably secured the picker knives 278 by which the bottom and only the bottom card is grasped. The picker knife blocks are rotatably secured to the picker knife frames in order to permit the knife edges to conform to bends of the bottom cards.

At the rear end of the bottom of the hopper there is a space between the casting 262 and rear wall 268 above it for the feeding of cards from the hopper. In this space there is an adjustable throat designed to prevent more than one card from passing onward toward the first set of continuously rotatable feed rolls 28 and 30. This throat is comprised of a slide member 280 adjustably secured to the rear wall 268 for upward and downward movement by headed screws 282 extending through vertical slots therein. A roller 284 suitably carried by a block 286 is adjustably secured in the base casting 262 so as to permit precise adjustment, in the longitudinal direction, of the throat.

*Card bed assembly*

The card bed 144 constitutes a movable platform upon which are mounted the elements defining the bottom side of the card path. Hence, the card bed has a longitudinal shape corresponding generally to that of part of the card path, and as may be best seen in FIG. 1, this shape is that of an inverted, though somewhat flattened, V. Its transverse cross section is that of a spread H, that is, it consists of two side flanges interconnected by a web. The card bed is located between the side plates 132 and 134 of the main frame and is pivotally and slidably supported at its rearward end thereon by studs 288. The studs are fixed to the end of the card bed and project outwardly to where rollers 289 mounted thereon may be received in longitudinally extending grooves 290 formed on the interior surfaces of the main frame side plates 132 and 134. The rear ends of the grooves are sharply downturned to resist initial sliding displacement of the feed bed.

The forward end of the card bed is locked in a raised cooperating position with the elements defining the upper side of the card path by means of transversely extending rods 292 and 294 (FIG. 1a). The rods are slidably supported by the card bed and, when they are displaced transversely, are respectively received in suitable openings formed in the side plates 132 and 134. Transverse or endwise movement is imparted to these slidable rods by rotating a handle 296. The handle is fixed to a shaft 298 which is vertically mounted between the rods and provided with a fluted portion 300 cooperating with complementary fluted portions 302 provided on each of the rods. When the shaft is rotated so as to withdraw the slidable rods from their openings in the side plates, the forward end of the card bed, which terminates just behind the hopper assembly 20, may be lowered. The card bed may then be pulled forwardly with the rearward end of the card bed being supported by the rollers 289 in the grooves 290 formed in the side plates 132 and 134.

This shifting of the card bed is facilitated by a pair of right and left hand balance arms 304 located beneath the card bed adjacent the opposite sides thereof. The balance arms 304 (FIGS. 1 and 3) are pivotally secured at their rearward ends by means of stud bolts 306 to the interior surface of main frame side plates 132 and 134. A downwardly extending lug 308 formed on each of the balance arms is connected to one end of a tension spring 310 that is anchored at its other end to an inwardly projecting stud 312 carried by the associated side plate. The tension springs 310 urge the balance arms upward. The balance arms engage the card bed through guide rollers 314 mounted on inwardly extending studs 313 secured to the brackets 315 depending from the flanges on the underside of the card bed. They thus counterbalance the weight of the card fed and facilitate its handling. It will be apparent that in this manner there has been provided means by which jammed cards may be readily removed from the card path and by which service may be had upon otherwise inaccessible parts.

The elements defining the bottom side of the card path are mounted in the generally longitudinally extending channel on the upper side of the card bed; extending across the channel at its forward end and fixed upon the upper edge side flanges of the card bed is the lower guide plate 26. Located beneath the forward end of this guide plate and rotatably mounted in the side flanges is a shaft 316 supporting the bottom feed rolls 30 of the first set of feed rolls. Located underneath the rear end of the guide plate 26 and mounted in the card bed side flanges is a shaft 318 which supports the lower rolls 40 of the second set of feed rolls. The feed rolls 30 and 40 are integrally fixed to the shafts 316 and 318, respectively, for rotation thereby.

Located rearwardly of the shaft 318 and of the lower guide plate 26 is the mechanism for elevating the platform 52 of the first sensing station. The elevator mechanism is secured upon the web of the card bed.

At the bend of the V in the card bed there is mounted in the side flanges a shaft 320 which supports the lower feed rolls 88 of the set of feed rolls immediately following the first sensing station. Rearwardly of this shaft there is mounted across the channel and fixedly secured to the upper edges of the vertical side flanges the lower guide plate 90. A shaft 322 is rotatably secured beneath the rear end of the guide plate 90 in the vertical side flanges and supports the lower feed rolls 94 which extend through suitable openings in the guide member 90 into the card path. Rolls 88 and 94 are fixed to rotate with shafts 320 and 322, respectively.

Following the shaft 322, the card bed supports the elevator mechanism for the second sensing station. After the second sensing station, a shaft 324, rotatably mounted in the side flanges, supports and drives the lower feed rolls 112. The terminus of the card bed is a short distance beyond the shaft 324 whereat are mounted the studs 288 by which the card bed is pivotally and slidably supported in the feed unit.

Elevator mechanism

The elevator mechanisms (FIGS. 1a, 1b, 1c, 6, and 9) for the respective sensing stations are exactly alike, and for this reason only the one for the first reading station will be described in detail. This elevator mechanism includes a base casting or plate 326 which is secured, as by screws, upon the horizontal web of the card bed 144. The platform 52 in its normal or down position rests directly upon this base plate through legs 327.

The motive force for raising the platform 52 is applied through a transversely extending lever 328. The lever 328, which is pivoted at its right hand end on a longitudinally extending pin 330 supported by upstanding lugs 332 formed upon the right hand end of the plate, projects through an elongated transverse opening formed in the bottom of the plate 326 and around the left hand end of the elevator mechanism to where it extends across the left hand flange of the card bed and terminates in a downwardly directed portion 334. At an intermediate point just inside the opening formed in the base plate, the lever is connected by a pin 336 to a positioning link 338. The upper end of this link 338 is connected by a pin 340 to a pair of depending lugs 342 formed on the underside of the platform 52. It should be observed that the pin 340 carried by these lugs is normally located beneath a horizontal center line pasing through the pin 330 upon which the lever 328 is pivoted.

Between the pins 336 and 330 the lever 328 mounts an adjustable bearing screw 344. The upper end of this bearing screw engages a roller 346 mounted on a pin 348 carried by a lever 350 pivotally connected on its left hand end by a longitudinally extending pin 352 to a set of lugs 354 extending upwardly from the left hand end of the base plate. This pin 352 is located on the same horizontal center line that passes through the pin 330 pivotally mounting the lever 328 on its right hand end. The right hand end of the lever 350 is connected by a pin 356 to a pair of depending arms 358 mounted on the underside of the right hand portion of the elevator platform 52. It may be noted that a horizontal center line passing through pin 356 is below the horizontal center line passing through the pins 330 and 352 but on the same horizontal center line passing through the pin 340.

It will be evident now that when an upward force is applied to the left hand end of the lever 328, an upward force is applied to the left hand end of the platform 52 through the positioning link 338 and to the right hand end of the platform by the bearing screw 344 through the lever 350 swingable about its left hand end. The parts are so proportioned that, for in the range of movement necessary to effect the setting of the sensing pins, the platform is raised substantially evenly.

It will be recalled from trigonometry that, for angles near zero, the rate of change in the cosine of these angles is substantially nil. Since the lever 350, to which the right side of the platform is connected, swings, while raising the platform, from a position slightly below horizontal to a position slightly above horizontal, it follows from the law of cosines that the amount of lateral translation undergone by the platform is almost nothing. The slight lateral translation which does take place is tolerated as respects the lever 328, in an otherwise four bar linkage system, by the vertical link 338. The link also takes advantage of the cosine law in that in the down position of the platform the pivot pin 340 is slightly to the left of the pivot pin 336, thus permitting a rightward horizontal movement on the part of the platform without substantially affecting the effective length of the link and the level of the platform.

In order to obtain perfect alignment between the corresponding openings in the platform supported guide plate 44 and in the guide plate 42 thereabove, the four corners of the platform, outside of the card path, are provided with upstanding studs 360. These studs are received in corresponding holes 362 formed in a horizontally and vertically movable support member 364 for the upper guide plate 42. The upper guide plate therefore undergoes horizontal movement in a transverse direction along with the bottom platform guide plate 44. It will be appreciated that the horizontal movement to which the upper guide plate 42 is subjected is not undesirable in that it provides for a sweeping action against the lower ends of the sensing pins, thereby insuring that the sensing pins will be received in the corresponding openings in the upper guide plate.

The studs 360 also serve the additional purpose of fixing the minimum spacing between the guide plates 42 and 44 to prevent binding of the card and loading of the guide plates which might result in their deformation. To this end the openings 362 in the support member 364 which receive the studs on the platform are of a predetermined depth. It will be apparent that, after the studs reach the ends of the holes, the upper guide plate 42 moves upwardly with the bottom guide plate 44.

The platform 52 is continuously biased to its normal or down position of rest on the plate 326. Thus, when a raising force applied to the lever is withdrawn, the platform automatically returns to its down position in which the guide plates 42 and 44 are clear of the sensing pins. The bias is obtained from two springs 366 (FIGS. 8 and 9), one of which is located in front of the platform and the other of which is located behind the platform. The springs 366 are respectively anchored at one end through links 368 to the fixed pin 352. The other ends of the springs are connected to the upper free ends of the bell cranks 370 pivoted at their lower ends about the fixed pin 330. The lateral free ends of the bell cranks are pivotally and slidably connected by means of slots 372 to the pins 356 carried by the arms 358 depending from the platform. The springs 366 thus continuously exert a downward force on the platform which automatically restores it when the raising force is removed from the lever 328.

As pointed out earlier, the longitudinal movement of a card is stopped by the card gate 50. The gate, thus, accurately locates the card in the longitudinal direction. The cards are located in the transverse direction by pairs of card aligners or levers 374 located at each end of the platform. These aligners are normally located in an out-of-the-way position, but when the platform is raised, each pair is moved inwardly to shift the card inwardly if it is off center in that direction.

The levers 374 of each pair are longitudinally spaced and project slightly above the bottom guide plate 44. They are fixed at their lower ends to a longitudinally extending shaft 376 rotatably supported by the associated legs 327 of the platform 52. At their front ends, the shafts 376 are fixed to levers 378. The upper free ends of the levers 378 are biased inwardly by springs 380 anchored to the respective levers and to brackets 382 projecting forwardly from the platform. Each of the levers is provided at its lower end with a lug 384 which extends towards the other and normally rests upon a corresponding stud 386 fixed to the base plate 326 because of the action of the springs 380. The parts are so designed that when the platform is lowered, the lugs 384 of the descending levers 378 strike the respective studs 386 to rotate the levers 378 outwardly and swing the card aligners 374 to an out-of-the-way position. When the platform is raised, the levers 378 are permitted to rotate inwardly under the action of the springs 380 because the pivot points of the levers 378, that is, the shaft 376, are raised with respect to the forwardly extending studs 386. These actions are then transmitted through the shafts to the card aligners 374 which move inwardly to shift a card if it is off center in the respective direction.

As best seen in FIG. 6, the platform carries, in left and right hand bearings 388, a shaft 390 on which are fixed the feed rolls 48. The feed rolls 48 are located beyond the left and right hand edges of the platform 52. It will be apparent that the sensing station rolls engage the cards at their ends beyond their perforated areas so as not to interfere with the sensing operation. The shaft 390 lies wholly within the card bed 144, that is, it does not extend through the vertical side flanges thereof.

Translator units

Like the card gate assemblies, the translator assemblies 146 and 148 (FIGS. 1, 2, 5, 6, 8, and 10) of the respective sensing stations are of like construction. Each translator unit is a compact construction mounting an assembly bearing the sensing pins 54 for that sensing station, two opposed assemblies bearing the interposer rods 66 for respective card decks and also supporting assemblies containing the test pins 56 for the respective rows of index point positions in the corresponding deck, assemblies containing the contact elements 72 and 74, and operating mechanism for the interposer rods and for the elevator mechanism described previously, and restoring mechanisms for the sensing pins and the test pins. As its basic framework, a translator (FIGS. 1a, 1b, 5 and 6) unit includes a pair of transversely spaced vertical side plates 392 and 394 which are rigidly interconnected by a horizontal plate 396. The length of the plate 396 is such as to space the side plates 392 and 394 a distance whereby they will be received in recesses 398 cut in the inside surfaces of the vertical side plates 132 and 134 of the main frame for the card feed unit. The side plates descend into these recesses until blocks 400 secured upon the outer surfaces thereof come into rest with the upper edges of the respective main frame side plates. The blocks 400 carry downwardly projecting studs 402 which are received in corresponding openings formed in the upper edges of the side plates 132 and 134 and which act to fix the longitudinal location of the associated translator unit with respect to the main frame. The translator unit is secured to the main frame by means of screws 404 extending through the blocks 400 and threaded in the main frame side plates.

Sensing pin assembly

The sensing pin assembly (FIGS. 1, 2, 6, and 10) of a translator unit is located in the lower center portion of it. Its framework consists of a pair of longitudinally extending transversely spaced bars 406 which are rigidly interconnected at their respective forward and rearward ends with transversely extending bars 408. It is removably mounted between the side plates 392 and 394 of the translator unit by means of bolts 410 which extend through the side plates 392 and 394 and are threaded in the ends of the transversely extending bars 408 which are snugly received between the side plates. The recesses 398 in the main frame side plates 132 and 134 are further cut away to form grooves 412 which accommodate the heads of the bolts 410.

Rigidly secured at their lower ends to the opposing faces of the tie bars 404 are vertically extending plates 414 (FIG. 10) generally triangular in shape. The top ends of these triangularly shaped plates are rigidly interconnected by a brace bar 416. The upper side of this brace bar 416 is provided with two upwardly extending studs 418 which are received in corresponding openings formed in the brace bar 396 (FIGS. 1 and 2) interconnecting the side plates 392 and 394 of the translator unit. The two studs 418 thus serve as a locating and fixing means for the upper end of the sensing pin assembly.

The sensing pin assembly contains sensing pins 54 for effecting a simultaneous reading of both decks of a card at that sensing station. However, the projections 58 on the pins for the trailing deck face forwardly while those for the leading deck face rearwardly. As pointed out earlier, the pins for the respective index point positions for each column are gradated in length so that projections thereon may be conveniently engaged by its restoring bails 108 and the test pins 56.

While only one sensing pin could have been provided for each index point position, two have been provided (FIGS. 9 and 12) to insure the sensing of a perforation even though the card is slightly misaligned. The dimensions and the spacings of the sensing pins are such that with perfect card registration both pins for a corresponding index point position will pass through a perforation thereat. Card misalignment can be tolerated to the point where only one sensing pin can pass through the corresponding perforation, as the presence of only one projection 58 in the path of the test pin for the corresponding index point position is sufficient to stop the test pin in the intermediate position.

Each sensing pin 54 is formed of a relatively thin flat piece of spring steel that is bowed slightly. This enables the pins to be frictionally held in any position to which they are displaced. The pins are mounted in stamped steel frame assemblies 420 that allow for longitudinal movement only of the pins.

A stamped steel frame assembly (FIGS. 8, 9, and 10) is provided for each card column, that is, for each pair of aligned deck columns. Each assembly is formed of a triangular shape so that the upper ends of the gradated sensing pins 54 bearing the projections 58 are exposed. Each assembly consists of two outside guide plates 422 that are secured in spaced relation to a center mounting plate 424. The right and left hand sensing pins for each column of card index point positions are mounted between the right and left hand guide plates 422 and the center mounting plate 424.

The guide plates 422 are spaced from the mounting plate 424 by inwardly pressed portions 426 (FIG. 8) formed in the guide plates 422. A pair of upper and lower pressed-in portions normally separates each sensing pin from an adjacent sensing pin and stabilizes it vertically. The forward and rearward sensing pins of each card column, however, are held in place at their forward and rearward edges, respectively, by especially elongated pressed-in portions 428. The pressed-in portions 430 (FIG. 8) separating the adjacent end sensing pins of each pair of aligned deck columns are especially broad. This is so because the pins for the respective decks face in opposite directions and, as may be seen in FIG. 2, have their reduced lower ends aligned with the edges opposite the edges from which the projections 58 extend. Since the index point positions on a card are equally spaced, it follows that the adjacent pins of each pair of aligned deck columns must be spaced slightly further apart than the normal spacing in order to obtain even spacing of their lower perforation piercing ends. The guide plates 422 may be secured to the mounting plate by spot welding pressed-in portions with the mounting plate.

The center mounting plate 424 of each sensing pin frame assembly 420 engages the sensing pin supporting frame at three points. Adjacent its forward and rearward edges the center mounting plate is formed with forwardly and rearwardly extending projections 432 and 434, respectively (FIGS. 1, 2, 8, and 10). In the assembled condition of the sensing pin assembly, the projections 432 and 434 are snugly disposed with respect to the forward and rearward transversely extending bars 408 of the framework. The forward projection is horizontally slotted near its lower end and receives a transversely extending flat bar 436 fixed to the bottom of the forward transverse bar 408. The bar acts to prevent the stamped steel frame assemblies from falling out of the framework.

The third point of engagement of a mounting plate 424 is at its upper end. The upper end is formed with a pair of longitudinally spaced vertically extending projections 438 (FIGS. 2 and 9) which are snugly received upon the lower edges of the brace bar 146. It will be evident that the stamped steel frame assemblies are firmly held against rotation about the bar 436 received in the slot formed in the forward projection at the base of the plate.

The stamped steel frame assemblies are located in the transverse direction so that the sensing pins are properly aligned with appropriate card columns by combs 440 and 442 carried by the undersides of the forward and rearward cross bars 408. A comb 444 (FIG. 2) fixed to the forward side of the brace bar 416 engages the forward one of the two upwardly extending projections 438 formed at the upper end of the mounting plate to accurately locate the stamped steel frame assemblies 420 at their upper ends. It may be observed that the comb 440 for the forward projections of the mounting plates is located between the flat supporting bar 436 and the bottom of the cross bar 408. Preferably it is separated from the bar 436 by a spacing element 446 to space it from the slots for the bar 436.

The sensing pin assembly also carries the support member 364 for the upper guide plate 42 of the respective sensing station. As best seen in FIGS. 8, 9, and 10, the support member 364 comprises two transversely spaced end plates 448 between which the upper guide plate 42 is mounted by means of longitudinally spaced transversely extending bars 450 rigidly fixed to the side plates 448. To mount the support member 364 for the guide plate 42, two longitudinally spaced vertically extending studs 452 are secured at their upper ends to the right hand tie bar 404 of the sensing pin assembly framework and one such stud 454 is centrally secured to the left hand tie bar of that framework. The studs are formed with heads at their lower ends which serve as stops defining the lower limit of movement of the support member. The support member is mounted for vertical and transverse horizontal movement on the studs by means of corresponding transversely extending slots formed in the outside edges of the side plates 448. Compression coil springs 456 are mounted on the studs and urge the support member downward to where it comes to rest against the heads formed on the studs. In this position the upper guide member is just clear of the lower end of the sensing pins in their normal down position. It can be seen that the elongated slots permit vertical as well as transverse horizontal movement on the part of the support member 364, thus enabling it to move with the elevator platform 52.

*Interposer assemblies*

One interposer assembly (FIGS. 1, 2, and 6) is provided for each card deck, that is, for each side of the sensing pin assembly. The interposer assemblies are disposed in planes that are parallel to ones containing the staggered ends of the sensing pins. Since the interposer assemblies are alike, save for being opposite in sense, only the forward one will be discussed in detail.

An interposer assembly framework includes a pair of vertically spaced cross bars 458 and 460. The cross bars 458 and 460 are of such length as to be snugly received between the side plates 392 and 394 of the translator unit and are rigidly secured thereto. Vertical left and right hand tie bars 462 are rigidly secured at their ends to the respective cross bars to form one integral framework for the interposer assembly. The upper ends of the tie bars are secured to the upper cross bar 460 on the sensing pin side thereof while the lower ends of the tie bars are secured to the lower cross bar 458 on the forward side thereof. Attached across the lower ends of the tie bars, on the side opposite that to which they are secured to the lower cross bar, is a guide rod 464. Attached across the forward and rearward sides of the upper ends of the tie rods 462, just below the bar 460, are two guide rods 466 and 468. The interposer rods 66 are slidably disposed at their upper ends in the space between the two upper guide rods 466 and 468 and at their lower ends in the space between the lower cross bar 458 and the lower guide bar 464.

The interposer rods are thin and flat and adjacent their upper ends are provided with forwardly extending projections 470 by which they are snugly yet slidably disposed between the guide rods 466 and 468. At their ends, the interposer rods are formed with forwardly extending projections 472 by which they are snugly yet slidably disposed between the lower cross bar 458 and the guide bar 464. Adjacent the test pins 56 for the corresponding deck column, they are provided with laterally offset lugs 474. The lugs are respectively engageable by the associated test pins, which are disposed on the laterally offset side of the interposer rod for the corresponding deck column. The rods are held against transverse displacement by a serrated comb 476 fixed to the underside of the upper guide bar 468 and a closed comb 470 secured on tops of the lower cross bar 458 and the guide bar 464.

The interposer rods are biased upwardly to the contact operating position. A tension spring 478, attached at its lower end to the upper projection 470 of an interposer rod and at its upper end to a fingered anchor plate 480 secured on top of the upper cross bar 460, furnishes the necessary bias for each rod. The upper limit of bias movement of an interposer rod is determined by the engagement of the lower projection 472 thereon with a non-perforated portion of the closed comb 470. Adjacent the lower projection 472, each interposer is also formed with a shoulder 482 which projects through the comb 470. The shoulder furnishes the means by which the interposer rod may be engaged by the interposer operating bail 68.

*Test pin assemblies*

The test pin assemblies are mounted on the sensing pin side of the interposer assemblies. The assemblies, of which there is one for each row of index point positions for the corresponding card deck, are supported opposite the projections 58 on the sensing pins for the corresponding rows of index point positions by the framework of the interposer assembly.

Each test pin assembly (FIGS. 1 and 2) comprises a transversely extending rigid support bar 484 having at each of its ends downwardly extending portions 486. This support bar is rigidly attached to the tie rods 462 of the interposer assembly framework as by threaded studs (not shown) which extend from the forward side of the portions 486 through suitable openings formed in the vertical tie bars to where they bear nuts (also not shown). Mounted in spaced relation to this support bar upon studs 488 extending rearwardly from the support bar projections 486 is a compound member 490. The compound member is formed of two bars, of which one 492 is directed upwardly and curved toward said support bar and serves as an anchor bar for test pin springs 494. The other and rearward or outside member 496 of said compound member is a flat closed comb which extends downwardly and receives the sensing pin engaging ends 498 of the test pins 56. The test pins are spaced at their other or forward ends by means of a comb 500 open at the bottom and secured to the front side of the support bar between its downwardly extending portions 486. It will thus be seen that the test pins are mounted for longitudinal movement toward and away from the projections 58 on the upper ends of corresponding sensing pins 54.

Test pins 56 are constructed of thin flat material.

Their rearward or sensing pin engaging ends 498 are formed as horizontally turned portions to present a broader edge for engaging the corresponding sensing pins. Intermediate their length and on the upper edge, they are each provided with a lug 502, whereby the other end of the corresponding spring 494 attached at its one end to the anchor member 492, may be anchored to the test pin for the purpose of urging it upwardly in the combs and longitudinally toward the corresponding sensing pin. The position to which a sensing pin is biased, when the test pin assembly is not assembled in the machine, is determined by projections 405 which engage the compound member 490. Behind the horizontally turned portion 498, the test pin is formed with a downwardly extending lug 506 to provide an engaging surface for the test pin restoring bail 107.

The forward end of the test pin is formed with an offset portion 508. The location of this offset portion is such that, when the test pin is stopped in an intermediate position by the projection 58 of the corresponding sensing pin, it will be clear of the path of the corresponding lateral offset lug 474 on the associated interposer rod, and the slight depression of the test pin that may be effected by the corresponding "no-hole" bail 64 will not prevent upward movement of the interposer rod by its respective spring 478. On the other hand, the offset portion is so located on the test pin that, when the test pin is permitted to move to its advanced position, it will engage the corresponding laterally offset lug 474 when the test pin is depressed by the "no-hole" bail 64 to prevent upward movement of the interposer rod. The length of the offset portion 508 is such that, when the test pin is in the intermediate position, it will be engaged by the corresponding "hole" bail 62 which moves through an arc sufficient to cause the non-offset portion of the test pin to engage the lug 474 and hold the interposer rod depressed. However, when the test pin is in the advanced position, the "hole" bail misses the offset portion 508, with the result that that bail then has no holding effect upon the interposer rod.

*Interposer rod operating mechanisms*

The interposer rod 66 operating mechanisms (FIGS. 1, 2 and 6) include the "hole" and "no-hole" bails 62 and 64, respectively, which act directly upon the test pins 56. Also included is the interposer bail 68 which acts directly upon the interposer rods. Separate operating mechanisms are provided for each card deck. The respective operating mechanisms are supported on the upper outer edges of the translator unit above the respective interposer assemblies.

Referring more particularly to FIGS. 1a, 2, 5a, and 6, that is, the interposer operating mechanisms for the trailing card deck at the first sensing station, it can be seen that they are supported upon the side plates 392 and 394 of the translator unit framework by brackets 510. These brackets are rigidly interconnected by a heavy plate 512 to form the supporting framework. The "hole" and "no-hole" bails 62 and 64 are mounted opposite the respective test pins by rotatable bearing bars 514. At their ends the bars 514 are formed with trunnions 515 which are received in suitable apertures formed in support bars 516. The support bars 516 are fixed to the interior surfaces of the brackets 510 rearwardly of the plate 512.

Figure 2:
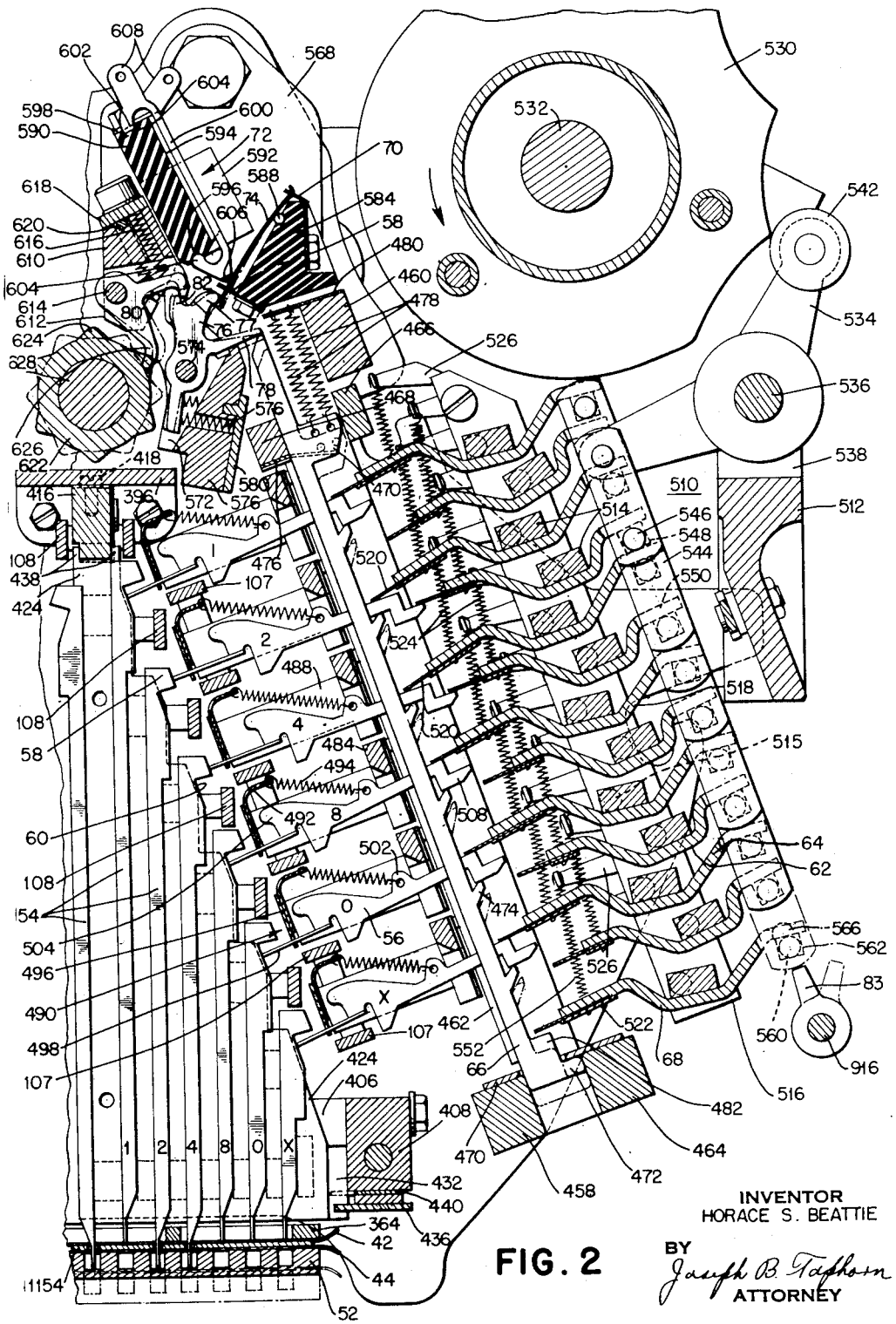
FIG. 2 is an enlarged view of a portion of the apparatus shown in FIG. 1.

The "hole" and "no-hole" bails include, in addition to the transversely extending bearing bar 514, relatively flat transversely extending members 518 which are dished at an intermediate point so that the transverse bar 514 is more or less received within its confines. A wearplate 520 is mounted on the underside of the bails adjacent the test pin edge thereof for engagement with the test pins. The flat members 518 and the wear-plates 520 of the "no-hole" bails are of such size and are so pivoted as to insure that those bail members will engage the corresponding test pins in both the intermediate and the advanced positions. The flat members and the wearplates of the "hole" bails are of such size and are so pivoted that the wear-plates will not engage the corresponding test pins when the test pins are in the advanced position, but so that they will engage them when they have been stopped in an intermediate position. As seen in FIG. 2, the pivot points for the bails are staggered, with with those for the "no-hole" bails being located adjacent the test pin edge of the support bars 516, while those for the "hole" bails are located adjacent the opposite edge.

Each of the "hole" and "no-hole" bails is biased upward so as to swing the wear-plate 520 away from the corresponding test pin. To this end the respective bails are provided with reinforcing bars 522 which extend the full length of the bails and slightly beyond where they provide ears which are suitably apertured. Tension springs 524 attached at their upper ends to staggered hooks 526 integral with a thin flat bar 528 mounted between the support bar 516 and the associated bracket 510, have their lower ends attached to the respective apertured ears of the reinforcing bar 522. Conveniently, the springs 524 for the "no-hole" bails are attached to the longer ones of the staggered hooks 526.

The "hole" and "no-hole" bails are operated, at the respective times indicated by the timing chart of FIGS. 15a and 15b, by corresponding cams 530 suitably fixed to rotate with a continuously rotatable shaft 532. This shaft is suitably supported in upper ends of the brackets 510. The cams operate the respective bails through the intermediaries of bell crank rocker arms 534 freely rotatable on a shaft 536. This shaft is mounted on projections 538 upstanding on the upper edge of the brace plate 512. The rocker arms are suitably spaced along the shaft by secondary upstanding projections 540. The rocker arms engage the respective cams through rollers 542 mounted on the upperly extending one of the bell crank arms. The other arm of each bell crank is drivingly connected to one end of a corresponding link 544. The other ends of the respective links are pivotally connected to the bail members 518 of corresponding ones of the bails through pins 546 formed on blocks 548 secured to the underside of lugs 550 projecting rearwardly from the bails. It can be seen that the tension springs 525 hold the rollers 542 against the cams 530 so that the cams determine the positions of the various bails at all times.

The interposer bail 68 is conveniently located beneath the test pin operating bails 62 and 64 and where it may engage the shoulder 482 formed on the respective interposer rods 66. Its construction is similar to that of the test pin bails, and it is biased upwardly away from the shoulders 482 by a spring 552 attached at its upper end to one of the anchor hooks 526 formed on the plate 528.

The interposer bail is operated in the same manner as the test pin bails. As is best seen in FIG. 6, it is operated by a cam 554 on the continuously rotatable shaft 532 to the left of the "hole" and "no-hole" bail operating cams 530. This cam operates through a rocker arm 556 (FIG. 6) similar to the rocker arms 534 and mounted on the shaft 536. The rocker arm 556 is pivotally connected to the upper end of a link 558. The lower end of the link is connected to a pin 560 carried by a block 562 fixed to the underside of a rearwardly extending lug 564 on the interposer bail 68. It may be observed that this pivotal connection between the link and the bail is made by means of an elongated slot 566 (FIG. 2) formed in the link.

*Contact assemblies*

There are two contact assemblies (FIGS. 1 and 2) in each translator unit, one for each of the interposer assemblies. These assemblies contain the contact actuators 76 operated by interposer rods 66 to effect the completion of data-designating electrical circuits from the common strip 70 to the corresponding insulated terminal bars or strips 72. The contact assemblies are located adjacent each other at the top of the translator units and in line with the respective interposer rods 66. Each assembly includes an actuator unit, a terminal contact unit, and a latch unit.

Each assembly is supported in the translator unit upon a rigid unit which includes left and right side plates 568 removably secured to the interior surfaces of the translator unit side plates 392 and 394. The actuator unit which mounts the contact rocker arms 76 is rigidly mounted upon interior surfaces of the lower ends of the side plates 568 by a transversely extending comb bar 570 having upwardly and directed fingers 572. The rocker arms are pivotally mounted between the fingers of the comb by a shaft 574.

The bias which enables the rocker arms to hold the respective contact wires 74 away from the contact elements 72 is obtained from springs 576. The springs are supported in staggered bores 578 formed in the comb bar 570. They are held in place by means of a plate 580 suitably fixed to the comb. Because the springs nearer the pivot point for the rocker arms are effective through a smaller moment arm than those more remote therefrom, a groove is cut in the side surface of the comb beneath the plate so as to intercept the bores nearest the pivot point, and the plate 580 is formed with an interiorly directed ridge 582 to put the corresponding springs under greater compression. The position to which the rocker arms are rotated by the springs is determined by the engagement of the arms 78 with the upper edge of the comb bar.

The wire contact unit insulatably supports contact wires 74 and the common terminal strip 70. It includes a transversely extending block 584 formed of an electrical insulating material such as Bakelite and suitably fixed at its ends to the interior surfaces of the side plates 568 of the contact assembly so as to dispose the wire contact units above the corresponding interposer rods 66.

The common terminal strip 70 is mounted upon the block 584 on the side away from the actuator unit. At its upper end, which extends beyond the upper edge of the block, it is bent forwardly and formed as a closed comb. On the adjacent side of the transverse block 584, there is mounted an upwardly extending closed guide comb 586. The contact wires 74 have ends formed in a hook-shaped fashion, and these ends are received in the closed comb of the terminal strip. The other and movable ends of the control wires extend through corresponding openings in the guide comb 586. The wires are biased to the upper end of the guide comb and to a position in which they will engage the respective control elements 72 through the use of a transversely extending rod 588 so seated in a groove located on the upper surface transverse block as to bow the contact wires.

The terminal contact unit supports the terminal bars or strips 72 for engagement by the contact wires of the contact unit. For this reason it is mounted on the side plates above the contact unit and the actuator unit. It includes a transversely extending block 590 formed of a suitable electrical insulating material and fixed to interiorly directed portions 592 of the side plates 568. The contact block is attached to these interiorly directed blocks by means of extensions which overlie the block and are suitably fastened thereto. Along an upwardly directed side surface, the block is formed with a plurality of vertically extending grooves 594 equal in number to the number of contact wires. Along its bottom surface the block is formed with a groove 596. On its upper surface, on the edge away from that on which the vertically extending grooves are formed, the block is cut away as at 598.

The terminal bars or strips 72, which are of a well known construction, are mounted on the contact block so that portions 600 thereof are received in the corresponding vertical grooves 590 formed in the block, and upper portions, which are generally U-shaped, have their free ends 602 disposed in the cut-away portion 598 and behind the ledge 604 formed by the uncut portion on the upper surface. The lower portion of each terminal strip is also U-shaped and has on its free end a rounded surface 604 which is received in a groove formed on the bottom surface of the block 590 when the contact strip is sprung into place. Each terminal strip is broadened at its lower end or tip 606 to insure engagement with the corresponding contact wire. For purposes of improving the electrical conductivity, this tip may be of the silver inlaid type. The upper ends of the terminal strips are formed with extensions 608 for the attachment of wires. These extensions are staggered to facilitate the attachment thereto of the wires leading to a terminal board (not shown). By making suitable connections at the terminal board, the data contained in any deck column can be delivered to any part of the machine.

The latch unit supports the latches 80 which control the restoration of the actuators 76 displaced by interposer rods 66. The latch unit is mounted alongside of the contact unit but above the corresponding actuator unit. It includes a transversely extending comb bar 610 having downwardly directed fingers 612 which space the latches 80. A shaft 614 pivotally mounts the latches in the comb bar. The latches are urged into engagement with the corresponding actuators by means of springs 616 which are mounted in corresponding vertical holes staggered in the block 610. The springs are held in these holes by means of a plate 618 suitably secured to the upper surface of the block 610. As with the actuator unit, this plate is formed with a ridge 620 which is received in a groove in line with the bores containing the springs nearest the pivot point of the latches.

*Operating mechanism for the contact assembly latches*

As is evident from FIG. 1 of the drawings, the latches of the two contact assemblies in each translator unit are operated by a generally hexagonally appearing cam 622. This cam actually is formed of six equally spaced triangular projections 624 (FIG. 2) on the surface of a circular body. The latches of each of the two associated contact assemblies are so located with respect to the cam that the arms 626 thereof will ride on the surface of the cam. Whenever a projection or high point of the cam strikes the latch arm 626, the latch is pivoted about its shaft 614 against the action of the associated spring 616. The cam is continuously rotated at such a speed that the latches are knocked off the associated actuator projections 82 at the termination of each impulse from the emitter as is indicated by the timing chart in FIG. 15. The cam is fixed upon a shaft 628 rotatably supported by the side plates 392 and 394 of the respective translator unit.

*Operating mechanisms for test pin restoring bails*

The test pin bails 107 (FIGS. 1, 2, 10, and 11), of which there is one for each row of test pins 56 for the corresponding card deck, are relatively flat bars which extend across the rear of each row of associated test pins. The bars are movable edgewise in the longitudinal direction of the respective test pins so as to engage the projections 506 depending from the underside of the test pins. Since all of the test pins are restored together at a fixed time in the machine cycle, the bails for each card deck may be joined together as a rack. The rack is obtained by mounting the respective ends of the bars upon perpendicular members 630 (FIGS. 10 and 11) fixed to lugs 632 carried by transversely spaced vertical bars 634. The bars are disposed flatwise with respect to the bails and are supported through a slot 636 formed in their lower ends upon studs 638 (FIGS. 6, 9, 10, and 11) projecting inwardly from the interior side surfaces of the translator unit side plates 392 and 394. The slots are disposed in the direction of the bail movement.

Each of the side bars is translated edgewise upon studs 638 in the longitudinal direction of the test pins by a pair of upper and lower coacting levers 640 and 642. Each of these levers is pivoted equidistantly from the ends of the associated bar. The upper lever 640 is pivoted about a stud 644 extending inwardly from the adjacent side wall of the translator unit toward the associated side bar 634. The lower lever 642 is pivoted on the same stud 638 on which the associated side bar 634 is mounted by means of the slot 636.

These levers coact so that equal movement is imparted to the upper and lower ends of the side bar. To this end they are interconnected at a midpoint between their respective studs by a sliding joint. A depending arm 646 on the upper lever is formed at its free end with a rounded edge which is received in a slot 648 formed in the upper end of an upwardly extending arm 650 on the lower lever 642.

The levers are connected to the respective ends of the associated side bars by sliding joints. An inwardly projecting stud 652 on the upper end of each lever 640 rotatably mounts a hexagonal bearing block 654 which is slidably received in a slot 656 formed in the upper end of the associated side bar 634. Similarly, an inwardly projecting stud 658 formed on the lower end of each lever 642 rotatably mounts a hexagonal bearing block 660 which is slidably received in a slot 662 formed in the lower end of the associated side bar 634. Since the levers 640 and 642 are interconnected, it follows that the side bars 634 and hence the bails 107 will be translated in the longitudinal direction of the test pins when the levers are rotated.

The bails 107 are biased to a position in which they are clear of the test pins by tension springs 664. These springs are anchored to studs 666 projecting laterally from the upper ends of the lower levers 642 and to studs 668 projecting inwardly from the associated side plates 392 and 394 of the translator unit.

The bails 107 are operated once during each machine cycle by two test pin restoring cams 670 (FIG. 6) fixed to the forward one of the shafts 532 to each side of the cams 530. The cams 670 operate upon rollers 672 carried by a rocker arm 674 pivotally mounted at one end on the shaft 536 which also carries the rocker arms 534. The free ends of the rocker arms 674 rest upon the free ends of arms 676 fixed to the adjacent one from the upper levers 640. It can be seen that the rollers 676 are carried to follow the contour of the cam 670 through the action of the springs 664 upon the lower levers which tend to rotate in such a direction as to rotate the upper levers against the rocker arm. Thus the cams 670 at all times determine the positions of the test pin restoring bails. The cams are formed to operate the bails as indicated by the timing chart in FIG. 15.

As is evident from FIGS. 9 and 10, the cams operate directly only upon the right hand set of upper levers 640. Operation of the left hand bails is effected indirectly, though, through the upper levers of the right hand set. It is accomplished by providing the upper lever of the right hand set with a rearwardly extending arm 678 which is interconnected at a mid point with an arm 680 projecting forwardly from the upper lever of the left hand set of bails. These arms are interconnected by a sliding joint which includes a rounded end 682 formed on the free end of the rearwardly projecting arm 678 and a slot 684 formed on the free end of the forwardly projecting arm. When high points on the cams 670 strike the rollers 672, the levers 640 and 642 are all rotated equal amounts to shift bails 107 from their normal position (FIG. 10) in which they are clear of the test pins 56 to a test pin restoring position (FIG. 10) which entailed movement in the longitudinal direction of the test pins. Hence, the test pins for each card deck at a sensing station are restored simultaneously.

*Operating mechanism for sensing pin restoring bails*

The sensing pin restoring bails (FIGS. 1, 2, 6, 8, and 9), of which there is one for the sensing pins for each row of index point positions in each deck of a card, are supported above the upper ends of the respective sensing pins. They constitute horizontally extending bars which are disposed edgewise with respect to the sensing pins. Since all of the sensing pins which were raised by the card elevator mechanism are to be restored together, after the testing pins have been restored, the bails for each translator unit may be mounted together as a unit. A unit consists of, in addition to the horizontally extending bars 108, two triangularly shaped end plates 686 disposed flatwise with respect to the horizontally extending bars and bearing, on their interior surfaces, longitudinally extending bars 688. The ends of these bars are reduced so as to form trunnions 690 on which the slotted ends 692 of the bars 108 are mounted.

The bail units are supported for vertical movement in the respective translator units. At their upper ends they are guided by vertical extensions 694 which are disposed in slots 696 formed in bars 698 suitably fixed to the inside surfaces of depending flanges 700 formed on the ends of the transversely extending brace bar 396 in each translator unit. Above the slots 696 each brace bar 396 is formed with openings 702 of sufficient size to permit the passage therethrough of the extensions 694. Thus, the upper end of the bail unit is fixed against all movements except vertical ones.

The bail units are supported at their lower ends on laterally extending pins 704 received in suitable openings therein and carried by the rearward free ends of levers 706. The levers 706 are pivoted at their forward ends on studs 708 carried by the side plates 392 and 394 of the translator unit. Each lever 706 is biased upwardly by a spring 710 fixed at one end to a stud 712 carried by the exterior side of the lever and at its upper end to a stud 714 carried by the corresponding side plate of the translator unit. These springs are of sufficient strength to hold the sensing pin bail unit in a raised position.

As best seen in FIG. 8, in this normally raised position, the pin 704 received in the lower end of the end plates 686 is located slightly above the stud 708 on which the corresponding lever is mounted. The cards are so designed that, when the bails are moved downward to the position in which they have restored the sensing pins, the pin 704 is located an equally small distance beneath the stud 708. It will be appreciated from a consideration of the law of cosines that, when such a condition exists, very little forward or rearward movement is imparted to the bail unit. However, a small amount of movement on the part of the bails 108 may be readily tolerated since the upper ends of the sensing pins 54 are formed with relatively long flat edges.

A downward movement of the bail unit is effected once each machine cycle by cams 716 carried by the forward one of the continuously rotatable shafts 532 of each translator unit exteriorly of the test pin restoring cams 670. The linkages include levers 718 which are pivoted on studs 720 projecting inwardly from the side plates 392, 394 of the respective translator unit. These levers are formed with shoulders 722 which rest upon cooperating shoulders 724 formed on the upper sides of the levers 706. The free ends of levers 718 engage the underside of the free ends of rocker arms 726 pivoted at their other ends on the shaft 536. Intermediate its ends each rocker arm 726 is provided with a roller 728 which rides on the corresponding cam 716 because of the action of the springs 710. It will be evident that the cams 716 always determine the position of the sensing pin bail units. The cams are formed with high points which act through the linkage to depress the bails at the machine cycle time indicated by the chart of FIG. 15.

*Elevator mechanism operating mechanism*

It will be recalled that the elevator platform 52 of each translator unit is raised when the transversely extending lever 328 is swung upwards. Since the elevator platform is operated at a fixed time in each machine cycle, it too is operated by a cam 730 (FIGS. 5 and 8) fixed upon the respective forward ones of the continuously rotating shafts 532. The cam 730 operates through a roller upon the forward free end of a longitudinally extending lever 732 located exteriorly of the respective translator unit left side plate 392 (FIG. 6) and pivotally mounted at an intermediate point upon a stud 734 projecting outwardly from that left side plate. The lever is mounted exteriorly of the translator unit so as to facilitate the mounting of the elevator cam 730 upon the forward cam shaft 532 which is of greater length than the other translator unit shaft because of the cam 730 and the test pin and sensing pin restoring cams 670 and 716. [Because of this increased length, the left hand bracket 510 which supports the forward shaft 532 is formed with an offset portion, so that all of the cams are located within the confines of the machine.] The rearward free end of lever 732 carries a pin 736 which projects inwardly through an opening 738 (FIG. 5) in the translator unit side plate 392 to where it is attached to the upper end of a link assembly generally indicated by the numeral 740.

The link assembly 740 is a rigid structure which is formed of two parts for purposes of ready assembly within the translator unit. The upper part 742 which is pivoted upon the inwardly extending pin 736 is of such size as to be inserted laterally through the opening 738 during assembly. Halfway down its length, it carries a stud 744 which serves as one anchor for spring 746 anchored at its other end to a stud 748 projecting outwardly from the side plate 392. The spring 746 biases the lower end of the link assembly forwardly and the entire assembly downwardly.

At its lower end the part 742 carries a short outwardly projecting stud 750. Stud 750 is slidably received in an elongated slot 752 formed in the upper end of the lower part 754 of the link assembly. A headed screw 756 extends through a suitable opening formed in the upper part and is threaded in the upper end of the lower part and, when seated, acts in conjunction with the stud 750 in the slot 752 to hold the two parts of the link assembly together as a rigid structure.

At its lower end the lower part 754 of the link assembly is formed with a forwardly extending hook 758. This hook is adapted, when seated, to engage beneath the downwardly directed portion 334 on the free end of the elevator mechanism lever 328. Spring 746, acting upon the upper part of the link assembly, holds the hook in its seated position. The lower corner of the hook is beveled at 760 so as to cooperate with the beveled surface 762 formed on the upper rearward corner of the elevator lever downwardly directed portion 334 to the end that, when the card feed bed 144 is raised upward into position, the elevator link assembly will be guided into seated position.

It will be remembered that the elevator platform as well as the elevator platform lever are urged downward by the springs 366 associated with the elevator platform structure. This bias is transmitted through the elevator link assembly 740 and the rearwardly extending lever 732 so that the roller 731 thereon is continuously held against the cam 730. The cam contour thus determines the position of the elevator platform. A high point on the cam acts to raise the elevator platform at the time indicated by the chart of FIG. 15.

*Clutch mounting assembly*

As has been pointed out heretofore, the card feed knife assemblies 22, the card gates 50 and 106, and the interposer interlocks 83 may be selectively be operated during each machine cycle. The instrumentalities for effecting these operations, which must take place at fixed times in a machine cycle, are magnetically controlled single revolution positive drive clutches of the square tooth and ratchet type. Since both card gates 50 and 106 and all four of the interposer interlocks 83 are operated simultaneously, only three clutches are needed; one, generally indicated by the numeral 764 (FIG. 7), being provided for the card feed knife assemblies; one, generally indicated by the numeral 766, for the card gates; and one, generally indicated by the numeral 768, for the interposer interlocks.

These clutches are supported by the clutch mounting assembly 150 (FIGS. 1, 5, and 7). The clutch mounting assembly is located on the upper side of the card feed unit between the two translator units 146 and 148. It includes a pair of brackets 770, each of which is provided with a foot 772 by which it is secured to the upper edge of the corresponding side plate 132 or 134 of the card feed unit framework. A tie plate 774 is rigidly secured at each end, as by bolting, to the forward edges of the respective brackets to form a rigid framework. A transversely extending continuously rotatable shaft 776 is supported by suitable bearings 778 mounted in the brackets 770 behind the tie plate 774. The tie plate through individual members 780 secured to the rearward side thereof and the shaft 776 support the elements forming each of the clutches.

*Magnetically controlled clutches*

The three clutches are supported in spaced relation transversely of the card feed unit. As seen in FIG. 7, the left hand clutch 766 controls the card gates, the middle one 768 the interposer interlocks, and the right hand one 764 the card picker knife assemblies. While the linkages connecting the clutches with the respective devices are dissimilar, the clutches themselves are alike in construction and operation.

The driving element of a clutch is a ratchet 782 which is constituted as a solid cylinder having a single notch 784. The ratchet is concentrically fixed to the continuously rotatable shaft 776 which effects one revolution in each machine cycle. The driven element of the clutch is a disc 786 which is concentrically fixed, as by welding, to a sleeve 788 rotatably supported upon the shaft by internal bearings (not shown). The disc element 786 is located next to the ratchet and provided at one point with radially extending lug 788 by which it is normally held in a fixed position and, at a somewhat diametrically opposite point, with a second lug 790 which serves as an anchor for various springs.

Motion is transmitted from the continuously rotatable ratchet 782 to the normally resting driven element 786 through a pawl 792 carried by the disc. The pawl is pivoted at one end upon a stud 793 fixed to the disc lug 788 on the ratchet side of the disc. It extends away from its pivot point in the direction of rotation of the underlying ratchet surface and is formed with a tooth 794 which is adapted to be received within the notch 784 formed in the driving element or ratchet 782. Obviously, the engaged pawl will rotate with the continuously rotatable shaft, dragging with it the driven element.

The control of the pawl is effected through a lug 796 projecting outwardly from the pivoted end of the pawl. The pawl is of such size that the path of its free end, when the pawl rotates with the disc, intersects a hook 798 formed on the lower end of a latch lever 800. The latch lever is pivoted on a pin 802 supported at the free ends of rearwardly projecting left and right hand arms 804 and 806 (FIG. 7) of the respective support member 780. When the latch lever is swung so that the hook 798 moves out of contact with the clutch pawl lug 796, the pawl rotates, under the bias of a spring 808 anchored at one end, in an opening 810 formed in the free end of the clutch pawl and at the other end to a pin 812 extending through the second projection 790 on the disc of the driven element, to where its tooth 794 rests upon the surface of the rotating ratchet 782. When the notch 784 in the ratchet passes underneath the tooth, the tooth drops thereinto, and the pawl, as well as the driven element, will be pulled around by the ratchet. It will, therefore, be clear that the point of engagement of a clutch will always occur at a fixed point in the machine cycle, since the ratchet is fixed to the shaft 776 which continually rotates at such a uniform speed as to complete one revolution in each machine cycle.

The ratchet pulls the clutch pawl around for only one revolution. During the revolution, the latch lever is swung so as to locate the hook 798 in its original position, that is, in the path of the lug 796. Thus the pawl lug strikes the hook at the end of one revolution. The hook acts to rotate the pawl so as to withdraw the tooth 744 out of engagement with the ratchet. It will be apparent that this always takes place at a fixed point in the machine cycle and after the driven element has been rotated through exactly one revolution. The rotation of the driven element on disc 786 is also limited to one revolution because the hook 798 is broad enough to intercept the lug 788 extending radially outward from the disc. Evidently, the engagement of the lug 788 with the hook 798 prevents the disc from drifting around the shaft because of friction.

Rebound of the driven element upon the stopping thereof by the latch lever hook is prevented by a latch keeper 814. The latch keeper is pivoted on the pin 802 so as to lie on the disc 798 side of the latch lever and terminate just above the hook 798. The keeper is urged by a spring 816 anchored at one end to a stud 818 carried at an intermediate point upon the keeper and at its other end to a stud 820 projecting from the arm 806 towards the arm 804 to where an ear 822 engages the back of the clutch latch lever 800. Thus, the keeper generally follows the movement of the clutch latch lever. The parts are so constructed that when the clutch latch lever hook is in engagement with the disc lug 788, the lower free end of the keeper is disposed behind the lug 788 and therefore prevents retrograde or rebound movement of the disc or driven element. It will now be evident that, when the clutch is latched up, the driven element will be held in a predetermined position and against rotation in either direction. The disc lug 788 gets below the keeper as the driven element completes one revolution by depressing it. As soon as the disc lug has moved past the keeper's lower end and is in engagement with the hook 798, the keeper snaps behind it and, in cooperation with the hook, securely holds the driven element in place.

The hook on the clutch latch lever is urged into the path of the pawl lug 796 and on the disc lug 788 by the action of a cam 824 fixed, adjacent to the ratchet 782, to the continuously rotatable shaft 776. The cam 824 acts upon a roller 826 carried by a free end of a clutch latch lever restoring lever 828 also pivoted on the pin 802. An arm 830 extending upwardly from the pivot point of the restoring lever 828 serves as an anchor for one end of the spring 832 anchored at its other end to the stud 834 extending from an upward extension 836 of arm 804. In this way the clutch restoring lever is urged to follow the contour of the cam 824. The clutch latch lever and its restoring lever are urged to move together as a unit by a spring 838 anchored at one end to a laterally extending plate 840 fixed to the clutch latch lever and at its other end in an opening 842 adjacent the roller 826 in the restoring lever. The spring 838 urges the part together to where an adjusting screw 844 carried by the plate engages an ear 846 formed on the restoring lever. When a high point on the cam 824 strikes the restoring lever, it rocks the latter so as to urge, through the tension spring 838, the clutch latch lever 800 to the latching position in which the hook 798 is disposed in the path of the disc lug 788 and the lug 796 to positively intercept them. The high point of the cam moves from beneath the roller 826 at the latch point so as not to interfere with a subsequent unlatching operation. In this matter it should be pointed out that the roller is held in a position slightly clear of the rotating cam when the clutch latch lever has been properly latched up.

The clutch latch lever is permitted to swing to the unlatching position under the influence of the spring 832 upon the energization of a corresponding magnet 848. The magnet is supported by an L-shaped member 850 secured to one side of the upward extension 836 of the arm 804 of the support member 780. The magnet operates upon an armature 852 carried by a lever 854 pivoted at one end upon a stud 856 projecting from the upward extension 836. Attraction of the armature 852 results in an upward swinging of the lever about the stud 856 and against the action of a tension spring 858 anchored at one end to an intermediate point on the lever and at its other end to the stud 834 projecting from the extension 836. Upward movement of this armature lever withdraws the free end of the lever from a position opposite a shoulder 860 formed on the upper end of the clutch lever 800, permitting the latter to rotate under the influence of spring 832 in the aforementioned manner. Movement of this clutch latch lever, of course, is stopped by the engagement of the roller 826 with the cam 824. In this unlatched position, the clutch latch lever is clear of the lugs 788 and 798 formed on the clutch pawl 792 and on the disc or the driven element 786. The clutch thereafter engages in the manner heretofore described.

During the rotation of the driven element through one revolution, the magnet 848 is deenergized. Thereupon the armature bearing lever 854 may or may not restore depending upon the residual magnetism present. In any event, when the high point on the cam 824 causes the restoring lever 828 to move the clutch latch lever into the latching up position, the upper end of the clutch latch lever strikes an adjustable set screw 862 on an armature knock-off lever 864 pivoted at an intermediate point upon a stud 866 projecting laterally from the upward extension 836. Rotation of the armature knock-off lever causes the free end of the other arm thereof to engage the top of the armature bearing lever 854 to force the latter down into position behind the shoulder 860 of the clutch latch lever. In this way the armature bearing lever is positively restored so that when the restoring lever roller 826 drops off the high point of the cam 824, the clutch latch lever 800 will be properly latched up.

In the design of the notch 784 in the ratchet 782 and the tooth 794 on the clutch pawl 792, the latter is made slightly smaller than the former so that the tooth may be adequately seated in the pawl before driving contact is undergone. In such design, however, there obviously is a lost motion connection permitting backlash to take place during the period of clutch engagement. To eliminate this undesirable feature, a backlash lever 868 is provided.

The backlash lever 868 lies along the side of the clutch pawl 792 and, like the clutch pawl, is pivotally mounted upon the stud 793 projecting laterally from the lug 788 on the disc on the driven element 786. The backlash lever is formed with a tooth 870 which is adapted to slip into the ratchet notch 784 upon driving engagement of the notch with the pawl tooth 794. For this purpose a spring 872 anchored at one end to the second extension 790 on the disc and at its other end to an ear 874 on the backlash lever yieldably urges the backlash lever to where the ear rests on top of the clutch pawl. In this position the tooth on the backlash lever will be fully received within the notch in the ratchet when the tooth on the clutch pawl is in engagement with the oncoming side of the notch in the ratchet. The clutch pawl tooth will drop fully into the notch in the ratchet before the backlash lever tooth is aligned therewith because the spring 808 is stronger and acts through a greater moment arm than the spring 872. Any backlash occurring after both teeth have dropped into the notch is prevented by the snug fit obtained.

It can be appreciated that, when the clutch is latched up, that is, when the clutch pawl 792 is disengaged by the interaction of the hook 798 on the clutch latch lever 800 with the lug 796 on the pawl, a snapping action takes place. In such an arrangement the inertia present will tend to throw the backlash lever 868 to where the tooth 870 formed thereon is above the upper edge of the clutch pawl and may catch thereon. To prevent this overthrow, an arm 876, formed at its free end with a laterally turned portion 878, is fixed to the backlash lever. Upon the disengagement of the pawl, the amount of throw imparted to the backlash lever will be limited by the engagement of the laterally turned portion 874 with the smooth surface of the ratchet. No possibility of contact with the notch in the ratchet exists, as at the point of the disengagement the notch is located on the other side away from the lateraly turned portion.

In the operation of these clutches, the respective magnet 848 is energized to swing the armature bearing lever 854 against the action of the spring 858. This action results in the withdrawal of the free end of the armature bearing lever from in front of the latch lever shoulder 860, permitting the latch lever 800 to rotate to a pawl unlatching position under the action of the spring 832 upon the restoring lever pressing against the clutch latch lever adjustable screw 844, it being remembered that in the latched up position the roller 826 of the restoring lever is clear of the cam 824. The clutch pawl swings, under the action of its spring 808, to where it rides on the smooth surface of the ratchet 782. When the notch 784 in the ratchet comes opposite the tooth 794, the tooth drops therein and makes driven contact with the oncoming side of the notch wall. At this contact the backlash lever tooth 870 also slips into the notch but under the influence of the spring 872. The clutch pawl, the backlash lever, and the driven element now proceed to rotate through one revolution. As the end of the revolution is approached, a high point on the cam 824 displaces the restoring lever 828 so that it exerts a pull on the clutch latch lever through the tension spring 838 effective to move it to a position in which the hook 798 thereon is disposed in the path of the pawl and disc lugs 796 and 788. Upon the engagement of the lugs 796 and 788 with the clutch latch lever hook, the clutch pawl 792 is disengaged from the ratchet and carries with it the backlash lever 868. Rebound of the clutch pawl and the driven element 786 is prevented by the latch keeper 814. The overthrow of the backlash lever 868 is prevented by the lateral projection 878 of the arm 876 thereof. In moving to the latching up position, the clutch lever 800 struck the adjusting screw 862 on the armature knock-off lever 864, rotating the knock-off lever so that it disposed the armature bearing lever 854 in the position in which it lies in the path of the shoulder 860 on the clutch latch lever. Thus when the roller 826 drops off the cam 824, the restoring lever 828 and the clutch latch lever 800 rock slightly under the influence of the spring 832 to where the shoulder 860 on the clutch latch lever engages the free end of the armature bearing lever 854. The clutch is now latched up and remains in this position until the magnet 848 is again energized.

Driving linkage for the card feed knife assemblies

As was intimated earlier, the feed knife assemblies 22 have a normal position of rest in which the knives are disposed in front of the bottom card and to and from which they may be reciprocated at a fixed time in the machine cycle. This reciprocation is obtained through the operation of the right hand clutch 764 (FIG. 7). The rotary motion of the sleeve 788 fixed to the driven element 786 of the clutch is translated into a reciprocatory motion by a cam and follower arrangement involving the use of two axially spaced complementary cams 880 and 882 (FIGS. 5 and 7) rigidly secured to the sleeve 788. The cams operate respectively upon rollers 884 and 886 carried by a double armed follower 888 so that the feed knife assemblies are positively driven in both directions. The follower 888 is fixed to a transversely extending shaft 890 rotatably mounted in the brackets 770 of the clutch mounting assembly. The shaft extends through the left hand bracket of the card feed unit (right hand bracket as seen in FIG. 7) to where it rigidly mounts a downwardly extending lever 892 (FIGS. 3, 5, and 7). The lever 892 is pivotally connected at its lower or free end to the rear end of a longitudinally extending generally horizontal link 894. At its forward end, this link is pivotally connected to the upper end of a lever 896 rigidly secured to the left hand end of a shaft 898 rotatably supported in the left and right hand side plates 132 and 134 of the feed unit framework (FIG. 3). Upstanding from this shaft and rigidly secured thereto are two gear sectors 900, the teeth of which engage the teeth of racks formed on the bottom of the respective slides 275 of the card feed knife assemblies.

It can be seen that, when the gear sector shaft 898 is oscillated, a reciprocatory motion will be imparted to the feed knife assemblies. The oscillatory movement is imparted to the shaft 898 by the longitudinally extending link 894 when the downwardly extending lever 892 is oscillated. The downwardly extending lever is subjected to an oscillatory motion when the clutch 764 is engaged, since it moves with the shaft 890 to which is also fixed the follower 880 oscillated by the action of the double cam and follower arrangement. When the clutch is operated, the cams 880 and 882 operate the feed knife assemblies in the machine cycle as indicated by the timing chart of FIG. 15. The dwells on the cams are so located that the knives 278 are normally located in front of the front edges of the cards in the hopper assembly when the clutch is latched up.

Drive linkage for the card gates

The card gates 50 and 106, it will be recalled, are swung from and to the positions in which they obstruct the card path on the rearward ends of levers 188 and 216, respectively, which are biased downward by springs 190 and 218, respectively. One card gate is provided for each sensing station, and both card gates are simultaneously operated by the left hand clutch 766 shown in FIG. 7 (right hand side of the card feed unit).

The clutch 766 operates the card gates by means of a cam 902 (FIGS. 1 and 7) fixed to the sleeve 788 of the driven element. A roller 904 mounted on the upper or free end of a lever 906 normally rides against the cam 902. The lever is fixed on its other end to a sleeve 908 rotatably mounted upon the shaft 890 and held against endwise displacement thereon by means of collars 910 fixed to the shaft. At the left hand end of the sleeve as seen in FIG. 7, there is rigidly secured to it a downwardly extending lever 912. The free end of the lever 912 is pivotally connected to a generally forwardly and downwardly extending link 914 lying just inside the right hand side plate 134 of the card feed unit framework. The other end of this link is pivotally connected to the lever 196 secured to the transversely extending shaft 194 which operates the card gate 50 through the forwardly extending arms 192 and the card gate 106 through the lever 230 (FIG. 5) connected by the link 228 to the lever 224 fixed to the shaft 222 carrying the forwardly and upwardly extending arms 220 upon which the card gate rests. The springs 190 and 218 attached to the card gate levers 188 and 216 act through the linkage connecting the card gates to the shaft 194 to urge the shaft clockwise, as seen in FIG. 5, so that the link 914 causes the roller 904 on lever 906 to follow the contour of the cam 902.

When the clutch 766 is operated, a high point on the cam 902 on the driven element is made to move the follower against the bias of the springs 190 and 218 to raise the card gates 50 and 106 above the card path. The low point on the cam is formed as a dwell to hold the gate in the card obstructing position for the time indicated by the chart of FIG. 15.

Drive linkage for the interposer interlocks

The interposer interlocks 83 (FIGS. 1, 2, 5, and 6), of which there are two in each translator unit 146 and 148, one beneath each of the interposer bails 68, are rotated out of the path of the interposer bails. The interposer interlocks are mounted on the inner ends of shafts 916 which extend through sleeves 918 mounted in the left hand side plate 132 of the card feed unit framework. Exteriorly of the side plate 132, the shafts mount upstanding levers 920.

The interlocks for the first translator unit are interconnected by a generally horizontally extending link 922. They are connected for operation by the middle clutch 768 (FIG. 7) through a lever 924 fixed to the rear one of the corresponding interlock shafts 916. A stud 926 formed on the upper free end of this lever is pivotally and slidably received in a cross slot 928 formed in a link 930. This link is pivotally connected at its rear end to a laterally extending stud 932 fixed to the lower end of a lever 934. Lever 934 is fixed to one end of a sleeve 936 rotatably mounted upon the shaft 890 and held against axial displacement thereon by means of a collar 938 and the lever 888 attached to the shaft. The other end of the sleeve 936 has fixed to it a follower arm 940 which is provided at its free end with a roller 942 which bears against a cam 944 fixed to the driven element 788 of the middle clutch 768.

The interlock levers 920 for the second translator unit are interconnected by a link 946. The interlock shaft 916 nearest the clutch mounting assembly, that is, the shaft for the interposer bail for the trailing card deck, is provided with lever 948 which, also, is pivotally and slidably connected to the link 930 by means of a laterally extending stud 950 received in a second cross slot 952 formed in the link 930. The cross slots 928 and 952 are provided in the link so as to allow for the arcuate movements of both of the levers 924 and 948 on respective interlock shafts.

Manifestly, all of the interlocks are operated together when the clutch 768 is operated. A spring 954 anchored at one end to a stud 956 extending inwardly from link 922 and at its other end to a stud 958 projecting outwardly from the side plate 132 and a spring 960 anchored at one end to a stud 962, extending inwardly from the link 946 and at the other end to a stud 964 projecting outwardly from the side plate 132, act through the levers 924 and 948 to urge the link 930 endwise to where the follower roller 942 rests against the cam 944. When the clutch is engaged, the cam, which is formed with a low dwell, shifts the interlocks out of the paths of the interposer bail as indicated by the timing chart of FIG. 15.

It should be observed that the interlocks 83 for the translator unit 146, in moving to an inoperative position, are rotated clockwise, while those of translator unit 148 are rotated counterclockwise. It follows that, in moving to ineffective positions, one of the interlocks for each translator unit is swung from beneath the corresponding bail while the other is swung further under its corresponding bail. Thus, in translator unit 146, as seen in FIG. 1, the right hand interlock is swung to one side of the bail while the left hand one is swung further beneath the bail. The situation is the converse in the translator unit 148, as the interlocks are rotated in the opposite direction.

Stacker assembly

The stacker assembly 152 includes those elements which are associated with the stackers 120 for the purpose of collecting the cards, after they have been processed through the machine, in the same order that they were placed in the hopper 20. The components of the stacker assembly are therefore located at the end of the card path which is, as seen in FIG. 1, a curved one reversing its direction and terminating beneath the feed bed 144 and the hopper.

As explained earlier, the continuously rotatable stackers 120 are synchronized with the operation of the card gate 106 so that the fingers 122 on the drums 125 are properly opened to receive oncoming cards and thereafter closed to hold them on to the drums. The two drums are rigidly secured upon a continuously rotatable shaft 966 mounted in suitable bearings in the side plates of the card feed units 132 and 134. The stackers are generally equally spaced from the side edges of the card path and from each other (see FIG. 3.)

Each drum includes a spider 968 (FIG. 1) upon which it is centrally formed. The drum at diametrically opposite points 970 is cut out on each side of the spider and in these cutouts the fingers 122, which occur in pairs, are located. The interior ends of each pair of fingers are fixed to a corresponding cam block 972 which is swingable in the cutout portion of the spider about a corresponding pivot pin 974 carried by the spider 968. Thus each pair of fingers moves together.

Each drum 125 is so secured to the shaft 966 that it will present a pair of fingers into the oncoming card path simultaneously with the other. The pairs of fingers are operated together by interconnecting tie bars 976 rigidly secured at their ends to corresponding finger blocks 972. The fingers, which are biased to closed position by tension springs 978 anchored at one end to lugs 980 projecting from the free ends of the swingable blocks and at their other ends by suitable apertures 982 formed in the spiders, are opened to receive the cards by the engagement of the left hand block of the left hand stacker (FIG. 3) with a roller 984 located in its path of rotation. The roller 984 is carried by an arm 986 adjustably secured to a flange 988 fixed to one end of a sleeve 990 mounted upon the continuously rotatable shaft 966. The other end of the sleeve 990 is provided with an upwardly extending flange 992 which is connected by a U-shaped bracket 994 to the left hand side plate 132 of the card feed unit. When the cam block strikes the roller, the fingers open to receive a card; when it drops off of the roller, the fingers close and hold the card to the rotating drum.

As the drum carries a card around to where the extensions of the tray 128 lie in the card path, the cam block associated with the fingers 122 holding the card engage a second roller 996. This second roller is mounted directly upon the sector 988. The roller 996 operates the cam block so that the fingers release the card as the card engages the tray extensions.

The stacker tray 128 consists of a flat plate 128a which extends horizontally between the side plates 132 and 134 of the card feed unit and upward from the rear to the front. It is supported upon transverse bars 998 fixed to the underside of the side plates as by bolts 1000 (FIGS. 1, 3, and 5). Mounted upon the plate are a pair of longitudinally extending vertical side plates 128b which are spaced apart a distance slightly greater than the standard length of the record cards and suitably secured to the flat plate 128a as by bolts 1002.

The vertical plate 130 against which the record cards are stacked is disposed in a plane generally perpendicular to that of the tray 128. The plate is mounted thereupon by forwardly extending arms 1004 which are provided at their lower ends with outwardly extending slides 1006 frictionally received in grooves 1008 cut out of the adjacent surfaces of the vertical side plates of the tray. The grooves in the side plates are parallel with the upper surface of the tray and thus extend upwardly from the rear toward the front. This provides a downhill path for the plate which, because of gravity, provides the necessary bias for holding the plate 130 against the drums when no cards are in the tray and against the cards when they have been deposited in the tray. The plate 130 will hold the cards in an upright condition.

A switch 1010 (FIGS. 1 and 5) is mounted on the tray adjacent its forward end. A toggle lever 1012 of this switch extends upwardly through an opening 1014 formed in the plate 128a and into the path of the plate 130. When the tray is filled with cards, the plate will engage the toggle lever 1012 and move it to an off position.

*Drive mechanism*

The drive mechanism for the card feed unit is generally located exteriorly of the right hand side thereof. It is tied in with a main shaft of the accounting machine in which it is employed, such as the shaft 1016 shown in FIG. 4a. This shaft is continually rotated at a speed of one revolution per machine cycle during the operation of the machine.

The drive for the heavy duty clutch shaft 776 is directly connected with this main shaft of the accounting machine. A gear 1018 is fixed to the left hand end of shaft 1016 and meshes with a gear 1020 rotatably mounted on a stud 1022 projecting laterally outward from the right side plate 134 of the card feed unit. Gear 1020 in turn meshes with a gear 1024 rotatably mounted on a stud 1026 projecting laterally from the side plate 134. Gear 1024 drives gear 1028 fixed to the end of the clutch shaft 776 projecting through the side plate 134. The gearing is such that the shaft 776 is also rotated once in each machine cycle.

The drive for the continuously rotatable rolls employed to advance the card along the feed path originates with the gear 1020. Gear 1020 is meshed with a gear 1030 rotatably mounted on a stud 1032 projecting outwardly from the side plate 134. Gear 1030 in turn meshes with a gear 1034 mounted on a stud 1036, and gear 1034 drives a gear 1038 mounted on a stud 1040. The studs 1036 and 1040 both project from the side plate 134.

A gear 1042 is driven by the gear 1038 and rotatably mounted on the right hand stud 160 also carrying the arm 156 on the free end of which is mounted the right hand end of the shaft 154. A gear 1044 on the outer end of shaft 154 is driven by gear 1042, and it can be seen that if the arm bearing the shaft 154 swings about the shaft 160, the gear 1044 will nevertheless remain in positive driven engagement with the gear 1042. The shaft 154 is provided with a second gear 1046 interiorly of the right side plate 134. This gear meshes with a gear 1048 fixed to the feed roll shaft 316 carried by the card bed 144. It is through the gear 1048 that the rest of the feed roll shafts, all of which are mounted on the feed bed, are driven.

The next feed roll shaft 318 is driven through a gear 1050 rotatably mounted on a stud 1052 projecting inwardly from the right hand flange of the feed bed. Gear 1050 in turn meshes with a gear 1054 secured to the right hand end of the feed roll shaft 318.

The feed roll shaft 390 mounted on the elevator platform 52 of the first translator unit 146 is driven through a gear 1056 rotatably mounted on a stud 1058 projecting inwardly from the right hand flange of the feed bed. Gear 1056 meshes with a gear 1060 fixed to the end of the shaft 390 projecting beyond the right hand end of the elevator platform 50. Gears 1056 and 1060 are of such size that the small vertical movement undergone by elevator platform 52 during raising and lowering does not interrupt the driving connection.

Gear 1062 driven by the gear 1060 and rotatably mounted on an inwardly projecting stud 1064 also is of such size that the raising of the elevator does not interrupt its continuous rotation. Gear 1062 drives the feed roll shaft 320 through a gear 1066 fixed to the shaft 320.

The feed roll shafts 322, 390, and 324 of the second translator unit 148 are all driven in similar manner. Thus, a gear 1068 rotatably mounted on a stud 1070 is driven by the gear 1066 and in turn drives a gear 1072 fixed to the shaft 322. Gear 1072 drives a gear 1074 rotatably mounted on a stud 1076, which in turn drives a gear 1078 fixed to the right hand end of the elevator platform shaft 390. The last feed roll shaft 324 is driven by gear 1078 through a gear 1080 on a stud 1082 and meshing with a gear 1084 fixed to shaft 324.

It will now be evident that only the lower feed rolls of each set of feed rolls is positively driven. The upper feed rolls are frictionally driven by contact with either the corresponding lower rolls or a card passing therebetween and, as has been shown, are each suitably biased towards contact with the lower rolls.

The drive to the stacker mechanism is taken through a gear 1086 which is fixed to rotate with the gear 1020 on the stud 1022. Gear 1086 meshes with a gear 1088 rotatably supported by a stud 1090 on the side plate 134. A gear 1092 is fixed to the gear 1088 to rotate therewith and meshes with a gear 1094 rotatable on a stud 1096. The gear 1094 drives a gear 1098 fixed to the right hand end of the stacker drum shaft 966. The gearing to the stacker drum shaft is such that a set of fingers will be presented to the incoming card path once in each machine cycle. Since the stacker has two sets of fingers, it follows that the shaft 966 will be rotated once in each two machine cycles.

The drive to the stacker is also employed to rotate continuously the feed roll shaft 250. To this end, a gear 1100 is fixed to the right hand end of shaft 250 and meshes with the gear 1094. The choice of the gearing is such as to advance the card along the card path at the desired speed.

The drives to the translator units 146 and 148 emanate through the gear 1024 to which is fixed a gear 1102. The gear 1102 drives the translator unit 146 through a gear 1104 rotatably mounted on a stud 1106 projecting outwardly from the right side plate 134. Gear 1106 in turn drives a gear 1108 rotatably mounted on the right hand end of the contact latch operating cam shaft 628. The "hole" and "no-hole" bail shafts 532 for the translator unit are rotated once in each machine cycle through gears 1110 fixed to the right hand ends of the shafts and meshing with the gear 1108.

The contact latch operating cam shaft 628 is not driven directly by the gear 1108 but instead through a gear 1112 which is fixed to the right hand end of the shaft. Gear 1112 is driven by a gear 1114 rotatably mounted on a stud 1116 projecting from the right side plate 134. A second gear 1118, also rotatably mounted on the stud 1116, is fixed to the gear 1114 for rotation therewith. Gear 1118 is driven by the gear 1108. In this way the desired speed is imparted to the shaft 628.

The drive to the translator unit 148 is similar to that for the translator unit 146. Thus, the gear 1102 drives a gear 1122 rotatable on a stud 1124. Gear 1122 drives a gear 1126 rotatably mounted on the cam shaft 628 and in driving engagement with the associated "hole" and "no-hole" bails cam shafts 532 through gears 1128 fixed to the right hand end thereof. The cam shaft 628 is driven through a gear 1130 fixed to rotate with it and meshing with the gear 1132 rotatably mounted on a stud 1134. A gear 1136 fixed to rotate with gear 1132 on stud 1134 is driven by gear 1126.

*Wiring diagram*

The control of the card feed unit is effected externally thereof by the accounting machine in which it is employed. Thus, whether any of the clutches are unlatched in a machine cycle is determined by the program under which the accounting machine is being operated. It suffices to point out here, and as is shown in FIG. 16, that all three of the clutch magnets 788 are disposed in circuits which may be closed by the points of relays controlled by the accounting machine. Thus, the picker knives clutch magnet 848 may be under the control of a relay 1142 closing, when energized, normally open contacts 1144. Similarly, the card gate clutch magnet 848 is in circuit with points 1146 controlled by a relay 1148, and the interposer interlock clutch magnet 848 is in series with points 1150 operated by relay 1152.

Since the card feed unit is to be stopped when the stacker tray 152 is filled to capacity, the toggle switch 1010 is disposed in one side of a 40-volt supply line and so as to be in series with each of the clutch magnets 848.

The card lever operated contacts 170 and 260 are not shown in the wiring diagram because they are disposed in accounting machine circuits which may vary and since they operate to signal to the accounting machine the passage or non-passage of a record card along the card path. Neither have the circuits for the terminal bars 72 and contact wire 74 been shown, since it can be readily appreciated that each of the circuits leads to a separate terminal on a terminal board for ready connection to any of a number of different elements of the accounting machine. The specific connections would be determined by the program.

Operation

The operation of the embodiment disclosed may be best understood when considered as part of an accounting machine. With a fresh supply of cards in the hopper 20, the initiation of operation will be characterized by rotation of the main shaft 1016 of the accounting machine. Rotation of this shaft will be assumed to start sufficiently early in a machine cycle to permit energization of the clutch magnets 848 in time for the respective clutches to be engaged in that cycle. This cycle will be called the first cycle. Of course, if rotation of the shaft starts too late in that cycle, the next cycle will be considered as being the first cycle.

In the first cycle, only the picker knife clutch 764 need be engaged. To this end a pulse originating in the accounting machine would energize relay 1142 to close its points 1144 and complete a circuit through the picker knife clutch magnet 848. The picker knife clutch would thereupon be unlatched and would engage at 285° of the first cycle, which is the time of engagement for all of the clutches.

The picker knife clutch cams 880 and 882 will operate the card feed knives starting at 27° of the second cycle. The bottom card in the feed hopper will be moved by the picker knives to where it is engaged by the continuously rotating first set of upper and lower feed rolls 28 and 30 at 75° of the second cycle. The picker knives will complete their rearward movement at 95° and will thereupon begin restoration back to their normal position beyond the front end of the lower hopper card, the restoration being completed at 175°. The card will be progressively advanced along the card path by the feed rolls 28 and 30, and thereafter by the continuously rotating lower feed rolls 40 and 48 cooperating respectively with the biased rolls 38 and 46 until it is stopped by the card gate 50 of the first translator unit at 255° of the second cycle. The card is now disposed at the first sensing station.

In passing from the hopper 20 to the first sensing station, the card lever 32 was tripped to shift the points of the transfer contacts 170 and signal a means, such as a stepping switch in the accounting machine, to set up potential data designating circuits through the respective pairs of contacts 72 and 74 of the translator unit 146. The data designating circuits of the second translator unit will be held open during the read cycle since there is no card at the second sensing station as yet, and the failure to hold the circuits open would result in erroneous readings.

Shortly after the card arrives at the first sensing station, it is read. Thus, at 274° the card elevator platform 52 is raised to move the card against the lower ends of the sensing pins 54. These will now be displaced according to the presence or absence of perforations at corresponding index point positions on the card. The upward movement of the elevator platform 52 is completed at 322° of cycle time, and shortly thereafter, specifically at 337° of cycle time, the elevator mechanism begins to restore, leaving those sensing pins for which no perforations existed at corresponding index point positions in their raised positions. The card data is thus in mechanical storage. The card elevator restores completely by 44° of the following or third cycle.

With the positioning of the sensing pins 54, the unit is ready for the release of the test pins 56 which are positioned by the sensing pins according to the presence or absence of perforations at corresponding index point positions in the card which was just read. Thus, between 321° and 345°, the test pin bails 107 are shifted, and the test pins corresponding to those index point positions for which no perforations existed are permitted to move to advanced positions, while those for which perforations existed at corresponding index point positions are stopped in intermediate positions by the shoulders 58 formed on the upper end of the sensing pins.

With the positioning of the test pins, the machine is now ready to translate the combinationally coded data read from the card in the second cycle into differentially timed impulses in the duodecimal code. Thus, just before the completion of the movements of the test pins 56, the interposer bails are released for upward movement under action of springs 552 to relinquish control of the interposer rods 66. This upward movement, if permitted, commences at 342° of the second cycle and finishes at 8° of the third cycle.

It will be recalled, however, that in order for the interposer bails 68 to move upward after they are released, the interposer interlocks 83 must first be operated. Thus, if there is to be a translation in the third cycle of the data read from the first card in the second cycle, the interposer interlock clutch 768 must be engaged in the second cycle. Assuming that the first card is to be read at the first sensing station in the third cycle—the usual procedure—the relay 1152 would be energized by an accounting machine pulse before 285° of the second cycle to close the points 1150 and complete a circuit through the interposer interlock clutch magnet 848 to unlatch the interposer interlock clutch. The clutch will engage at 285°, and at 300° the cam 944 will begin to shift the interlock, and this action will be completed at 340°. The interlocks will be in this adjusted position when the interposer bails are released at 342°, thus permitting their upward movement to release the interposer rods 66.

When the interposer bails 68 release the interposer rods 66, the control thereof for the ensuing pulse period of the third cycle passes to the "hole" and "no-hole" bails 62 and 64, respectively. The "no-hole" bails 64 during the non-pulse half of a machine cycle occupy a position intermediate the raised and depressed positions thereof and thus will be effective through those test pins 56 which were disposed in the advance position because no perforations existed at corresponding index point positions to take over control of the released interposer rods at 348° of the second cycle. The "hole" bails 62 are raised during the non-pulse period of a machine cycle so as not to interfere with the test pin positionings, and accordingly, after the test pins have been positioned, they are moved down at 345° so as to be in proximate engagement with the extensions 508 of those test pins which were disposed in the intermediate position. This downward movement is completed at 360° of the second cycle.

In accounting machines the differentially timed impulses, respectively representative of the 9, 8, 7, 6, 5, 4, 3, 2, 1, 0, 11 or X, 12 or R digital values, are normally received in that order and at 15° intervals. Each pulse is of 8° duration and is spaced from the preceding pulse by 7°. Conveniently, the pulse period occupies the first portion of a machine cycle, and the first pulse may occur 7° after the start thereof. The end of the pulse period occurs at the midway point of the cycle.

The first pulse that would be received by the accounting machine is the one representative of the 9 digital value. In the code employed, the value 9 would be recorded on the card in a deck column as a combination of perforations at the 8 and 1 index point positions. Thus, for 9 time, the 8 and 1 "no-hole" bails 64 must be depressed to ascertain presence or absence of perforations at the 8 and 1 index point positions. At 348° in the second cycle the 8 and 1 "no-hole" bails move slightly downward from their intermediate non-pulse period positions to force slightly downward, from the positions in which they took over control thereof from the interposer bail, the interposer rods 66 corresponding to deck columns which do not have perforations at either or both of the 8 and 1 index point positions. This action is effected through the offset portions 508 of the corresponding test pins 56 and the interposer rod lugs 474 and insures that the corresponding rocker arms 76 are not moved against their bias by the interposer rods to where they permit the biased contact wires 74 to engage the corresponding contacts 72 and transmit a pulse at 9 time. Conversely, the interposer rods 66 corresponding to the deck columns having perforations at the 8 and 1 index point positions will, so far as the "no-hole" bails are concerned, move upward to rotate the corresponding rocker arms 76 and allow the corresponding wires 74 to engage the corresponding contacts 72 while the first pulse emanates from the emitter. Since the 8 and 1 code elements do not together constitute part of the code elements of another digital value, no "hole" bails 62 are operated at 9 time, and thus the "no-hole" bails alone control the interposer rod movement.

In FIG. 2 there is shown a column in the trailing deck of a card 1154. By way of example, the deck column is perforated only at the 2 and 4 index point positions to represent the 6 digital value. Thus the 1 and 8 sensing pins for that deck column were raised and the corresponding test pins were disposed in advanced positions. Therefore, at 9 time, the 8 and 1 test pins for that deck column will both be effective to hold the interposer rod for that deck column against advancement to the contact closing position.

The digital value 8 is the next one to be tested for. This value is represented by a perforation at the 8 index point position in a deck column. Therefore, at 8 time the 8 "no-hole" bails 64 must be down to hold those interposer rods for which no perforations exist in the 8 index point positions for the corresponding deck columns. Since the 8 bails already were depressed to determine the presence of an 8 perforation for 9 time, they are held over in their depressed condition and remain effective to hold down all of those interposer rods they held at 9 time. On the other hand, the 1 "no-hole" bails which were depressed for 9 time began to recede at 6° of cycle time in the third cycle so as not to be effective at 8 time. Their receding action is completed at 21°.

So far the machine has merely determined whether or not an 8 perforation exists in the different card columns. It must also ascertain that no 1 perforation exists in the corresponding card columns having an 8 perforation, for otherwise a 9 digital value is recorded and not an 8 digital value. Thus, at 6° of cycle time the lowering of the 1 "hole" bails is begun, and these bails are effective upon all of those interposer rods whose corresponding deck columns are perforated at the 1 index point position because the corresponding test pins are in intermediate position, leaving their offsets 508 in the path of movement of the 1 "hole" bails. It will be evident that the 1 "hole" bails will be effective to restore before 8 time those interposer rods which had moved upward for 9 time. The remainder of the interposer rods corresponding to those deck columns containing no 8 perforation are already being held down by the 8 "no-hole" bails so that the action of the 1 "hole" bail at 8 time is merely supplementary. In the example shown in FIG. 2, there is no perforation at either the 1 or the 8 index point position, so that the corresponding test pins were disposed in an advanced position. Thus the 1 "hole" bail is ineffective to hold the interposer rod away from a switch closing position. However, the 8 "no-hole" bail is effective, so that no data designating circuit will be completed for the transmission of the pulse emanating from the emitter between 22° and 30° of the third cycle. The 1 "hole" bail reached its maximum downward position at 21° of cycle time.

The next digital value to be tested for is 7. This value is a combination of perforations at the 4, 2, and 1 index point positions. Thus, at 7 time the 4, 2, and 1 "no-hole" bails are depressed to ascertain the presence or absence of perforations at these index point positions in each deck column. Since an 8 perforation forms no part of this combination, the 8 "no-hole" bail was restored between 21° and 36° of cycle time. The 4, 2, and 1 "no-hole" bails, however, are moved downward simultaneously with the restoration of the 8 "no-hole" bail so that control of the interposer rods passes over in the event that one or more of the 4, 2, and 1 index point positions in a column are not perforated. Since the 4, 2, and 1 combination is not a component of a still larger combination, there is no need to depress any of the "hole" bails, and the 1 "hole" bail which was depressed is restored between 21° and 36°. In the example shown in FIG. 2, perforations exist at the 4 and 2 index point positions but not at the 1 index point position. Thus, a 6 value is recorded in the deck column and not the 7 value being tested for. The 4 and 2 "no-hole" bails will operate on the corresponding test pins to depress them, but these test pins will be ineffective to hold the interposer rod in its downward position because the offset 508 moves in the path clear of the lugs 474 on the corresponding interposer rod. However, an upward movement of the interposer rod is prevented by the action of the 1 "no-hole" bail; for the test pin for the 1 index point position is in an advanced position and upon being depressed, its offset 508 engages the corresponding lug 474 to hold the interposer rod down. Hence, no circuit will be completed at 7 time even though perforations exist for some of the component elements of that digital value.

The 6 pulse occurs in the period between 52° and 60° of cycle time. The digital value 6 is represented in a deck column by perforations at the 4 and 2 index point positions. Thus, the 4 and 2 "no-hole" bails which were depressed at 7 time are held depressed for 6 time while the 1 "no-hole" bails are permitted to restore. Since the code elements for the 6 digital value constitute two of the three code elements for the 7 digital value, it is necessary to depress also at this time the "hole" bail for the other code element, specifically the 1 "hole" bail. In the example of FIG. 2, the depression of the 4 and 2 "no-hole" bails is ineffective to prevent upward movement of the interposer rod because the offsets 508 are clear of the path of the corresponding lugs 474 on the interposer rod. Also because the test pin for the 1 index point position was permitted to move to an advanced position, the 1 "no-hole" bail is ineffective to prevent upward movement of the interposer rod. Thus, at 6 time none of the "hole" or "no-hole" bails will be effective through the test pins upon the interposer rod of FIG. 2, and it will move upward under the action of its spring 478 to strike the arm 78 of the corresponding rocker 76 to rotate it counterclockwise to where it permits the corresponding biased contact 74 to strike the silver inlay tip 606 on the contact 72. The rocker 76 is held by the latch arm 80 which drops behind the projection 82 formed on it. It will be evident that the pulse emanating from the emitter between 52° and 60° of cycle time will be transmitted through the common element 70, the wire contact 74, and contact 72 to indicate the presence of the 6 digital value in the corresponding card column.

The interposer rod will be restored to a position permitting the reopening of the contacts 74 and 72 by the "hole" and "no-hole" bails operated to determine the presence or absence of the next digital value, specifically 5.

The digital value 5 is represented by a combination of perforation at the 4 and 1 index point positions and, therefore, at 5 time the 4 and 1 "no-hole" bails are depressed. The 4 "no-hole" bail will be ineffective to restore the interposer rod because the corresponding test pin was disposed in an intermediate position, and therefore, the offset 508 moves in a path clear of the lug 474 on the interposer rod. The 1 "no-hole" bail, however, is effective to restore the interposer rod, for the test pin for the 1 index point position is disposed in an advanced position, and its offset portion 508 will strike the corresponding lug 474 on the interposer rod to lower the rod and hold it down at 5 time. The 2 "no-hole" bail which was depressed at 6 time is restored by 5 time, since the 2 index point position forms no element of the 5 digital value. Similarly, the 1 "hole" bail which was operated at 6 time is restored because the 1 index point position is a code element of the five digital value. However, the 2 "hole" bail is depressed at 5 time because the 2 index point position may be perforated along with the 4 and 1 index point positions to represent the 7 digital value as considered before. Thus, in the example shown in FIG. 2, the interposer rod 66 will also be restored by the action of the 2 "hole" bail; for the 2 test pin is in the immediate position with its offset portion 508 in the path of the 2 "hole" bail, and hence will be depressed to force downward the corresponding lug 474 and therethrough the interposer rod.

The restoration of the interposer rod is followed almost immediately by the restoration of the rocker 76 under the action of its spring 576. The restoration is effected by the action of the octagonally shaped cam 622 whose rotation is synchronized with the rotation of the main drive shaft 1016. It rotates at such a speed that the projections 624 are presented to restore the latches at 15° intervals of cycle time. One of the projections will strike the latch 80 at the end of the pulse period to swing it counterclockwise to withdraw it from behind the offset 82 of the rocker 76. Thus, the rocker is effective to separate the contacts 72 and 74 immediately after the pulse emanating from the emitter terminates.

At 4 time the 4 "no-hole" bails alone are down, the 1 "no-hole" bails restoring after 5 time. Since the element 4 may be combined with the elements 1 and 2 to indicate the 5, 6, or 7 digital values, the 1 and 2 "hole" bails are also down at 4 time, the 2 "no-hole" bail remaining there from 5 time while the 1 "no-hole" bail is newly depressed. Since, in the example shown, a 4 perforation exists in the card, the 4 "no-hole" bail will be ineffective to prevent upward movement of the interposer rod. The 1 "hole" bail will also be ineffective. The interposer rod will be held down, however, by the action of the 2 "hole" bail, since the extension 508 of the corresponding test pin 56 lies in its path of movement.

The following pulse time is representative of the 3 digital value. Since the digital value 3 is a combination of the 1 and 2 code elements, the 1 and 2 "no-hole" bails are down. Both are newly depressed while the 4 "no-hole" bail restores. Because the 1 and 2 code elements may be combined with the 4 code element to represent the digital value 7, the 4 "hole" bail also is depressed at 3 time while the 1 and 2 "hole" bails which were depressed at 4 time are raised. In the example of FIG. 2, the 1 "no-hole" bail will be effective to take over control of the interposer rod from the 2 "hole" bail and hold it down, as the 1 test pin is in the advanced position. The 2 "no-hole" bail will be ineffective because the corresponding test pin is in the intermediate position. While the action of the 4 "hole" bail is unnecessary in the example shown because of the lack of a perforation at the 1 index point position, it also is operative to hold the interposer rod down because the corresponding test pin is located in the intermediate position.

The following pulse time is representative of the 2 digital value. Thus, the 2 "no-hole" bails remain down, while the 1 "no-hole" bails are restored down at 3 time. Since the code element 2 may be combined with either and both of the code elements 1 or 4, the 1 and 4 "hole" bails also must be down at 2 time. The 4 "hole" bails remain down from 3 time; the 1 "hole" bails are newly depressed. In the example of FIG. 2, the 2 "no-hole" bail is ineffective to hold the interposer rod down because a perforation exists at the 2 index point position. However, one of the "hole" bails which are down at this time will be effective to do so. The 1 "hole" bail is ineffective because the corresponding test pin is in the advance position. The 4 "hole" bail is effective, however, because the corresponding test pin was stopped in intermediate position and lies within its operative path. Thus, no data designating circuit will be completed at 2 time, even though a perforation exists at the 2 index point position.

From 127° to 135° the pulses repesentative of the 1 digital value are made. Thus, at 1 time the 1 "no-hole" bail alone is down; and the 2 "no-hole" bail, which was down at 2 time, is raised. Also, the 8, 4, and 2 "hole" bails are operated because the code elements 8, 4, and 2 may be combined with the 1 code element to designate other digital values. With a deck column as shown in FIG. 2, the 1 "no-hole" bail will be effective to hold the interposer rod down because no perforation exists at the 1 index point position. The interposer rod will also be held down by the action of the 2 "hole" bail and the 4 "hole" bail. The 8 "hole" bail is ineffective.

It will be observed that so far only the operations concerned with the numerical digital values 9 through 1 have been discussed. These values consist of perforations, both individually and in combination, of the 8, 4, 2, and 1 index point positions. The combination or zone control digital values of 10 or 0, 11 or X, and 12 or R are tested for last, and, as pointed out, consist respectively of perforations at the 0, the X, and the 0 and X index point positions. Thus, at O time the 0 "no-hole" bail and the X "hole" bail are placed in depressed conditions. At 11 time the X "no-hole" bail and the 0 "hole" bail are the ones that are down. At 12 time both the 0 and the X "no-hole" bails are down, but none of the "hole" bails. In the example shown, there are no perforations at either the 0 and X index point positions, so no circuits will be completed at 10, 11, and 12 time. In each instance, the depressed "no-hole" bail or bails, as the case may be will hold the interposer rod against upward movement. The "hole" bails will be ineffective.

It should have been noted that the "no-hole" bails that are in an operated condition at the different pulse times are those whose corersponding index point positions, if perforated, constitute the code elements of the respective digital values. Similarly, the "hole" bails that are operated at the different pulse times are those whose corresponding index point positions, if perforated along the index point positions being tested by the "no-hole" bails, would designate other digital values.

With the completion of the pulse period at 180° of the machine cycle, all of the "hole" and "no-hole" bails are restored to their intermediate dwell positions. For the 8, 4, 2, and 1 "no-hole" bails, this action starts at 171° and is completed at 204°. The 0 and X "no-hole" bails which were in a down condition at 12 time also begin their restoration at 171°, but their movement is an upward movement to the intermediate dwell position which is reached by 186° because of the smaller amount of travel required. All of the "hole" bais were in an up condition at 12 time, and their normal dwell positions are still higher to insure that their ends lie above the restoring paths of movement of the test pins 56. The restoration takes place between 182° and 197° of the machine cycle.

At the same time that the "hole" and "no-hole" bails are restored, the interposer bails 68 are depressed to take over control of the interposer rods 66. This simultaneous action insures that none of the rods will escape upwards to rotate the respective rocker arms 76 and permit a closing of the corresponding contacts 72 and 74, although no harmful results would come from this as no pulses are emanating from the emitter, and the cam 622 would be effective to unlatch the rocker arms 76 for restoration to their normal positions a few degrees after the interposer rods were lowered. The depression of the inttrposer bails begins at 171° and is effective to begin lowering of any interposer rods released to indicate the 12 digital value and to take over control of the remaining interposer rods from the rising "no-hole" bails at 178°30′. The interposer bails have lowered the interposer rods to their fully restored position by 204° of cycle time.

With the restoration of the interposer rods 66, the test pin bails 107 may be restored to their normal positions, as the lugs 474 on the interposer rods will not now interfere with the test pin movements. Thus, the test pin bails 107 are moved against the downward extensions 506 on the respective test pins to effect an endwise movement of the test pins back to their normal positions in which the forward extensions 498 thereon are out of the paths of movements of the shoulders 58 formed on the upper end of the sensing pins 54. The action of the test pin bails begins at 204° cycle time and is completed by 234°. The test pin bails remain in this advanced position to hold the spring-biased test pins in their normal position until later in the cycle.

After the restoration of the test pins, the sensing pins may be lowered to their normal position. Thus, at 234°, the sensing pin bails 108 are lowered to engage the upper ends of the sensing pins 54 and move them downwardly. Only those sensing pins need be lowered which were raised because of the absence of a perforation at the corresponding index point position on the last card that was read; those sensing pins for which a perforation did exist having remained in their down position as explained before. The translator unit will now again be in a condition to read and translate the data contained on a card at the respective sensing station. The sensing pin bails reach their lowermost point at 274° and then begin to return to their normal position, an action which is completed by 304°. The sensing pins do not follow the upward movement of the bails 108 and remain in their normal position because of friction with the supporting framework.

The card at the first translator unit may either be the first card that was fed from the hopper 20, or it may be the second card. If it were desired to reread the first card, the card gate clutch 766 and the picker knife clutch 764 would not have been operated with the result that the card at the first sensing station would have remained there and no new card would have been fed from the hopper. Of course, the interposer interlock clutch 768 would have to be operated in the third cycle to permit such a retranslation to take place in the fourth cycle. Assuming now, however, that it was not desired to reread the first card in the first sensing station, pulses emanating from the accounting machine would have energized both of the relays 1148 and 1142 to pick up the card gate clutch magnet 848 and the picker knife clutch magnet 848. These pulses would have occurred before 285° of the preceding or second cycle (not the third cycle in which the data on the first card was translated at the first sensing station). Thus, while the data on the first card was being translated in the third cycle, the card gate 50 would have been raised to permit the first card to advance to the second sensing station as soon as the card elevator platform 52 returned to its normal or down position. This normal or down position of the elevator platform is attained at 44° of a machine cycle. The card gate starts its upward movement at 38° and clears the card path by 49°. It arrives at its raised position at 58°. As soon as the card bate clears the card path, the card which has been lowered by the elevator mechanism leaves the first sensing station under the impetus of the cooperating set of rolls 46 and 48 and is grasped by the cooperating set of rolls 86 and 88 and advanced thereby to the cooperating set of rolls 92 and 94 and then passes on to the cooperating set of rolls 102 and 104 carried by the elevator mechanism of the second translator unit 148.

It will be apparent that the card gates 50 and 106 cannot be restored before the first card has cleared the first sensing station, an event which occurs at 132° cycle time. After providing a safety factor, the card gate undergoes a restoring movement between 180° and 200°. This disposes the card gates 50 and 106 in the card paths before the first card arrives at the second sensing station under the final action of the rolls 102 and 104 and before the second card arrives at the first sensing station under the action of the rolls 46 and 48 at 255° cycle time. The second card was advanced to the first station in the same manner as described with the first card. It will now be apparent that when the card elevator mechanisms for both translator units are raised starting at 274° of the third cycle, both the first and the second cards will be read at the respective sensing stations. The reading and translating of the data contained thereon will be as was explained before for the reading and translating for the first card at the first translating station, provided that the interposer interlock control relay 1152 is pulsed before 285° of the third cycle. For the purposes of this description, it will be assumed that relay 1152 was energized. Accordingly, the data on the first and second cards will be translated during the first half of the fourth cycle.

It may be desired to retranslate the first and second cards at the respective sensing stations in the fifth cycle, and in this event neither the card gate clutch 766 nor the picker knife clutch 764 would be operated in the third cycle. Thus, when the elevator mechanisms restored in the fourth cycle, the card gates would not clear the card paths, and the cards would not be permitted to move out of the respective sensing stations under the impetus of the cooperating rolls 46 and 48, and the cooperating rolls 102 and 104. The cards would still be in place when the elevator mechanism is raised near the end of the fourth cycle, and they would be reread for translation in the fifth cycle. The interlock clutch 768 would be engaged in the fourth cycle.

If there is to be only one rereading of the first and second cards, the card gate clutch and the picker knife clutch would be engaged near the end of the fourth cycle to operate the card gate and the picker knives in the fifth cycle. Thus, in the fifth cycle the first card at the second sensing station would be fed to the stacker, whereas the second card at the first sensing station would be fed to the second sensing station, and the third card would be fed from the bottom of the hopper and to the first sensing station. Near the end of the fifth cycle, the second and third cards would be respectively read by the second and first translator units 148 and 146, and the data which was stored by the displaced sensing pins would be translated into differentially timed impulses in the sixth cycle if the interposer interlock clutch 768 is engaged in the fifth cycle.

The first card in moving from the second sensing station to the stacker in the fifth cycle would have been urged by the cooperating set of rolls 102 and 104 to where it struck the guide 109 and, after being deflected therealong, was grasped by the cooperating set of rolls 110 and 112. The latter rolls will advance the card along the card guide 109 to where it passes between the continually rotatable cooperating rolls 114 and 116. The latter rolls will further advance the card along the card guide past where it operates the card lever 118 and on to where it is received between the fingers 122 momentarily separated from the surface of the stacker drum 125 of the stacker 120. With the card between the fingers and the drum, the rotating drum advances to where the cam block 972 fixed to the fingers 122 drops off of the roll 124 carried by the bracket 986, and under the action of the spring 978, the fingers close to hold the card onto the drum surface. The card is now carried around by the drum to where projections of the stacker tray 128 lie in the card path. When the card strikes these projections, it is of course stopped, and at the same time the fingers 122 are swung outward by the engagement of the cam block 972 with the fixed roll 996. The card is therefore disposed on the stacker tray, and the stacker plate 130 will move upward and outward on the stacker tray against the bias of gravity a distance sufficient to accommodate the thickness of the card.

A program may be set up in the machine under which it may be desired to retranslate the data on the second and third cards again but not in the immediately following cycle. Thus, the second and third cards would not be permitted to leave the second and first sensing stations in the sixth cycle, and the interposer interlocks 83 would not be removed from beneath the interposer bails 68 to prevent a retranslation of the card data in the seventh cycle. Accordingly, the card gate clutch and the picker knife clutch would not be operated in the fifth cycle in order to maintain the second and third cards at the second and first translator units in the sixth cycle. Similarly, they will not be operated in the sixth cycle so that the cards may remain there for translation in the seventh cycle. On the other hand, if there is to be no translating of the card data in the seventh cycle, the interposer interlock clutch will not be operated in the sixth cycle with the result that the interposer bails will not be allowed to swing in the seventh cycle to positions in which they pass control of the interposer rods 66 to the "hole" and "no-hole" bails 62 and 64, respectively. Thus, in the seventh cycle none of the data which was read from the card at the end of the sixth cycle will be translated into differentially timed impulses. In the seventh cycle the test pins and the sensing pins will be restored in the normal fashion.

Since there is to be retranslation of the second and third cards in the eighth cycle, the interposer interlock clutch will be engaged in the seventh cycle to permit a retranslation of the data to take place. Whether or not the card gate and picker knife clutches are operated will depend on the nature of operation desired for the ninth cycle, which may take any of the forms just described.

The machine will operate in this fashion until the last card is fed from the hopper. When the last card is fed from the hopper, the hopper card lever HCL will be operated to open the hopper card lever contacts HCLC and signal the accounting machine that the last card has been fed. The machine will then read and translate the last and second last cards at the first and second sensing stations, respectively, and thereafter operate according to the program employed. If there is no program for the remaining cycles, it will be necessary to depress the accounting machine run-out key which will result in the feeding of the last card to the second sensing station and the second last card from the sensing station to the stacker. After operating through one cycle, the machine will again come to a stop, and it will be again necessary to press the run-out key to remove the last card from the second sensing station and dispose it in the stacker.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a device for converting into another code data expressed in one code, first means including an element for each code position and simultaneously selectively conditionable according to the presence or absence of manifestations of the data expressed, second means conditionable at differential times to indicate the expressed data, and means sequentially operable upon the first means to position the second means at different times according to the data expressed.

2. In a device for converting into differentially timed manifestations in another code data expressed in one code as manifestations at different index point positions, a first means for each of the index point positions positionable according to the presence or absence of manifestations thereat, second means for each of the index point positions to adjust the various first means according to their positions, and means for manifesting the data in the another code positionable by the first means under the control of the second means according to the data expressed.

3. In a device for converting into differentially timed manifestations in another code data expressed in one code as manifestations at different index point positions, a first means for each of the index point positions positionble according to the presence or absence of manifestations thereat, second means for each of the first means operable at different times to position the first means according to their positions, and third means for manifesting the data expressed and controlled by the first means according to the operation of the second means.

4. In a device for converting into differentially timed manifestations data expressed in another code as a combination of a number of different indicia, a first means for each of the different indicia in the another code and positionable according to the presence or absence of the indicia, second means for manifesting at the differential times the data expressed in the another code, and means for each of said first means for adjusting the latter according to its position at different times and so as to correspondingly control the second means.

5. In a device for converting into differentially timed manifestations data expressed in another code as a combination of a number of different indicia, first means for each of the different indicia of the another code positionable according to the presence or absence thereof, second means positionable at differential times to manifest said data, third means for each of said first means operated at those times that the data designated is comprised of code indicia including the corresponding one and effective to shift the first means if positioned according to the absence of the code indicia to prevent the second means from manifesting data at that particular time, and fourth means for each of the first means operated at those times that the corresponding code indicia if present with the code indicia being tested for by the third means would designate other data and effective to shift the first means if positioned according to the presence of the code indicia to prevent the second means from manifesting data at that particular time.

6. In a device for converting into differentially timed impulses data expressed in another code as a combination of a number of different indicia, first means for each of the different indicia of the another code positionable according to the presece or absence thereof, circuit closing means releasable at differential times to indicate said data, third means for each of said first means operated at those times that the data designated is comprised of code indicia including the corresponding one and effective to shift the first means if positioned according to the absence of the code element to hold the circuit closing means against release at that particular time, and fourth means for each of the first means operated at those times that the corresponding code indicia if present with the code indicia being tested for by the third means would designate other data and effective to shift the first means if positioned according to the presence of the code indicia to hold the circuit closing means against release at that particular time.

7. In a device for converting into differentially timed impulses data expressed in another code as a combination of a number of different indicia, first means for each of the different indicia of the another code positionable according to the presence or absence thereof, circuit closing means biased towards the circuit closing position, third means for each of said first means operated at those times that the data designated is comprised of code indicia including the corresponding one and effective to shift the first means if positioned according to the absence of the code indicia to hold the circuit closing means against its bias at that particular time, and fourth means for each of the first means operated at those times that the corresponding code indicia if present with the code indicia being tested for by the third means would designate other data and effective to shift the first means if it is positioned according to the presence of a perforation to hold the circuit closing means against its bias at that particular time.

8. In a mechanism for translating into differentially timed electrical impulses digital values designated on a record as a coded combination of manifestations at different index point positions, first means for sensing the presence or absence of manifestations at the different record index point positions, second means corresponding to each of said sensing means and positionable thereby according to the absence or presence of a manifestation at corresponding index point positions, circuit closing means biased toward a circuit closing position, and other means corresponding to each of said second means and operated each time that an impulse represents a digital value whose designation includes a manifestation at the corresponding index point position, said other means being effective to restrain biased movement of the circuit closing means through the corresponding second means if that means was positioned according to the absence of a manifestation at the corresponding index point position.

9. In a mechanism for translating into differentially timed electrical impulses digital values designated on a record as a coded combination of manifestations at different index point positions, sensing means for detecting the presence or absence of manifestations at the different record index point positions, testing means corresponding to each of said sensing means and positionable thereby according to the absence or presence of a manifestation at the corresponding index point position, circuit closing means biased toward a circuit closing position, other means corresponding to each of said second means and operated each time that an impulse represents a digital value whose designation includes a manifestation at the corresponding index point position, said other means being effective to restrain biased movement of the circuit closing means through the corresponding testing means if that means was positioned according to the absence of a manifestation at the corresponding index point position, and still other means corresponding to each of said second means and operated each time that an impulse represents a digital value whose designation comprises manifestations which if appearing with a manifestation at the corresponding index point position would represent another digital value, said still other means being effective to restrain biased movement of the circuit closing means through the corresponding second means if that means was positioned according to the presence of a manifestation at the corresponding index point position.

10. In a mechanism for translating into differentially timed electrical impulses digital values designated on a record as a coded combination of manifestations at different index point positions, sensing means for detecting the presence or absence of manifestations at the different record index point positions, a first means for each of said index point positions operated at those times that an impulse would represent a digital value whose designation included a manifestation at the corresponding index point position, a second means for each of said index point positions operated at those times that an impulse would represent a digital value whose designation comprises manifestations which if appearing with a manifestation at the corresponding index point position would designate a different digital value, circuit closing means biased toward a circuit closing position, and testing means for each of said index point positions adjustable by said sensing means according to the absence or presence of a manifestation at the corresponding index point position between positions in which operation of the corresponding first means will restrain biased movement of the circuit closing means and in which operation of the corresponding second means will restrain biased movement of the circuit closing means.

11. In a mechanism for translating into differentially timed electrical impulses digital values designated on a record as a coded combination of manifestations at different index point positions, sensing means for detecting the presence or absence of manifestations at the different record index point positions, a first means for each of said index point positions operated at those times that an impulse would represent a digital value whose designation included a manifestation at the corresponding index point position, a second means for each of said index point positions operated at those times that an impulse would represent a digital value whose designation comprises manifestations which if appearing with a manifestation at the corresponding index point position would designate a different digital value, circuit closing means biased toward a circuit closing position, testing means for each of said index point positions adjustable by said sensing means according to the absence or presence of a manifestation at the corresponding index point position between positions in which operation of the corresponding first means will restrain biased movement of the circuit closing means and in which operation of the corresponding second means will restrain biased movement of the circuit closing means, the action of the first and second means for successive impulse times being such that they overlap and restrain the circuit closing means against movement to its biased position until such time as the impulse for the designated digital value would occur.

12. In a mechanims for translating into differentially timed electrical impulses digital values designated on a record as a coded combination of manifestations at different index point positions, sensing means for detecting the presence or absence of manifestations at the different record index point positions, a first means for each of said index point positions operated at those times that an impulse would represent a digital value whose designation included a manifestation at the corresponding index point position, a second means for each of said index point positions operated at those times that an impulse would represent a digital value whose designation comprises manifestations which if appearing with a manifestation at the corresponding index point position would designate a different digital value, circuit closing means biased toward a circuit closing position, testing means for each of said index point positions adjustable by said sensing means according to the absence or presence of a manifestation at the corresponding index point position between positions in which operation of the corresponding first means will restrain biased movement of the circuit closing means and in which operation of the corresponding second means will restrain biased movement of the circuit closing means, the action of the first and second means for successive pulse times overlapping and being such that they continuously restrain biased movement of the circuit closing means until the impulse time for the designated digital value and that they thereafter restore it before the next impulse time.

13. In a mechanism for translating into differentially timed electrical impulses digital values designated on a record as a coded combination of perforations at different index point positions, sensing means for detecting the presence or absence or perforations at the different index point positions, a first means for each of said index point positions operated at those times that an impulse would represent a digital value whose designation included a perforation at the corresponding index point position, a second means for each of said index point positions operated at those times that an impulse would represent a digital value whose designation comprises perforations which if appearing with a perforation at the corresponding index point position would designate a different digital value, circuit closing means biased toward a circuit closing position, and testing means for each of said index point positions adjustable by said sensing means according to the absence or presence of a perforation at the corresponding index point position between positions in which operation of the corresponding first means will restrain biased movement of the circuit closing means and in which operation of the corresponding second means will restrain biased movement of the circuit closing means.

14. In a mechanism for translating into differentially timed electrical impulses digital values designated on a record as a coded combination of perforations at different index point positions, a sensing pin for each index point position, a record support having an aperture beneath each index point position and movable relative to said sensing pins so that the sensing pins for the respective index point positions pass through the perforated index point positions and the sensing pins for the imperforate index point positions are shifted, a first means for each of said sensing pins operated at those times that an impulse would represent a digital value whose designation included a perforation at the corresponding index point position, a second means for each of said sensing pins operated at those times that an impulse would represent a digital value whose designation comprises perforations which if appearing with a perforation at a corresponding index point position would designate a different digital value, circuit closing means biased toward a circuit closing position, and testing means for each of said sensing pins adjustable thereby according to the absence or presence of a perforation at the corresponding index point positions between positions in which operation of the corresponding first means will restrain biased movement of the circuit closing means and in which operation of the corresponding second means will restrain biased movement of the circuit closing means.

15. In a mechanism for translating into differentially timed electrical impulses digital values designated on a record as a coded combination of perforations at different index point positions, a sensing pin for each of the different index point positions, a record support apertured beneath each index point position and movable relative to said sensing pins so that the sensing pins for the perforated index point positions pass therethrough while the sensing pins for the imperforate index point positions are shifted, a first means for each of said sensing pins operated at those times that an impulse would represent a digital value whose designation included a perforation at the corresponding index point position, a second means for each of said sensing pins operated at those times that an impulse would represent a digital value whose designation comprises perforations which if appearing with a perforation at a corresponding index point position would designate a different digital value, circuit closing means biased toward a circuit closing position, and testing pins biased toward respective sensing pins and released after movement of the record support for disposal by the sensing pins in one position if shifted and in another position if not shifted, said testing pins in the one position rendering the corresponding first means effective to restrain the biased movement of the circuit closing means and in its another position rendering the corresponding second means effective to restrain the biased movement of the circuit closing means.

16. In a mechanism for translating into differentially timed electrical impulses digital values designated on a record as a coded combination of perforations at different index point positions, a sensing pin for each of the different index point positions, a record support apertured beneath each index point position and movable relative to said sensing pins so that the sensing pins for the perforated index point positions pass therethrough while the sensing pins for the imperforate index point positions are shifted, a first bail for each sensing pin operated at those times that an impulse would represent a digital value whose designation included a perforation at the corresponding index point position, a second bail for each sensing pin operated at those times that an impulse would represent a digital value whose designation comprises perforations which if appearing with a perforation at the corresponding index point position would designate a different digital value, circuit closing means biased toward a circuit closing position, and test pins biased toward respective sensing pins and released after movement of the record support for disposal by the respective sensing pins in one position if shifted and in another position if not shifted, said test pins being so formed that in the one position they render the corresponding first bail effective to restrain the biased movement of the circuit closing means and in the another position they render the corresponding second bail effective to restrain the biased movement of the circuit closing means.

17. In a mechanism for simultaneously translating into differentially timed electrical impulses digital values designated in different columns on a record as coded combinations of perforations at different index point positions, a sensing pin for each of the different index point positions in each column, a record support apertured beneath each index point position and movable relative to said sensing pins so that the sensing pins for the perforated index point positions pass therethrough while the sensing pins for the imperforate index point positions are shifted, a first bail for each set of the corresponding index point positions that is operated at those times that pulses would represent digital values whose designations included perforations at the corresponding index point positions, a second bail for each of the corresponding index point positions operated at those times that pulses would represent digital values whose designations comprised perforations which if appearing with perforations at the corresponding index point positions would designate different digital values, circuit closing means for each column that is biased toward a circuit closing position, and test pins biased toward the respective sensing pins and released after movement of the record support for disposal by the respective sensing pins in one position if shifted and in another if not shifted, said test pins being so formed that in the one position they render the corresponding first bail effective to restrain the biased movement of the corresponding circuit closing means and in the another position they render the corresponding second bail effective to restrain the biased movement of the corresponding circuit closing means.

18. In a mechanism for translating into differentially timed electrical impulses digital values designated on a record as a coded combination of perforations at different index point positions, a sensing pin for each of the different index point positions, a record support apertured beneath each index point position and movable relative to said sensing pins so that the sensing pins for the perforated index point positions pass therethrough while the sensing pins for the imperforated index point positions are shifted, an actuable first bail for each of said sensing pins, a cam for each of said first bails operable to actuate it at those times that a pulse would represent a digital value whose designation included a perforation at the corresponding index point position, an actuable second bail for each of said sensing pins, a cam for each of said second bails operable to actuate it at those times that a pulse would represent a digital value whose designation comprises perforations which if appearing with a perforations which if appearing with a perforation at the corresponding index point position would designate a different digital value, circuit closing means biased toward a circuit closing position, and test pins biased toward respective sensing pins and released after movement of the record support for disposal by the respective sensing pins in one position if shifted and in another position if not shifted, said test pins being so formed that in the one position they render the corresponding first bail effective to restrain the biased movement of the circuit closing means and in the another position they render the corresponding second bail effective to restrain the biased movement of the circuit closing means.

19. In a mechanism for simultaneously translating into differentially timed electrical impulses digital values respectively designated in different columns arranged in several decks on a record card as coded combinations of perforations at different index point positions, a sensing pin for each of the different index point positions in each column in each deck, a record support apertured beneath each index point position and movable relative to said sensing pins so that the sensing pins for the perforated index point positions pass therethrough and the sensing pins for the imperforate index point positions are shifted, an actuable first bail for each set of corresponding index point positions in each card deck, a cam for each set of the corresponding first bails operable to actuate them at those times that impulses would represent digital values whose designations included perforations at the corresponding index point positions, an actuable second bail for each set of corresponding index point positions in each card deck, a cam for each set of the corresponding second bails operable to actuate them at those times that impulses would represent digital values whose designations comprised perforations which if appearing with perforations at the corresponding index point positions would designate different digital values, circuit closing means for each column biased toward a circuit closing position, and test pins biased toward the respective sensing pins and released after movement of the record support for disposal by the respective sensing pins in one position if shifted and in another if not shifted, said test pins being so formed that in one position they render the corresponding first bail effective to restrain the biased movement of the column circuit closing means and in another position they render the corresponding second bail effective to restrain the biased movement of the column circuit closing means.

20. In a mechanism for translating into differentially timed electrical impulses digital values designated on a record as a coded combination of perforations at different index point positions, a sensing pin for each of the different index point positions, a record support apertured beneath each index point position and movable relative to said sensing pins so that the sensing pins for the perforated index point positions pass therethrough while the sensing pins for the imperforate index point positions are shifted, a first bail for each sensing pin operated at those times that an impulse would represent a digital value whose designation included a perforation at the corresponding index point position, a second bail for each sensing pin operated at those times that an impulse would represent a digital value whose designation comprises perforations which if appearing with a perforation at the corresponding index point position would designate a different digital value, a pair of contacts biased towards closed position, an element biased to a position in which it holds the contacts in an open position, an interposer part biased to move the element from the position in which it holds the contacts open, and test pins biased toward respective sensing pins and released after movement of the record support for disposal by the respective sensing pins in one position if shifted and in another position if not shifted, said test pins and interposer part being so formed that the test pins in their one position are effective when the first bails are operated to restrain the biased movement of the interposer part and in their another position are effective when the second bails are operated to restrain biased movement of the interposer past.

21. In a mechanism for translating into differentially timed electrical impulses digital values designated on a record as a coded combination of perforations at different index point positions, a sensing pin for each of the different index point positions, a record support apertured beneath each index point position and movable relative to said sensing pins so that the sensing pins for the perforated index point positions pass therethrough while the sensing pins for the imperforate index point positions are shifted, a first bail for each sensing pin operated at those times that an impulse would represent a digital value whose designation included a perforation at the corresponding index point position, a second bail for each sensing pin operated at those times that an impulse would represent a digital value whose designation comprised perforations which if appearing with a perforation at the corresponding index point position would designate a different digital value, a pair of contacts biased towards closed position, an element biased to a position in which it holds the contacts in an open condition, an interposer part biased to move the element from the position in which it holds the contacts open, a latch biased so as to engage and hold said element against biased movement after it has been moved by the interposer part, test pins biased toward respective sensing pins and released after movement of the record support for disposal by the respective sensing pins in one position if shifted and in another position if not shifted, said test pins and interposer part being so formed that the test pins in one position are effective when the first bails are operated to restrain the biased movement of the interposer part and in their another position are effective when the second bails are operated to restrain biased movement of the interposer part, and means for operating said latch to release the element a predetermined time interval after it was latched.

22. In a mechanism for simultaneously translating into differentially timed electrical impulses digital values respectively designated in different columns arranged in several decks on a record card as coded combinations of perforations at different index point positions, a sensing pin for each of the different index point positions in each column in each deck, a record card support apertured beneath each index point position and movable relative to said sensing pins so that the sensing pins for the perforated index point positions pass therethrough while the sensing pins for the imperforate index point positions are shifted, an actuable first bail for each set of corresponding index point positions in each card deck, a cam for each set of corresponding first bails operable to actuate them at those times that impulses would represent digital values whose designations included perforations at the corresponding index point positions, an actuable second bail for each set of corresponding index point positions in each card deck, a cam for each set of the corresponding bails operable to actuate them at those times that impulses would represent digital values whose designations comprised perforations which if appearing with perforations at the corresponding index point positions would designate different digital values, a pair of contacts for each deck column that is biased towards closed position, an element for each deck column biased to a position in which it holds the corresponding contacts in an open condition, an interposer part for each deck column biased to move the corresponding element from the position in which it holds the corresponding contacts open, a latch for each element biased so as to engage and hold said element against biased movement after it has been moved by the corresponding interposer part, test pins biased toward the respective sensing pins and released after movement of the record support for disposal by the respective sensing pins in one position if shifted and in another position if not shifted, the test pins and interposer part for each deck column being so formed that the test pins in one position are effective when the corresponding first bails are operated to restrain the biased movement of the corresponding interposer part and in their other position are effective when the corresponding second bails are operated to restrain biased movement of the corresponding interposer part, and a centrally located cam for periodically operating the latches so as to release the elements at the end of each impulse time.

23. In a cyclically operated mechanism for translating into differentially timed electrical impulses digital values designated on successive record cards as coded combinations of perforations at different index point positions, a sensing pin for each of the different index point positions, an apertured record support movable in each cycle against the ends of said sensing pins so that the sensing pins for the perforated index point positions of a record thereon pass therethrough while the sensing pins for the imperforate index point positions are shifted, means for feeding another record card onto said platform in each cycle and for removing the preceding one therefrom, a first bail for each of said sensing pins operated at those times in a cycle that an impulse would represent a digital value whose designation included a perforation at the corresponding index point position, a second bail for each of said sensing pins operated at those times in a cycle that an impulse would represent a digital value whose designation comprised perforations which if appearing with a perforation at the corresponding index point position would designate a different digital value, circuit closing means biased toward a circuit closing position, test pins biased toward the respective sensing pins and released after movement of the record support for disposal by the respective sensing pins in one position if shifted and in another position if not shifted, each of said test pins being so formed that in the one position it is effective when the corresponding first bail is operated to restrain the biased movement of the circuit closing means and in the another position it is effective when the corresponding second bail is operated to restrain the biased movement of the circuit closing means, means for restoring the test pins in each cycle after the pulse time for the last digital value, means for thereafter restoring the sensing pins, and means for holding the interposer part against biased movement while sensing pins and test pins are being adjusted.

24. In a cyclically operated mechanism having two stations for simultaneously translating into differentially timed electrical impulses digital values designated in different columns arranged in several decks on two successive ones of a series of cards as coded combinations of perforations at different index point positions, each sensing station containing a sensing pin for each of the different index point positions in each column in each deck of a card, a card elevator platform apertured beneath each index point position and movable once in each cycle against ends of said sensing pins so that the sensing pins for the perforated index point positions pass therethrough while the sensing pins for the imperforate index point positions are shifted, a first bail for each set of corresponding index point positions in each card deck operated at those times in a cycle that impulses would represent digital values whose designations included perforations at the corresponding index point positions, a second bail for each set of corresponding index point positions in each card deck operated at those times that impulses would represent digital values whose designations comprised perforations which if appearing with perforations at the corresponding index point positions would designate different digital values, circuit closing means for the respective deck columns that are biased toward a circuit closing position, test pins biased toward respective sensing pins and released after movement of the elevator platform for disposal by the respective sensing pins in one position if shifted and in another position if not shifted, each of said test pins being so formed that in the one position it is effective when the corresponding first bail is operated to restrain the biased movement of the corresponding column circuit closing means and in the another position it is effective when the corresponding second bail is operated to restrain the biased movement of the corresponding column circuit closing means, means for restoring the test pins in each cycle after the pulse time for the last digital value, means for thereafter restoring the sensing pins, and means for moving the elevator platform and for restoring it before the sensing pins are restored; a source of cards; a receiver of cards; and means operable in each cycle to feed a card from the source to the first station and move a card at the first station to the second station and a card at the second station to the receiver.

25. In a unit for sensing and analyzing data designated on a record as manifestations at different index point positions, individual means for the respective index point positions adjustable according to the presence or absence of manifestations at the corresponding index point positions, means for indicating at a differential time the particular data designated by the manifestations, means for operating said individual means at differential times to control the data indicating means, and selectively actuable means for rendering the indicating means ineffective regardless of the data manifested.

26. In a mechanism for translating data stored mechanically according to the presence of one or more of the possible indicia of one code into the differentially timed manifestations of another code, a member biased for movement from a normal position to a manifesting position, a plurality of spaced lugs formed on said member and corresponding in number to the number of different indicia in the one code, a corresponding number of movable parts respectively disposable in one position or another according to the presence or absence of the code indicia, and a corresponding number of elements operable at different times to move only those corresponding parts in the another position to where they lie in the path of biased movement of the corresponding lugs.

27. In a mechanism for translating data stored mechanically according to the presence of one or more of the possible indicia of one code into the differentially timed manifestations of another code, a member biased for movement from a normal position to a manifesting position, a plurality of spaced lugs formed on said member and corresponding in number to the number of different indicia in the one code, a corresponding number of movable parts respectively disposable in one position or another according to the presence or absence of the code indicia, a corresponding number of elements operable at different times to move only those corresponding parts in the another positions to where they lie in the path of biased movement of the corresponding lugs, and a second set of elements operable at different times to move only those corresponding parts in the one positions to where they lie in the path of biased movement of the corresponding lugs.

28. In a mechanism for translating into differentially timed electrical impulses digital values designated on a record as a coded combination of perforations at different index point positions; a sensing pin for each index point position; a record platform having an aperture beneath each index point position and raisable relative to said sensing pins so that the sensing pins for the respective index point positions pass through the perforated index point positions and the sensing pins for the imperforate index point positions are shifted; a support in the mechanism; means for raising the record platform substantially evenly relative to the support including a first pair of spaced generally horizontal levers pivoted at their one ends to the platform and at their other ends to the support, a second pair of spaced generally horizontal levers equal in length to and extending in directions generally opposite to said first pair of levers and pivoted at their other ends to the support, a pair of relatively short generally vertical links pivoted at their one ends to said platform and at their other or lower ends to respective one ends of said second pair of levers, and means drivingly interconnecting said pairs of levers at points equidistant from the ends pivoted to the support; a first means for each of said sensing pins operated at those times that an impulse would represent a digital value whose designation included a perforation at the corresponding index point position; a second means for each of said sensing pins operated at those times than an impulse would represent a digital value whose designation comprises perforations which if appearing with a perforation at a corresponding index point position would designate a different digital value; circuit closing means biased toward a circuit closing position; and testing means for each of said sensing pins adjustable thereby according to the absence or presence of a perforation at the corresponding index point positions between positions in which operation of the corresponding first means will restrain biased movement of the circuit closing means and in which operation of the corresponding second means will restrain biased movement of the circuit closing means.

29. In a cyclically operated mechanism for translating into differentially timed manifestations digital values designated on record cards as coded combinations of manifestations at different index point positions, a frame, a sensing station on said frame, a first card feed means mounted upon said frame, second card feed means comprising continually rotatable card feed rollers including a card feed roller intermediate the ends of said sensing station cooperating with said first card feed means to yieldably move a card along a card path formed therebetween, a card gate movable into and out of position in the card path wherein it stops a yieldably driven card at the sensing station, a subframe secured to said frame beneath said sensing station and readily movable to an open position with respect thereto, said second card feed means being mounted on said subframe whereby the total card path becomes accessible whenever the subframe is moved to the open position.

References Cited in the file of this patent

UNITED STATES PATENTS

| Number | Name | Date |
|---|---|---|
| 1,416,296 | Hoitsma | May 16, 1922 |
| 1,441,806 | Hoitsma | Jan. 9, 1923 |
| 1,780,621 | Lasker | Nov. 4, 1930 |
| 1,926,882 | Peirce | Sept. 12, 1933 |
| 2,105,291 | Maul | Jan. 11, 1938 |
| 2,192,695 | Rainey | Mar. 5, 1940 |
| 2,323,824 | Maschmeyer | July 6, 1943 |
| 2,490,346 | Furman | Dec. 6, 1949 |
| 2,562,251 | Wockenfuss | July 31, 1951 |
| 2,569,879 | Balde | Oct. 2, 1951 |
| 2,638,270 | Jones | May 12, 1953 |